United States Patent
Tai et al.

(10) Patent No.: US 11,926,311 B2
(45) Date of Patent: Mar. 12, 2024

(54) HYBRID DRIVING SYSTEM AND HYBRID ELECTRIC VEHICLE

(71) Applicant: GUANGZHOU AUTOMOBILE GROUP CO., LTD., Guangzhou (CN)

(72) Inventors: Changning Tai, Guangzhou (CN); Xuewu Liu, Guangzhou (CN); Xiaoming Ling, Guangzhou (CN); Fenfen Ma, Guangzhou (CN); You Zhou, Guangzhou (CN); Anwei Zhang, Guangzhou (CN); Dongwei Liang, Guangzhou (CN); Jiajing Guan, Guangzhou (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 511 days.

(21) Appl. No.: 17/418,584

(22) PCT Filed: Jan. 16, 2019

(86) PCT No.: PCT/CN2019/071974
§ 371 (c)(1),
(2) Date: Jun. 25, 2021

(87) PCT Pub. No.: WO2020/133604
PCT Pub. Date: Jul. 2, 2020

(65) Prior Publication Data
US 2022/0063590 A1    Mar. 3, 2022

(30) Foreign Application Priority Data

Dec. 28, 2018 (CN) .......................... 201811627009.X

(51) Int. Cl.
*B60W 20/20* (2016.01)
*B60K 6/365* (2007.10)
(Continued)

(52) U.S. Cl.
CPC ............. *B60W 20/20* (2013.01); *B60K 6/365* (2013.01); *B60K 6/445* (2013.01); *B60W 10/02* (2013.01);
(Continued)

(58) Field of Classification Search
CPC ...... B60W 20/20; B60W 10/02; B60W 10/06; B60W 10/08; B60W 20/14; B60K 6/365; B60K 6/445
See application file for complete search history.

(56) References Cited

U.S. PATENT DOCUMENTS

| | | | |
|---|---|---|---|
| 2007/0021258 A1* | 1/2007 | Conlon ................. | B60W 10/26 475/5 |
| 2009/0093331 A1* | 4/2009 | Iwanaka ................ | B60K 6/365 903/910 |
| 2016/0033015 A1* | 2/2016 | Hwang ................. | B60K 6/547 180/65.23 |

FOREIGN PATENT DOCUMENTS

CN    107215200 A  *  9/2017  ............. B60K 6/365

* cited by examiner

*Primary Examiner* — David R Morris
*Assistant Examiner* — Aimee Tran Nguyen
(74) *Attorney, Agent, or Firm* — ScienBiziP, P.C.

(57) ABSTRACT

A hybrid driving system and a hybrid electric vehicle. The hybrid driving system includes an engine, an input element (20), an output element (23), a box body (24), a first motor (13), a second motor (14), a first planet row, a second planet row, a third planet row, a first clutch (15) and a first brake (16). According to the hybrid driving system of the present disclosure, a basic three-planet-row planet gear configuration is provided through the planet row mechanical structure and the reasonable layout of multiple operating elements (the clutches and the brakes), which can realize at least two E-CVT working modes to obtain higher transmission efficiency.

20 Claims, 25 Drawing Sheets

(51) Int. Cl.
*B60K 6/445* (2007.10)
*B60W 10/02* (2006.01)
*B60W 10/06* (2006.01)
*B60W 10/08* (2006.01)
*B60W 20/14* (2016.01)

(52) U.S. Cl.
CPC ............ *B60W 10/06* (2013.01); *B60W 10/08* (2013.01); *B60W 20/14* (2016.01)

HYBRID DRIVING SYSTEM AND HYBRID ELECTRIC VEHICLE

FIELD

The present disclosure relates to hybrid power technology, and more particularly, to a hybrid driving system and a hybrid electric vehicle.

BACKGROUND

At present, driving systems of hybrid electric vehicles (including plug-in hybrid electric vehicles, namely PHEV) mainly include three basic forms: series connection, parallel connection, and parallel-series connection (power splitting type). In the series connection form, there is no mechanical connection between an engine and an output shaft in the serial mode, the optimal control of rotating speed/torque can be realized, but all energy thereof needs to be transferred to the output shaft through two conversions of mechanical power/electrical power, and the loss is relatively large. The transmission efficiency of the parallel connection is high, but the mechanical connection between the engine and the output shaft cannot guarantee that the engine is always in a better working area, and accordingly, the parallel connection is usually used for medium and high speeds. The parallel-series connection combines the advantages of the series connection and the parallel connection, which can achieve both optimized control of the engine and high-efficiency control of medium and high speeds, however, the requirements for the ultimate power of a motor is high during the starting of the vehicle, and the efficiency is relatively low. Therefore, an ideal driving solution is to achieve functions such as pure electric starting, medium and low speed power splitting, medium and high speed engine direct driving or parallel driving based on a series-parallel hybrid driving system.

The series-parallel hybrid driving system mainly uses a planetary mechanism as a power splitting device, which is divided into four basic forms: input splitting, output splitting, composite splitting and combined splitting according to the positions of the motor and the engine in the mechanism. Currently, the mainstream planetary hybrid driving systems include: the first is the Toyota THS (HSD) single E-CVT mode hybrid systems, which are used for carrying Toyota Prius, Corolla, Levin, Camry, Lexus HS250h and Highlander, and Ford Escape and other vehicle models. The second is GM single E-CVT mode and dual E-CVT mode hybrid systems, which are used for carrying Chevrolet Volt, Escalade, Mercedes-Benz ML450 and other vehicle models.

The Toyota hybrid systems can realize modes such as pure electric, E-CVT hybrid mode and regenerative braking. According to different levels of the carried vehicle models, the Toyota hybrid systems are divided into single planet row systems and double planet row systems, the purpose of which is to increase the transmission torque at a driving motor end by adding a planet row to construct a reduction ratio (1+k) and to reduce the demand for the torque of a driving motor (especially for a pure electric starting working condition), thereby reducing the volume and the weight of the driving motor.

The GM E-CVT mode hybrid systems can realize modes such as pure electric, E-CVT hybrid mode and regenerative braking, and are divided into single planet row systems, double planet row systems and three planet row systems according to different levels of the carried vehicle models.

According to the analysis of the characteristics of the power splitting ratios of the Toyota and GM hybrid systems, it can be seen that in the low-speed and high-speed working conditions of the single E-CVT mode hybrid system, the power transmitted by an electric circuit accounts for a greater proportion than the power transmitted by a mechanical circuit. The power transmitted by the electric circuit undergoes two conversions from mechanical power to electric power and from the electric power to the mechanical power, the loss is greater, and the efficiency of the system is lower at this time. Although the pure electric mode can be used for the low-speed working condition to avoid the use of the E-CVT mode so as to improve the efficiency of the system, for the high-speed working condition, the system can only adopt the unique E-CVT mode. In respect of the above problems, the General Motors Corporation has developed a dual E-CVT mode, but when the vehicle speed rises to a certain level and the speed ratio exceeds a second mechanical point speed ratio in its second E-CVT mode, the transmission efficiency of the hybrid driving system is reduced. Accordingly, the transmission efficiency of the hybrid driving system in the prior art is not high.

SUMMARY

The technical problem to be solved by the present disclosure is to provide a hybrid driving system and a hybrid electric vehicle in view of the problem of low transmission efficiency of the hybrid driving system in the prior art.

To solve the above technical problem, in one aspect, an embodiment of the present disclosure provides a hybrid driving system, including:
  an engine;
  an input element;
  an output element;
  a box body;
  a first motor and a second motor;
  a first planet row, a second planet row and a third planet row, wherein the first planet row includes a first sun gear, a first planet gear, a first gear ring and a first planet carrier, the first sun gear is in external meshing transmission with the first planet gear, the first planet gear is in internal meshing transmission with the first gear ring, and the first planet gear is rotatably supported on the first planet carrier; the second planet row includes a second sun gear, a second planet gear, a second gear ring and a second planet carrier, the second sun gear is in external meshing transmission with the second planet gear, the second planet gear is in internal meshing transmission with the second gear ring, and the second planet gear is rotatably supported on the second planet carrier; the third planet row includes a third sun gear, a third planet gear, a third gear ring and a third planet carrier, the third sun gear is in external meshing transmission with the third planet gear, the third planet gear is in internal meshing transmission with the third gear ring, and the third planet gear is rotatably supported on the third planet carrier; and the first sun gear and the second gear ring are both connected to the second motor, the first planet carrier is fixedly connected to the second sun gear, the second planet carrier is fixedly connected to the third gear ring, the third sun gear is connected to the first motor, the input element is connected between the engine and the third planet carrier, and the output element is connected to the first planet carrier; and a first clutch and a first brake, wherein the first gear ring is connected to the third sun gear through the first clutch, and the first gear ring is connected to the box body through the first brake.

Optionally, the hybrid driving system has a pure electric mode; and when the engine and the first motor do not participate in working, and only the second motor performs driving, the first brake is engaged, and the first clutch is disengaged to establish the pure electric mode.

Optionally, the hybrid driving system further has a first engine restarting mode; and when the output power of the hybrid driving system in the pure electric mode is insufficient to meet a driving power demand of a vehicle or a battery power is relatively low, the engine is restarted to establish the first engine restarting mode.

Optionally, the hybrid driving system has a first E-CVT mode and a second E-CVT mode;

when the engine and the second motor perform driving together, and the first motor generates electricity for driving the second motor, the first brake is engaged, and the first clutch is disengaged to establish the first E-CVT mode; and when the engine performs driving, the first motor generates electricity or performs driving, and the second motor generates electricity or performs driving, the first clutch is engaged, and the first brake is disengaged to establish the second E-CVT mode.

Optionally, the hybrid driving system has an engine direct drive/parallel mode; and when the first motor does not participate in working, the engine performs driving, and the second motor performs driving or generates electricity, the first clutch and the first brake are engaged to establish the first engine direct drive/parallel mode.

Optionally, the hybrid driving system has a braking energy recovery mode; and when the engine and the first motor do not participate in working, and the second motor generates electricity, the first brake is engaged, and the first clutch is disengaged to establish the braking energy recovery mode.

Optionally, the hybrid driving system further has a second engine restarting mode; and when the braking process in the braking energy recovery mode is about to be completed, the engine is restarted to establish the second engine restarting mode.

Optionally, the hybrid driving system further includes a second clutch and a second brake, the second clutch is connected between any two of the third sun gear, the third planet carrier and the third gear ring, and the second gear ring is connected to the box body through the second brake.

Optionally, the hybrid driving system has a 1-gear pure electric mode, a 2-gear pure electric mode, a 3-gear pure electric mode, a 4-gear pure electric mode and a 5-gear pure electric mode;

when the engine does not participate in working, the first motor performs main driving, and the second motor performs auxiliary driving, the second clutch and the first brake are engaged, and the first clutch and the second brake are disengaged to establish the 1-gear pure electric mode;

when the engine does not participate in working, the first motor performs auxiliary driving, and the second motor performs main driving, the second clutch and the first brake are engaged, and the first clutch and the second brake are disengaged to establish the 2-gear pure electric mode;

when the engine and the first motor do not participate in working, and the second motor performs driving, the first clutch and the first brake are engaged, and the second clutch and the second brake are disengaged to establish the 3-gear pure electric mode;

when the engine and the second motor do not participate in working, and the first motor performs driving, the first clutch and the second brake are engaged, and the second clutch and the first brake are disengaged to establish the 4-gear pure electric mode; and when the engine does not participate in working, and the first motor and the second motor are used together as main drive, the first clutch and the second clutch are engaged, and the first brake and the second brake are disengaged to establish the 5-gear pure electric mode.

Optionally, the hybrid driving system has a first engine restarting mode, a second engine restarting mode, a third engine restarting mode, a fourth engine restarting mode and a fifth engine restarting mode;

when an output power of the hybrid driving system in the 1-gear pure electric mode is insufficient to meet a driving power demand of a vehicle or a battery power is relatively low, the engine is restarted to establish the first engine restarting mode;

when the output power of the hybrid driving system in the 2-gear pure electric mode is insufficient to meet the driving power demand of the vehicle or the battery power is relatively low, the engine is restarted to establish the second engine restarting mode;

when the output power of the hybrid driving system in the 3-gear pure electric mode is insufficient to meet the driving power demand of the vehicle or the battery power is relatively low, the engine is restarted to establish the third engine restarting mode;

when the output power of the hybrid driving system in the 4-gear pure electric mode is insufficient to meet the driving power demand of the vehicle or the battery power is relatively low, the engine is restarted to establish the fourth engine restarting mode; and when the output power of the hybrid driving system in the 5-gear pure electric mode is insufficient to meet the driving power demand of the vehicle or the battery power is relatively low, the engine is restarted to establish the fifth engine restarting mode.

Optionally, the hybrid driving system has a first E-CVT mode and a second E-CVT mode;

when the engine and the second motor perform driving together, and the first motor generates electricity for the driving of the second motor, the first brake is engaged, and the first clutch, the second clutch and the second brake are disengaged to establish the first E-CVT mode; and when the engine performs driving, the first motor generates electricity or performs driving, and the second motor generates electricity or performs driving, the first clutch is engaged, and the second clutch, the first brake and the second brake are disengaged to establish the second E-CVT mode.

Optionally, the hybrid driving system has a 1-gear engine direct drive/parallel mode, a 2-gear engine direct drive/parallel mode, a 3-gear engine direct drive/parallel mode and a 4-gear engine direct drive/parallel mode;

when the engine performs driving, the first motor generates electricity or performs driving, and the second motor generates electricity or performs driving, the second clutch and the first brake are engaged, and the first clutch and the second brake are disengaged to establish the 1-gear engine direct drive/parallel mode;

when the first motor does not participate in working, the engine performs driving, and the second motor performs driving or generates electricity, the first clutch and the first brake are engaged, and the second clutch and the second brake are disengaged to establish the 2-gear engine direct drive/parallel mode;

when the engine performs driving, the first motor generates electricity or performs driving, and the second motor generates electricity or performs driving, the first clutch and the second clutch are engaged, and the first brake and the second brake are disengaged to establish the 3-gear engine direct drive/parallel mode; and when the second motor does not participate in working, the engine performs driving, and the first motor performs driving or generates electricity, the first clutch and the second brake are engaged, and the second clutch and the first brake are disengaged to establish the 4-gear engine direct drive/parallel mode.

Optionally, the hybrid driving system has a first braking energy recovery mode, a second braking energy recovery mode, a third braking energy recovery mode, a fourth braking energy recovery mode and a fifth braking energy recovery mode;

when the engine does not participate in working, the first motor performs main power generation, and the second motor performs auxiliary power generation, the second clutch and the first brake are engaged, and the first clutch and the second brake are disengaged to establish the first braking energy recovery mode;

when the engine does not participate in working, the first motor performs auxiliary power generation, and the second motor performs main power generation, the second clutch and the first brake are engaged, and the first clutch and the second brake are disengaged to establish the second braking energy recovery mode;

when the engine and the first motor do not participate in working, and the second motor generates electricity, the first clutch and the first brake are engaged, and the second clutch and the second brake are disengaged to establish the third braking energy recovery mode;

when the engine and the second motor do not participate in working, and the first motor generates electricity, the first clutch and the second brake are engaged, and the second clutch and the first brake are disengaged to establish the fourth braking energy recovery mode; and when the engine does not participate in working, the first motor and the second motor perform main power generation together, the first clutch and the second clutch are engaged, and the first brake and the second brake are disengaged to establish the fifth braking energy recovery mode.

Optionally, the hybrid driving system has a sixth engine restarting mode, a seventh engine restarting mode, an eighth engine restarting mode, a ninth engine restarting mode and a tenth engine restarting mode;

when a braking process in the first braking energy recovery mode is about to be completed, the engine is restarted to establish the sixth engine restarting mode;

when the braking process in the second braking energy recovery mode is about to be completed, the engine is restarted to establish the seventh engine restarting mode;

when the braking process in the third braking energy recovery mode is about to be completed, the engine is restarted to establish the eighth engine restarting mode;

when the braking process in the fourth braking energy recovery mode is about to be completed, the engine is restarted to establish the ninth engine restarting mode; and when the braking process in the fifth braking energy recovery mode is about to be completed, the engine is restarted to establish the tenth engine restarting mode.

Optionally, the hybrid driving system further includes a second clutch, a third clutch and a second brake, the second clutch is connected between any two of the third sun gear, the third planet carrier and the third gear ring, the second gear ring is connected to the box body through the second brake, and the input element is connected to the third planet carrier through the third clutch.

Optionally, the hybrid driving system has a 1-gear pure electric mode, a 2-gear pure electric mode, a 3-gear pure electric mode, a 4-gear pure electric mode and a 5-gear pure electric mode;

when the engine does not participate in working, the first motor performs main driving, and the second motor performs auxiliary driving, the second clutch and the first brake are engaged, and the first clutch, the third clutch and the second brake are disengaged to establish the 1-gear pure electric mode;

when the engine does not participate in working, the first motor performs auxiliary driving, and the second motor performs main driving, the second clutch and the first brake are engaged, and the first clutch, the third clutch and the second brake are disengaged to establish the 2-gear pure electric mode;

when the engine and the first motor do not participate in working, and the second motor performs driving, the first clutch and the first brake are engaged, and the second clutch, the third clutch and the second brake are disengaged to establish the 3-gear pure electric mode;

when the engine and the second motor do not participate in working, and the first motor performs driving, the first clutch and the second brake are engaged, and the second clutch, the third clutch and the first brake are disengaged to establish the 4-gear pure electric mode; and when the engine does not participate in working, and the first motor and the second motor are used together as main drive, the first clutch and the second clutch are engaged, and the third clutch, the first brake and the second brake are disengaged to establish the 5-gear pure electric mode.

Optionally, the hybrid driving system has a first E-CVT mode and a second E-CVT mode;

when the engine and the second motor perform driving together, and the first motor generates electricity for driving the second motor, the first brake and the third clutch are engaged, and the first clutch, the second clutch and the second brake are disengaged to establish the first E-CVT mode; and when the engine performs driving, the first motor generates electricity or performs driving, and the second motor generates electricity or performs driving, the first clutch and the third clutch are engaged, and the second clutch, the first brake and the second brake are disengaged to establish the second E-CVT mode.

Optionally, the hybrid driving system has a 1-gear engine direct drive/parallel mode, a 2-gear engine direct drive/ parallel mode, a 3-gear engine direct drive/parallel mode, and a 4-gear engine direct drive/parallel mode;

when the engine performs driving, the first motor generates electricity or performs driving, and the second motor generates electricity or performs driving, the second clutch, the third clutch and the first brake are engaged, and the first clutch and the second brake are disengaged to establish the 1-gear engine direct drive/parallel mode;

when the first motor does not participate in working, the engine performs driving, and the second motor performs driving or generates electricity, the first clutch, the third clutch and the first brake are engaged, and the second brake and the second clutch are disengaged to establish the 2-gear engine direct drive/parallel mode;

when the engine performs driving, the first motor generates electricity or performs driving, and the second motor generates electricity or performs driving, the first clutch, the second clutch and the third clutch are engaged, and the first brake and the second brake are disengaged to establish the 3-gear engine direct drive/parallel mode; and when the second motor does not participate in working, the engine performs driving, and the first motor performs driving or generates electricity, the first clutch, the third clutch and the second brake are engaged, and the second clutch and the first brake are disengaged to establish the 4-gear engine direct drive/parallel mode.

Optionally, the hybrid driving system has a first braking energy recovery mode, a second braking energy recovery mode, a third braking energy recovery mode, a fourth braking energy recovery mode and a fifth braking energy recovery mode;

when the engine does not participate in working, the first motor performs main power generation, and the second motor performs auxiliary power generation, the second clutch and the first brake are engaged, and the first clutch, the third clutch and the second brake are disengaged to establish the first braking energy recovery mode;

when the engine does not participate in working, the first motor performs auxiliary power generation, and the second motor performs main power generation, the second clutch and the first brake are engaged, and the first clutch, the third clutch and the second brake are disengaged to establish the second braking energy recovery mode;

when the engine and the first motor do not participate in working, and the second motor generates electricity, the first clutch and the first brake are engaged, and the second clutch, the third clutch and the second brake are disengaged to establish the third braking energy recovery mode;

when the engine and the second motor do not participate in working, and the first motor generates electricity, the first clutch and the second brake are engaged, and the second clutch, the third clutch and the first brake are disengaged to establish the fourth braking energy recovery mode; and when the engine does not participate in working, the first motor and the second motor perform main power generation together, the first clutch and the second clutch are engaged, and the third clutch, the first brake and the second brake are disengaged to establish the fifth braking energy recovery mode.

Optionally, the hybrid driving system further includes a second clutch, a second brake and a third brake, the second clutch is connected between any two of the third sun gear, the third planet carrier and the third gear ring, the second gear ring is connected to the box body through the second brake, and the third gear ring is connected to the box body through the third brake.

Optionally, the hybrid driving system has a first E-CVT mode and a second E-CVT mode;

when the engine and the second motor perform driving together, and the first motor generates electricity for the driving of the second motor, the first brake is engaged, and the first clutch, the second clutch, the second brake and the third brake are disengaged to establish the first E-CVT mode; and when the engine performs driving, the first motor generates electricity or performs driving, and the second motor generates electricity or performs driving, the first clutch is engaged, and the second clutch, the first brake, the second brake and the third brake are disengaged to establish the second E-CVT mode.

Optionally, the hybrid driving system has a 1-gear engine direct drive/parallel mode, a 2-gear engine direct drive/parallel mode, a 3-gear engine direct drive/parallel mode, a 4-gear engine direct drive/parallel mode and a 5-gear engine direct drive/parallel mode;

when the engine performs driving, the first motor generates electricity or performs driving, and the second motor generates electricity or performs driving, the second clutch and the first brake are engaged, and the first clutch, the second brake and the third brake are disengaged to establish the 1-gear engine direct drive/parallel mode;

when the first motor does not participate in working, the engine performs driving, and the second motor performs driving or generates electricity, the first clutch and the first brake are engaged, and the second clutch, the second brake and the third brake are disengaged to establish the 2-gear engine direct drive/parallel mode;

when the engine performs driving, the first motor generates electricity or performs driving, and the second motor generates electricity or performs driving, the first clutch and the second clutch are engaged, and the first brake, the second brake and the third brake are disengaged to establish the 3-gear engine direct drive/parallel mode;

when the second motor does not participate in working, the engine performs driving, and the first motor performs driving or generates electricity, the first clutch and the second brake are engaged, and the second clutch, the first brake and the third brake are disengaged to establish the 4-gear engine direct drive/parallel mode; and when the engine performs driving, the first motor generates electricity or performs driving, and the second motor generates electricity or performs driving, the first clutch and the third brake are engaged, and the second clutch, the first brake and the second brake are disengaged to establish the 5-gear engine direct drive/parallel mode.

Optionally, the hybrid driving system has a 1-gear pure electric mode, a 2-gear pure electric mode, a 3-gear pure electric mode, a 4-gear pure electric mode, a 5-gear pure electric mode, a 6-gear pure electric mode, and a 7-gear pure electric mode;

when the engine does not participate in working, the first motor performs main driving, and the second motor performs auxiliary driving, the second clutch and the first brake are engaged, and the first clutch, the second brake and the third brake are disengaged to establish the 1-gear pure electric mode;

when the engine does not participate in working, the first motor performs auxiliary driving, and the second motor performs main driving, the second clutch and the first brake are engaged, and the first clutch, the second brake and the third brake are disengaged to establish the 2-gear pure electric mode;

when the engine and the first motor do not participate in working, and the second motor performs driving, the first clutch and the first brake are engaged, and the second clutch, the third clutch, the second brake and the third brake are disengaged to establish the 3-gear pure electric mode;

when the engine and the second motor do not participate in working, and the first motor performs driving, the first clutch and the second brake are engaged, and the second clutch, the first brake and the third brake are disengaged to establish the 4-gear pure electric mode;

when the engine does not participate in working, and the first motor and the second motor are used together as main drive, the first clutch and the second clutch are engaged, and the first brake, the second brake and the third brake are disengaged to establish the 5-gear pure electric mode;

when the engine does not participate in working, the first motor performs main driving, and the second motor performs auxiliary driving, the first clutch and the third brake are engaged, and the second clutch, the first brake and the second brake are disengaged to establish the 6-gear pure electric mode; and when the engine does not participate in working, the first motor performs auxiliary driving, and the second motor performs main driving, the first clutch and the third brake are engaged, and the second clutch, the first brake and the second brake are disengaged to establish the 7-gear pure electric mode.

Optionally, the hybrid driving system has a first engine restarting mode, a second engine restarting mode, a third engine restarting mode, a fourth engine restarting mode, a fifth engine restarting mode, an eleventh engine restarting mode and a twelfth engine restarting mode;

when the output power of the hybrid driving system in the 1-gear pure electric mode is insufficient to meet the driving power demand of the vehicle or the battery power is relatively low, the engine is restarted to establish the first engine restarting mode;

when the output power of the hybrid driving system in the 2-gear pure electric mode is insufficient to meet the driving power demand of the vehicle or the battery power is relatively low, the engine is restarted to establish the second engine restarting mode;

when the output power of the hybrid driving system in the 3-gear pure electric mode is insufficient to meet the driving power demand of the vehicle or the battery power is relatively low, the engine is restarted to establish the third engine restarting mode;

when the output power of the hybrid driving system in the 4-gear pure electric mode is insufficient to meet the driving power demand of the vehicle or the battery power is relatively low, the engine is restarted to establish the fourth engine restarting mode;

when the output power of the hybrid driving system in the 5-gear pure electric mode is insufficient to meet the driving power demand of the vehicle or the battery power is relatively low, the engine is restarted to establish the fifth engine restarting mode;

when the output power of the hybrid driving system in the 6-gear pure electric mode is insufficient to meet the driving power demand of the vehicle or the battery power is relatively low, the engine is restarted to establish the eleventh engine restarting mode; and when the output power of the hybrid driving system in the 7-gear pure electric mode is insufficient to meet the driving power demand of the vehicle or the battery power is relatively low, the engine is restarted to establish the twelfth engine restarting mode.

Optionally, the hybrid driving system has a first braking energy recovery mode, a second braking energy recovery mode, a third braking energy recovery mode, a fourth braking energy recovery mode, a fifth braking energy recovery mode, a sixth braking energy recovery mode and a seventh braking energy recovery mode;

when the engine does not participate in working, the first motor performs main power generation, and the second motor performs auxiliary power generation, the second clutch and the first brake are engaged, and the first clutch, the second brake and the third brake are disengaged to establish the first braking energy recovery mode;

when the engine does not participate in working, the first motor performs auxiliary power generation, and the second motor performs main power generation, the second clutch and the first brake are engaged, and the first clutch, the second brake and the third brake are disengaged to establish the second braking energy recovery mode;

when the engine and the first motor do not participate in working, and the second motor generates electricity, the first clutch and the first brake are engaged, and the second clutch, the second brake and the third brake are disengaged to establish the third braking energy recovery mode;

when the engine and the second motor do not participate in working, and the first motor generates electricity, the first clutch and the second brake are engaged, and the second clutch, the first brake and the third brake are disengaged to establish the fourth braking energy recovery mode;

when the engine does not participate in working, the first motor and the second motor perform main power generation together, the first clutch and the second clutch are engaged, and the first brake, the second brake and the third brake are disengaged to establish the fifth braking energy recovery mode;

when the engine does not participate in working, the first motor performs main power generation, and the second motor performs auxiliary power generation, the first clutch and the third brake are engaged, and the first clutch, the first brake and the second brake are disengaged to establish the sixth braking energy recovery mode; and when the engine does not participate in working, the first motor performs auxiliary power generation, and the second motor performs main power generation, the first clutch and the third brake are engaged, and the first clutch, the first brake and the second brake are disengaged to establish the seventh braking energy recovery mode.

Optionally, the hybrid driving system has a sixth engine restarting mode, a seventh engine restarting mode, an eighth engine restarting mode, a ninth engine restarting mode, a tenth engine restarting mode, a thirteenth engine restarting mode and a fourteenth engine restarting mode;

when the braking process in the first braking energy recovery mode is about to be completed, the engine is restarted to establish the sixth engine restarting mode;

when the braking process in the second braking energy recovery mode is about to be completed, the engine is restarted to establish the seventh engine restarting mode;

when the braking process in the third braking energy recovery mode is about to be completed, the engine is restarted to establish the eighth engine restarting mode;

when the braking process in the fourth braking energy recovery mode is about to be completed, the engine is restarted to establish the ninth engine restarting mode;

when the braking process in the fifth braking energy recovery mode is about to be completed, the engine is restarted to establish the tenth engine restarting mode;

when the braking process in the sixth braking energy recovery mode is about to be completed, the engine is restarted to establish the thirteenth engine restarting mode; and when the braking process in the seventh braking energy recovery mode is about to be completed, the engine is restarted to establish the fourteenth engine restarting mode.

Optionally, the hybrid driving system further includes a second clutch, a third clutch, a second brake and a third brake, the second clutch is connected between any two of the third sun gear, the third planet carrier and the third gear ring, the second gear ring is connected to the box body through the second brake, the third gear ring is connected to the box body through the third brake, and the input element is connected to the third planet carrier through the third clutch.

Optionally, the hybrid driving system has a first E-CVT mode and a second E-CVT mode;

when the engine and the second motor perform driving together, and the first motor generates electricity for the driving of the second motor, the first brake and the third clutch are engaged, and the first clutch, the second clutch, the second brake and the third brake are disengaged to establish the first E-CVT mode; and when the engine performs driving, the first motor generates electricity or performs driving, and the second motor generates electricity or performs driving, the first clutch and the third clutch are engaged, and the second clutch, the first brake, the second brake and the third brake are disengaged to establish the second E-CVT mode.

Optionally, the hybrid driving system has a 1-gear engine direct drive/parallel mode, a 2-gear engine direct drive/parallel mode, a 3-gear engine direct drive/parallel mode, a 4-gear engine direct drive/parallel mode, and a 5-gear engine direct drive/parallel mode;

when the engine performs driving, the first motor generates electricity or performs driving, and the second motor generates electricity or performs driving, the second clutch, the third clutch and the first brake are engaged, and the first clutch, the second brake and the third brake are disengaged to establish the 1-gear engine direct drive/parallel mode;

when the first motor does not participate in working, the engine performs driving, and the second motor performs driving or generates electricity, the first clutch, the third clutch and the first brake are engaged, and the second clutch, the second brake and the third brake are disengaged to establish the 2-gear engine direct drive/parallel mode;

when the engine performs driving, the first motor generates electricity or performs driving, and the second motor generates electricity or performs driving, the first clutch, the second clutch and the third clutch are engaged, and the first brake, the second brake and the third brake are disengaged to establish the 3-gear engine direct drive/parallel mode;

when the second motor does not participate in working, the engine performs driving, and the first motor performs driving or generates electricity, the first clutch, the third clutch and the second brake are engaged, and the second clutch, the first brake and the third brake are disengaged to establish the 4-gear engine direct drive/parallel mode; and when the engine performs driving, the first motor generates electricity or performs driving, and the second motor generates electricity or performs driving, the first clutch, the third clutch and the third brake are engaged, and the second clutch, the first brake and the second brake are disengaged to establish the 5-gear engine direct drive/parallel mode.

Optionally, the hybrid driving system has a 1-gear pure electric mode, a 2-gear pure electric mode, a 3-gear pure electric mode, a 4-gear pure electric mode, a 5-gear pure electric mode, a 6-gear pure electric mode, and a 7-gear pure electric mode;

when the engine does not participate in working, the first motor performs main driving, and the second motor performs auxiliary driving, the second clutch and the first brake are engaged, and the first clutch, the third clutch, the second brake and the third brake are disengaged to establish the 1-gear pure electric mode;

when the engine does not participate in working, the first motor performs auxiliary driving, and the second motor performs main driving, the second clutch and the first brake are engaged, and the first clutch, the third clutch, the second brake and the third brake are disengaged to establish the 2-gear pure electric mode;

when the engine and the first motor do not participate in working, and the second motor performs driving, the first clutch and the first brake are engaged, and the second clutch, the third clutch, the second brake and the third brake are disengaged to establish the 3-gear pure electric mode;

when the engine and the second motor do not participate in working, and the first motor performs driving, the first clutch and the second brake are engaged, and the second clutch, the third clutch, the first brake and the third brake are disengaged to establish the 4-gear pure electric mode;

when the engine does not participate in working, and the first motor and the second motor are used together as main drive, the first clutch and the second clutch are engaged, and the third clutch, the first brake, the second brake and the third brake are disengaged to establish the 5-gear pure electric mode;

when the engine does not participate in working, the first motor performs main driving, and the second motor performs auxiliary driving, the first clutch and the third brake are engaged, and the second clutch, the third clutch, the first brake and the second brake are disengaged to establish the 6-gear pure electric mode; and when the engine does not participate in working, the first motor performs auxiliary driving, and the second motor performs main driving, the first clutch and the third brake are engaged, and the second clutch, the third clutch, the first brake and the second brake are disengaged to establish the 7-gear pure electric mode.

Optionally, the hybrid driving system has a first braking energy recovery mode, a second braking energy recovery mode, a third braking energy recovery mode, a fourth braking energy recovery mode, a fifth braking energy recovery mode, a sixth braking energy recovery mode and a seventh braking energy recovery mode;

when the engine does not participate in working, the first motor performs main power generation, and the second motor performs auxiliary power generation, the second clutch and the first brake are engaged, and the first clutch, the third clutch, the second brake and the third brake are disengaged to establish the first braking energy recovery mode;

when the engine does not participate in working, the first motor performs auxiliary power generation, and the second motor performs main power generation, the second clutch and the first brake are engaged, and the first clutch, the third clutch, the second brake and the third brake are disengaged to establish the second braking energy recovery mode;

when the engine and the first motor do not participate in working, and the second motor generates electricity, the first clutch and the first brake are engaged, and the second clutch, the third clutch, the second brake and the third brake are disengaged to establish the third braking energy recovery mode;

when the engine and the second motor do not participate in working, and the first motor generates electricity, the first clutch and the second brake are engaged, and the second clutch, the third clutch, the first brake and the third brake are disengaged to establish the fourth braking energy recovery mode;

when the engine does not participate in working, the first motor and the second motor perform main power generation together, the first clutch and the second clutch are engaged, and the third clutch, the first brake, the second brake and the third brake are disengaged to establish the fifth braking energy recovery mode;

when the engine does not participate in working, the first motor performs main power generation, and the second motor performs auxiliary power generation, the first clutch and the third brake are engaged, and the first clutch, the third clutch, the first brake and the second brake are disengaged to establish the sixth braking energy recovery mode; and when the engine does not participate in working, the first motor performs auxiliary power generation, and the second motor performs main power generation, the first clutch and the third brake are engaged, and the first clutch, the third clutch, the first brake and the second brake are disengaged to establish the seventh braking energy recovery mode.

In another aspect, a hybrid driving system includes:
an engine;
an input element;
an output element;
a box body;
a first motor and a second motor;
a first planet row, a second planet row and a third planet row, wherein the first planet row includes a first sun gear, a first planet gear, a first gear ring and a first planet carrier, the first sun gear is in external meshing transmission with the first planet gear, the first planet gear is in internal meshing transmission with the first gear ring, and the first planet gear is rotatably supported on the first planet carrier; the second planet row includes a second sun gear, a second planet gear, a second gear ring and a second planet carrier, the second sun gear is in external meshing transmission with the second planet gear, the second planet gear is in internal meshing transmission with the second gear ring, and the second planet gear is rotatably supported on the second planet carrier; the third planet row includes a third sun gear, a third planet gear, a third gear ring and a third planet carrier, the third sun gear is in external meshing transmission with the third planet gear, the third planet gear is in internal meshing transmission with the third gear ring, and the third planet gear is rotatably supported on the third planet carrier; and the first sun gear and the second gear ring are both connected to the second motor, the first planet carrier is fixedly connected to the second sun gear, the second planet carrier is fixedly connected to the third gear ring, the input element is connected between the engine and the third planet carrier, and the output element is connected to the first planet carrier; and a first clutch, a second clutch, a fourth clutch, a first brake and a second brake, wherein the first gear ring is connected to the third sun gear through the first clutch, the second clutch is connected between any two of the third sun gear, the third planet carrier and the third gear ring, the first gear ring is connected to the box body through the first brake, the second gear ring is connected to the box body through the second brake, and the third sun gear is connected to the first motor through the fourth clutch.

Optionally, the hybrid driving system has a 1-gear pure electric mode, a 2-gear pure electric mode, a 3-gear pure electric mode, a 4-gear pure electric mode and a 5-gear pure electric mode;

when the engine does not participate in working, the first motor performs main driving, and the second motor performs auxiliary driving, the second clutch, the fourth clutch and the first brake are engaged, and the first clutch and the second brake are disengaged to establish the 1-gear pure electric mode;

when the engine does not participate in working, the first motor performs auxiliary driving, and the second motor performs main driving, the second clutch, the fourth clutch and the first brake are engaged, and the first clutch and the second brake are disengaged to establish the 2-gear pure electric mode;

when the engine and the first motor do not participate in working, and the second motor performs driving, the first clutch and the first brake are engaged, and the second clutch, the fourth clutch and the second brake are disengaged to establish the 3-gear pure electric mode;

when the engine and the second motor do not participate in working, and the first motor performs driving, the first clutch, the fourth clutch and the second brake are engaged, and the second clutch and the first brake are disengaged to establish the 4-gear pure electric mode; and when the engine does not participate in working, and the first motor and the second motor are used together as main drive, the first clutch, the fourth clutch and the second clutch are engaged, and the first brake and the second brake are disengaged to establish the 5-gear pure electric mode.

Optionally, the hybrid driving system has a first engine restarting mode, a second engine restarting mode, a third engine restarting mode, a fourth engine restarting mode and a fifth engine restarting mode;
when the output power of the hybrid driving system in the 1-gear pure electric mode is insufficient to meet the driving power demand of the vehicle or the battery power is relatively low, the engine is restarted to establish the first engine restarting mode;
when the output power of the hybrid driving system in the 2-gear pure electric mode is insufficient to meet the driving power demand of the vehicle or the battery power is relatively low, the engine is restarted to establish the second engine restarting mode;
when the output power of the hybrid driving system in the 3-gear pure electric mode is insufficient to meet the driving power demand of the vehicle or the battery power is relatively low, the engine is restarted to establish the third engine restarting mode;
when the output power of the hybrid driving system in the 4-gear pure electric mode is insufficient to meet the driving power demand of the vehicle or the battery power is relatively low, the engine is restarted to establish the fourth engine restarting mode; and
when the output power of the hybrid driving system in the 5-gear pure electric mode is insufficient to meet the driving power demand of the vehicle or the battery power is relatively low, the engine is restarted to establish the fifth engine restarting mode.

Optionally, the hybrid driving system has a first E-CVT mode, a second E-CVT mode, a third E-CVT mode and a fourth E-CVT mode;
when the engine and the second motor perform driving together, and the first motor generates electricity for the driving of the second motor, the first brake and the fourth clutch are engaged, and the first clutch, the second clutch and the second brake are disengaged to establish the first E-CVT mode;
when the engine performs driving, the first motor generates electricity or performs driving, and the second motor generates electricity or performs driving, the first brake and the fourth clutch are engaged, and the second clutch, the first brake and the second brake are disengaged to establish the second E-CVT mode;
when the engine and the second motor perform driving together, and the first motor generates electricity for the driving of the second motor, the first clutch and the second clutch are engaged, and the fourth clutch, the first brake and the second brake are disengaged to establish the third E-CVT mode; and
when the engine and the second motor perform driving together, and the first motor generates electricity for the driving of the second motor, the second clutch and the fourth clutch are engaged, and the first clutch, the first brake and the second brake are disengaged to establish the fourth E-CVT mode.

Optionally, the hybrid driving system has a 1-gear engine direct drive/parallel mode, a 2-gear engine direct drive/parallel mode, a 3-gear engine direct drive/parallel mode and a 4-gear engine direct drive/parallel mode;
when the engine performs driving, the first motor generates electricity or performs driving, and the second motor generates electricity or performs driving, the second clutch, the fourth clutch and the first brake are engaged, and the first clutch and the second brake are disengaged to establish the 1-gear engine direct drive/parallel mode;
when the first motor does not participate in working, the engine performs driving, and the second motor performs driving or generates electricity, the first clutch and the first brake are engaged, and the second clutch, the fourth clutch and the second brake are disengaged to establish the 2-gear engine direct drive/parallel mode;
when the engine performs driving, the first motor generates electricity or performs driving, and the second motor generates electricity or performs driving, the first clutch, the second clutch and the fourth clutch are engaged, and the first brake and the second brake are disengaged to establish the 3-gear engine direct drive/parallel mode; and
when the second motor does not participate in working, the engine performs driving, and the first motor performs driving or generates electricity, the first clutch, the fourth clutch and the second brake are engaged, and the second clutch and the first brake are disengaged to establish the 4-gear engine direct drive/parallel mode.

Optionally, the hybrid driving system has a first braking energy recovery mode, a second braking energy recovery mode, a third braking energy recovery mode, a fourth braking energy recovery mode and a fifth braking energy recovery mode;
when the engine does not participate in working, the first motor performs main power generation, and the second motor performs auxiliary power generation, the second clutch, the fourth clutch and the first brake are engaged, and the first clutch and the second brake are disengaged to establish the first braking energy recovery mode;
when the engine does not participate in working, the first motor performs auxiliary power generation, and the second motor performs main power generation, the second clutch, the fourth clutch and the first brake are engaged, and the first clutch and the second brake are disengaged to establish the second braking energy recovery mode;
when the engine and the first motor do not participate in working, and the second motor generates electricity, the first clutch and the first brake are engaged, and the second clutch, the fourth clutch and the second brake are disengaged to establish the third braking energy recovery mode;
when the engine and the second motor do not participate in working, and the first motor generates electricity, the first clutch, the fourth clutch and the second brake are engaged, and the second clutch and the first brake are disengaged to establish the fourth braking energy recovery mode; and
when the engine does not participate in working, the first motor and the second motor perform main power generation together, the first clutch, the second clutch and the fourth clutch are engaged, and the first brake and the second brake are disengaged to establish the fifth braking energy recovery mode.

Optionally, the hybrid driving system has a sixth engine restarting mode, a seventh engine restarting mode, an eighth engine restarting mode, a ninth engine restarting mode and a tenth engine restarting mode;
when the braking process in the first braking energy recovery mode is about to be completed, the engine is restarted to establish the sixth engine restarting mode;
when the braking process in the second braking energy recovery mode is about to be completed, the engine is restarted to establish the seventh engine restarting mode;

when the braking process in the third braking energy recovery mode is about to be completed, the engine is restarted to establish the eighth engine restarting mode;

when the braking process in the fourth braking energy recovery mode is about to be completed, the engine is restarted to establish the ninth engine restarting mode; and when the braking process in the fifth braking energy recovery mode is about to be completed, the engine is restarted to establish the tenth engine restarting mode.

Optionally, the hybrid driving system further includes a third clutch, and the input element is connected to the third planet carrier through the third clutch.

Optionally, the hybrid driving system has a 1-gear pure electric mode, a 2-gear pure electric mode, a 3-gear pure electric mode, a 4-gear pure electric mode and a 5-gear pure electric mode;

when the engine does not participate in working, the first motor performs main driving, and the second motor performs auxiliary driving, the second clutch, the fourth clutch and the first brake are engaged, and the first clutch, the third clutch and the second brake are disengaged to establish the 1-gear pure electric mode;

when the engine does not participate in working, the first motor performs auxiliary driving, and the second motor performs main driving, the second clutch, the fourth clutch and the first brake are engaged, and the first clutch, the third clutch and the second brake are disengaged to establish the 2-gear pure electric mode;

when the engine and the first motor do not participate in working, and the second motor performs driving, the first clutch and the first brake are engaged, and the second clutch, the third clutch, the fourth clutch and the second brake are disengaged to establish the 3-gear pure electric mode;

when the engine and the second motor do not participate in working, and the first motor performs driving, the first clutch, the fourth clutch and the second brake are engaged, and the second clutch, the third clutch and the first brake are disengaged to establish the 4-gear pure electric mode; and when the engine does not participate in working, and the first motor and the second motor are used together as main drive, the first clutch, the second clutch and the fourth clutch are engaged, and the third clutch, the first brake and the second brake are disengaged to establish the 5-gear pure electric mode.

Optionally, the hybrid driving system has a first E-CVT mode, a second E-CVT mode, a third E-CVT mode and a fourth E-CVT mode;

when the engine and the second motor perform driving together, and the first motor generates electricity for the driving of the second motor, the third clutch, the fourth clutch and the first brake are engaged, and the first clutch, the second clutch and the second brake are disengaged to establish the first E-CVT mode;

when the engine performs driving, the first motor generates electricity or performs driving, and the second motor generates electricity or performs driving, the first clutch, the third clutch and the fourth clutch are engaged, and the second clutch, the first brake and the second brake are disengaged to establish the second E-CVT mode;

when the engine and the second motor perform driving together, and the first motor generates electricity for the driving of the second motor, the first clutch, the second clutch and the third clutch are engaged, and the fourth clutch, the first brake and the second brake are disengaged to establish the third E-CVT mode; and when the engine and the second motor perform driving together, and the first motor generates electricity for the driving of the second motor, the second clutch, the third clutch and the fourth clutch are engaged, and the first clutch, the first brake and the second brake are disengaged to establish the fourth E-CVT mode.

Optionally, the hybrid driving system has a 1-gear engine direct drive/parallel mode, a 2-gear engine direct drive/parallel mode, a 3-gear engine direct drive/parallel mode and a 4-gear engine direct drive/parallel mode;

when the engine performs driving, the first motor generates electricity or performs driving, and the second motor generates electricity or performs driving, the second clutch, the third clutch, the fourth clutch and the first brake are engaged, and the first clutch and the second brake are disengaged to establish the 1-gear engine direct drive/parallel mode;

when the first motor does not participate in working, the engine performs driving, and the second motor performs driving or generates electricity, the first clutch, the third clutch and the first brake are engaged, and the second clutch, the fourth clutch and the second brake are disengaged to establish the 2-gear engine direct drive/parallel mode;

when the engine performs driving, the first motor generates electricity or performs driving, and the second motor generates electricity or performs driving, the first clutch, the second clutch, the third clutch and the fourth clutch are engaged, and the first brake and the second brake are disengaged to establish the 3-gear engine direct drive/parallel mode; and when the second motor does not participate in working, the engine performs driving, and the first motor performs driving or generates electricity, the first clutch, the third clutch, the fourth clutch and the second brake are engaged, and the second clutch and the first brake are disengaged to establish the 4-gear engine direct drive/parallel mode.

Optionally, the hybrid driving system has a first braking energy recovery mode, a second braking energy recovery mode, a third braking energy recovery mode, a fourth braking energy recovery mode and a fifth braking energy recovery mode;

when the engine does not participate in working, the first motor performs main power generation, and the second motor performs auxiliary power generation, the second clutch, the fourth clutch and the first brake are engaged, and the first clutch, the third clutch and the second brake are disengaged to establish the first braking energy recovery mode;

when the engine does not participate in working, the first motor performs auxiliary power generation, and the second motor performs main power generation, the second clutch, the fourth clutch and the first brake are engaged, and the first clutch, the third clutch and the second brake are disengaged to establish the second braking energy recovery mode;

when the engine and the first motor do not participate in working, and the second motor generates electricity, the first clutch and the first brake are engaged, and the second clutch, the third clutch, the fourth clutch and the second brake are disengaged to establish the third braking energy recovery mode;

when the engine and the second motor do not participate in working, and the first motor generates electricity, the first clutch, the fourth clutch and the second brake are engaged, and the second clutch, the third clutch and the first brake are disengaged to establish the fourth braking energy recovery mode; and when the engine does not participate in working, the first motor and the second motor perform main power generation together, the first clutch, the second clutch and the fourth clutch are engaged, and the third clutch, the first brake and the second brake are disengaged to establish the fifth braking energy recovery mode.

According to the hybrid driving system of the embodiment of the present disclosure, a basic three-planet-row planet gear configuration is provided through the planet row mechanical structure and the reasonable layout of multiple operating elements (the clutches and the brakes), which can realize at least two E-CVT working modes to obtain higher transmission efficiency. In addition, by selectively engaging one or more of the multiple operating elements, more working modes can be realized to further obtain higher transmission efficiency.

In still another aspect, embodiments of the present disclosure further provide a hybrid electric vehicle, including the above-mentioned hybrid driving system.

Figure 1:
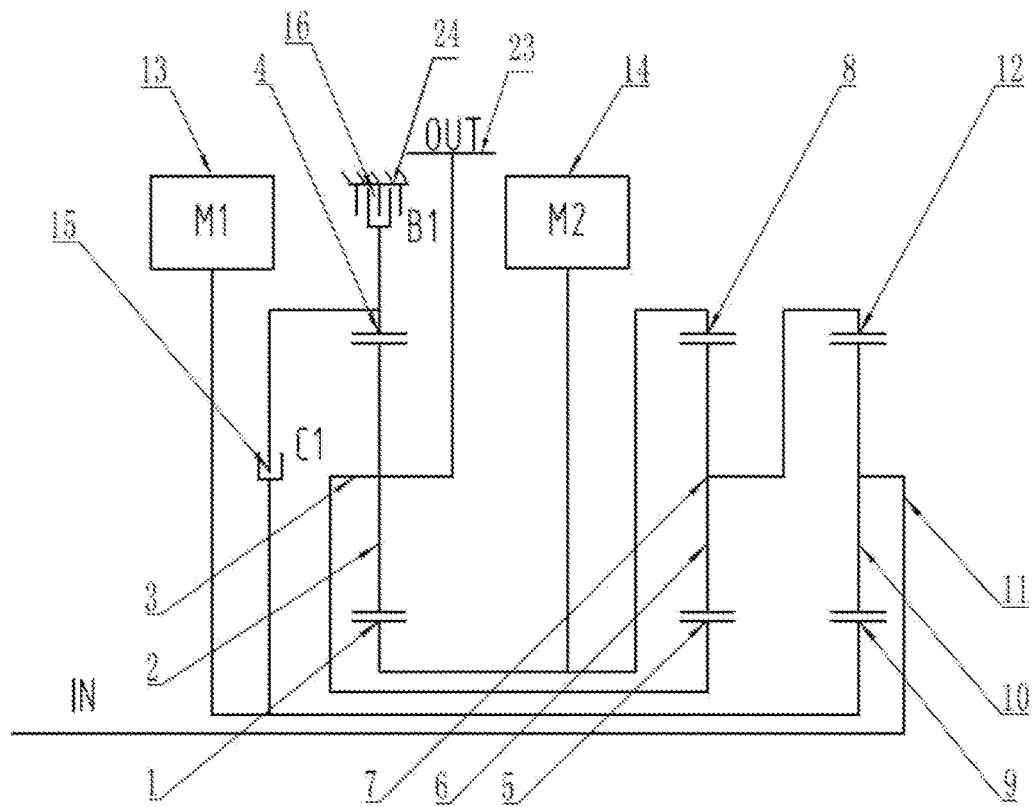
FIG. 1 is a schematic diagram of a hybrid driving system provided by a first embodiment of the present disclosure.

REFERENCE SIGNS IN THE DRAWINGS 1. first sun gear; 2. first planet gear; 3. first planet carrier; 4. first gear ring; 5. second sun gear; 6. second planet gear; 7. second planet carrier; 8. second gear ring; 9. third sun gear; 10. third planet gear; 11. third planet carrier; 12. third gear ring; 13. first motor; 14. second motor; 15. first clutch; 16. first brake; 17. second clutch; 18. third clutch; 19. second brake; 20. input element; 21. third brake; 22. fourth clutch; 23. output element; 24. box body.

DETAIL DESCRIPTION

In order that the technical problems solved by the present disclosure, the technical solutions and the beneficial effects are clearer, the present disclosure will be further described below in detail in combination with the drawings and embodiments. It should be understood that the specific embodiments described herein are only used for explaining the present disclosure, rather than limiting the present disclosure.

Hereinafter, a first clutch 15, a second clutch 17 and a third clutch 18 are respectively represented by C1, C2, C3, and C4 in the figures, and a first brake 16, a second brake 19 and a third brake 21 are respectively represented by B1, B2 and B3 in the figures.

Referring to FIG. 1 to FIG. 8, a hybrid driving system provided by a first embodiment of the present disclosure is shown, including an engine (not shown in the figures), an input element 20, an output element 23, a box body 24, a first motor 13, a second motor 14, a first planet row, a second planet row, a third planet row, a first clutch 15 and a first brake 16.

In the present embodiment, the first planet row, the second planet row and the third planet row are all single planet rows (simple planet rows).

The first planet row includes a first sun gear 1, a first planet gear 2, a first gear ring 4 and a first planet carrier 3, the first sun gear 1 is in external meshing transmission with the first planet gear 2, the first planet gear 2 is in internal meshing transmission with the first gear ring 4, and the first planet gear 2 is rotatably supported on the first planet carrier 3 through a rolling bearing or a sliding bearing.

The second planet row includes a second sun gear 5, a second planet gear 6, a second gear ring 8 and a second planet carrier 7, the second sun gear 5 is in external meshing transmission with the second planet gear 6, the second planet gear 6 is in internal meshing transmission with the second gear ring 8, and the second planet gear 6 is rotatably supported on the second planet carrier 7 through a rolling bearing or a sliding bearing.

The third planet row includes a third sun gear 9, a third planet gear 10, a third gear ring 12 and a third planet carrier 11, the third sun gear 9 is in external meshing transmission with the third planet gear 10, the third planet gear 10 is in internal meshing transmission with the third gear ring 12, and the third planet gear 10 is rotatably supported on the third planet carrier 11 through a rolling bearing or a sliding bearing.

As shown in FIG. 1, the first sun gear 1 and the second gear ring 8 are both connected to the second motor 14, the first planet carrier 3 is fixedly connected to the second sun gear 5, the second planet carrier 7 is fixedly connected to the third gear ring 12, the third sun gear 9 is connected to the first motor 13, the input element 20 is connected between the engine and the third planet carrier 11, and the output element 23 is connected to the first planet carrier 3. The fixed connection here can be spline connection, welding or integral formation. That is, the first sun gear 1 and the second gear ring 8 are splined, welded or integrally formed with the rotor of the second motor 14, the first planet carrier 3 is splined, welded or integrally formed with the second sun gear 5, the second planet carrier 7 is splined, welded or integrally formed with the third gear ring 12, and the third sun gear 9 is splined, welded or integrally formed with the rotor of the first motor 13.

As shown in FIG. 1, the first gear ring 4 is connected to the third sun gear 9 through the first clutch 15, and the first gear ring 4 is connected to the box body 24 through the first brake 16.

The function of the clutch is to realize the fixed connection and disengagement between two members through engagement or disengagement. In the present embodiment, a multi-disc wet clutch or a dog clutch (Dog Clutch) can be used. That is, the first clutch 15 is a multi-disc wet clutch or a dog clutch.

The function of the brake is to realize the connection or disengagement of the member and the box body 24 by engagement or disengagement so as to brake or disengage the member. In the present embodiment, a drum brake, a multi-disc wet brake, a multi-mode clutch or a one-way clutch can be used. That is, the first brake 16 is a drum brake, a multi-disc wet brake, a multi-mode clutch, or a one-way clutch.

The hybrid driving system in the present embodiment has multiple working modes, specifically: two E-CVT modes (a first E-CVT mode and a second E-CVT mode), 2 gears of pure electric modes (a 1-gear pure electric mode, a 2-gear pure electric mode), one engine direct drive/parallel mode, one braking energy recovery mode, and two engine restarting modes (a first engine restarting mode and a second engine restarting mode). The operating logic in each working mode is as shown in Table 1.

TABLE 1

Working mode operating logic table (first embodiment)

| Working mode | First clutch | First brake | Speed ratio or mechanical point speed ratio (transmission ratio) |
|---|---|---|---|
| Pure electric mode | | • | $K1 + 1$ |
| First E-CVT mode | | • | $K3*(K1*K2 + K2 + 1)/(1 + K2)/(1 + K3)$ |
| Second E-CVT mode | • | | $i1 = K3*(K1*K2 + K2 + 1)/(1 + K2)/(1 + K3)$ |
| | | | $i2 = (K1*K3 + (1 + K1)*(1 + K2))/K1/(1 + K2)/(1 + K3)$ |
| Engine direct drive/parallel mode | • | • | $K3*(1 + K2 + K1*K2)/(1 + K2)/(1 + K3)$ |
| Braking energy recovery mode | | • | $1/(K1 + 1)$ |
| First engine restarting mode | | • | |
| Second engine restarting mode | • | | |

The input element 20 can be an output shaft that is coaxially arranged with the crankshaft of the engine. More preferably, the output shaft of the first motor 13 and the output shaft of the second motor 14 are coaxially arranged with the input element 20 (the output shaft). In this way, the engine, the first motor 13 and the second motor 14 are arranged linearly, so that the hybrid driving system has a compact structure and small space occupation. The input element 20 is directly connected to the engine, or the input element 20 is connected to the engine through a torsional shock absorber.

The box body 24 can be the shell of the first motor 13, the shell of the second motor 14, the shell of a transmission, or other members that are stationary relative to the vehicle body. In the present embodiment, preferably, the first motor 13 and the second motor 14 share a shell, and the rotor of the first motor 13 and the rotor of the second motor 14 are arranged linearly in the shared shell, so that the structure of the hybrid driving system is more compact.

The first motor 13 and the second motor 14 are both electromotors/generators (M/G). That is, both the first motor 13 and the second motor 14 can be used for power generation and driving.

The output element 23 can be a planet gear set, one or more parallel shaft gear sets, a chain transmission mechanism, a belt transmission mechanism, and the like.

According to the hybrid driving system in the first embodiment of the present disclosure, a basic three-planet-row planet gear configuration is provided through the planet row mechanical structure and the reasonable layout of multiple operating elements (the first clutch 15, the second clutch 17, the first brake 16 and the second brake 19), which can realize two E-CVT working modes to obtain higher transmission efficiency. By selectively engaging one or more of the first clutch 15, the second clutch 17, the first brake 16 and the second brake 19, more working modes can be realized to further obtain higher transmission efficiency.

In Table 1, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

In the first E-CVT mode and the second E-CVT mode, the hybrid driving system has two inputs (the engine and one of the motors perform driving together). At this time, the speed ratio cannot be calculated through a simple ratio of the input rotating speed to the output rotating speed, therefore, the mechanical point speed ratio is used in the first E-CVT mode and the second E-CVT mode. The mechanical point speed ratio means that the input of the first motor 13 and the second motor 14 is not considered, and only the input of the engine is considered, that is, the mechanical point speed ratio at this time is the ratio of the input rotating speed of the engine to the output speed of the hybrid driving system.

The power transmission routes (lines on the transmission routes are thickened) in various working modes in the first embodiment will be described in detail below in conjunction with FIG. 2 to FIG. 8.

(1) The Pure Electric Mode

Figure 2:
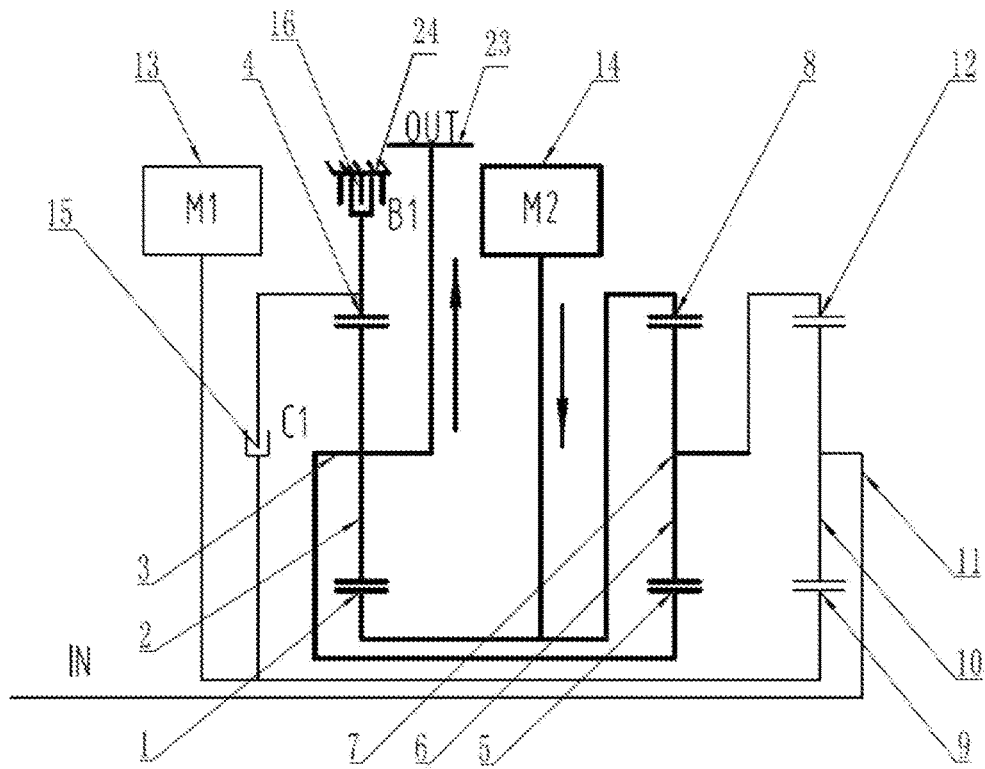
FIG. 2 is a power transmission route diagram of the hybrid driving system provided by the first embodiment of the present disclosure in a pure electric mode.

The first brake 16 is engaged, and the first clutch 15 is disengaged to realize the pure electric mode. In this mode, the engine and the first motor 13 do not participate in working, and only the second motor 14 performs driving. This mode can be applied to low-speed working conditions such as vehicle starting and traffic jams. The power transmission route is as shown in FIG. 2, and the transmission ratio in this mode is: $i=K1+1$.

(2) The First E-CVT Mode

Figure 3:
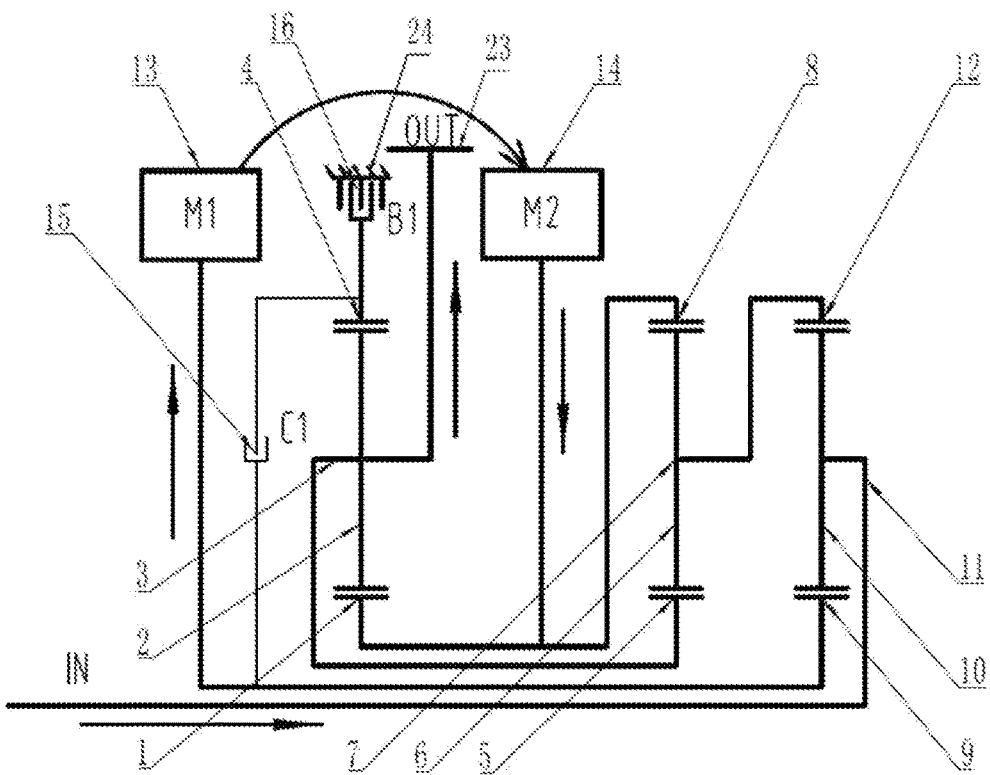
FIG. 3 is a power transmission route diagram of the hybrid driving system provided by the first embodiment of the present disclosure in a first E-CVT mode.

The first brake 16 is engaged, and the first clutch 15 is disengaged to realize the first E-CVT mode. The first E-CVT mode is the input power splitting mode, which has high transmission efficiency when the speed ratio is lower than the mechanical point speed ratio in this mode, so it is suitable for low-speed working conditions. In this mode, the engine and the second motor 14 perform driving together, the first motor 13 generates electricity for the driving of the second motor 14, and the specific power transmission route is as shown in FIG. 3. At this time, the mechanical point speed ratio in this mode is: $i=K3*(K1*K2+K2+1)/(1+K2)/(1+K3)$.

(3) The Second E-CVT Mode

Figure 4:
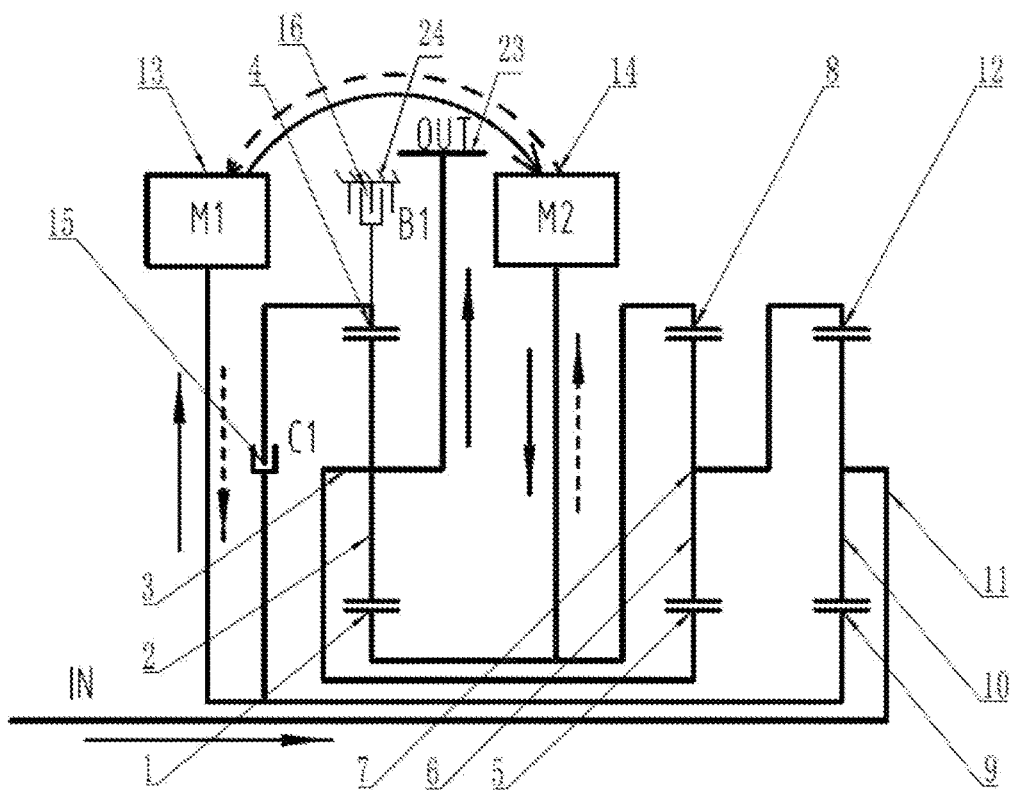
FIG. 4 is a power transmission route diagram of the hybrid driving system provided by the first embodiment of the present disclosure in a second E-CVT mode.

The first clutch 15 is engaged, and the first brake 16 is disengaged to realize the first E-CVT mode. This mode is the composite power splitting mode, when the speed ratio is between two mechanical point speed ratios in the second E-CVT mode, the transmission efficiency is high, so this mode is suitable for medium and high vehicle speed sections. In this mode, the engine performs driving, the first motor 13 performs driving or generates electricity, and the second motor 14 performs driving or generates electricity. In general, when the vehicle speed is close to the low speed section, the second motor 14 generates electricity, the first motor 13 performs driving, and the electricity generated by the second motor 14 is directly used for the driving of the first motor 13. When the vehicle speed is close to the high speed section, the first motor 13 generates electricity, the second motor 14 performs driving, and the electricity generated by the first motor 13 is directly used for the driving of the second motor 14. The specific power transmission route is as shown in FIG. 4. At this time, the two mechanical point speed ratios are respectively as follows: the first mechanical point speed ratio $i1=K3*(K1*K2+K2+1)/(1+K2)/(1+K3)$, and the second mechanical point speed ratio $i2=(K1*K3+(1+K1)*(1+K2))/K1/(1+K2)/(1+K3)$.

(4) The Engine Direct Drive/Parallel Mode

Figure 5:
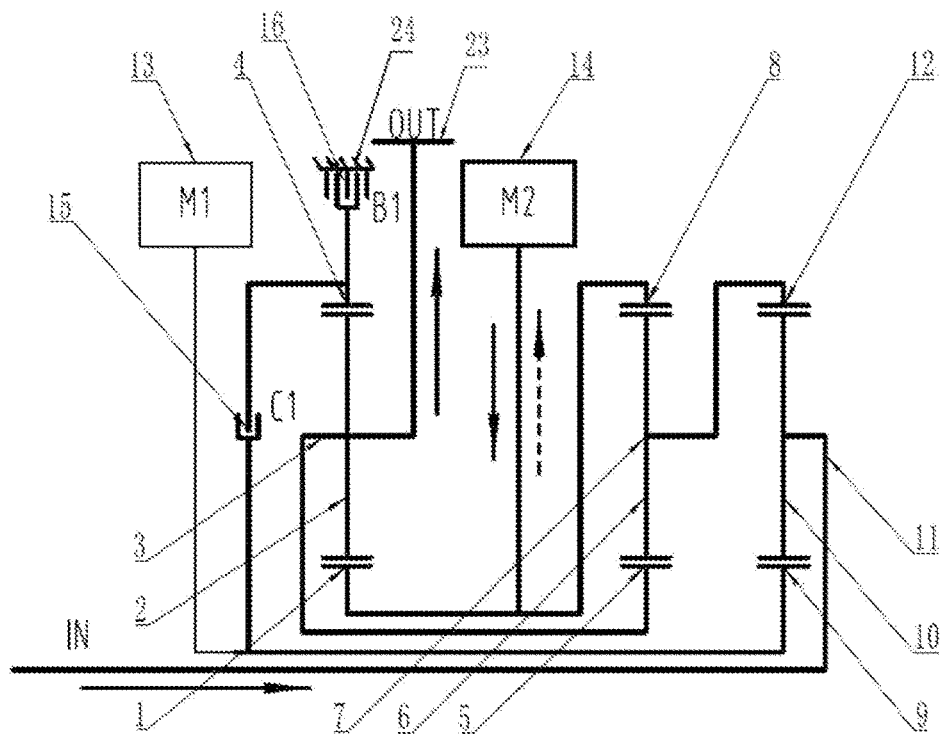
FIG. 5 is a power transmission route diagram of the hybrid driving system provided by the first embodiment of the present disclosure in an engine direct drive/parallel mode.

The first clutch 15 and the first brake 16 are engaged to realize the engine direct drive/parallel engine mode. In this mode, the first motor 13 does not participate in working, the engine performs driving, and the second motor 14 performs driving or generates electricity. At this time, whether the second motor 14 is used as a generator or a driving motor depends on the specific requirements of the operating conditions of the vehicle and the engine. For example, when the power provided by the engine is insufficient, the second motor 14 can provide an additional torque to realize a parallel driving mode so as to improve the power of the system. When the engine is operating in an economic area, and when the output power is excessive, the second motor 14 is used as a generator. The specific power transmission route is as shown in FIG. 5, and the corresponding transmission ratio is: $i=K3*(1+K2+K1*K2)/(1+K2)/(1+K3)$.

(5) The Braking Energy Recovery Mode

Figure 6:
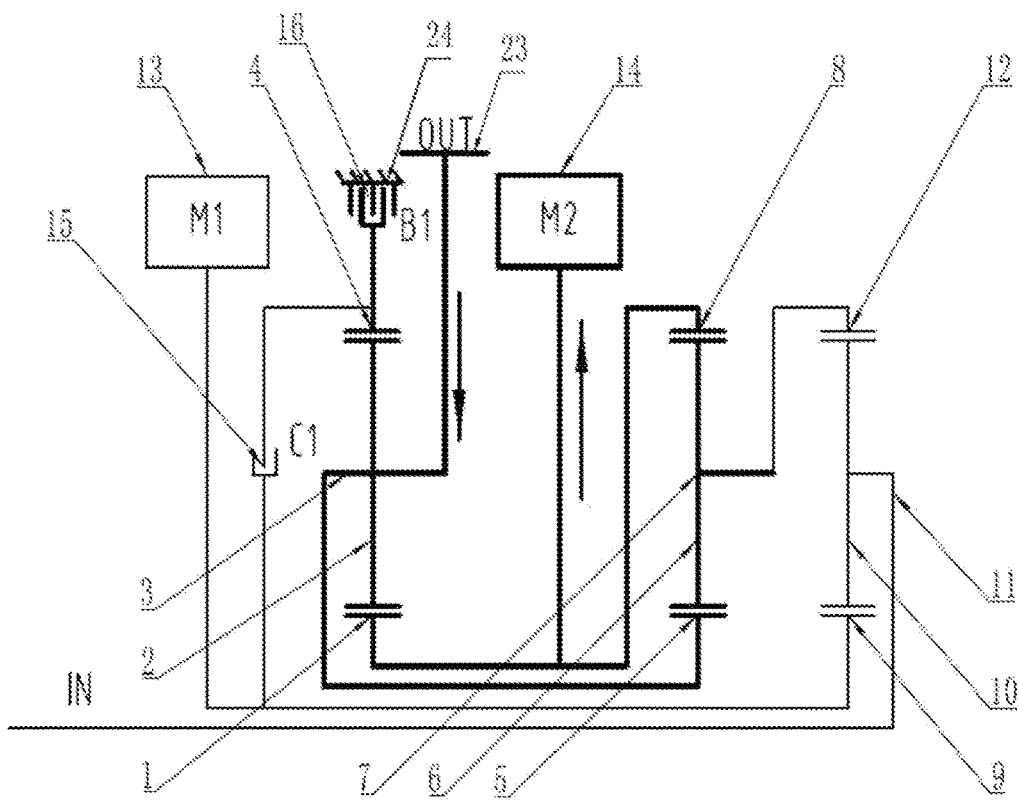
FIG. 6 is a power transmission route diagram of the hybrid driving system provided by the first embodiment of the present disclosure in a braking energy recovery mode.

When a vehicle travelling at a high speed is braked for a long time, the first brake 16 is engaged, and the first clutch 15 is disengaged to realize the braking energy recovery mode. In this mode, the engine and the first motor 13 do not participate in working, the second motor 14 generates electricity, and the generated electric energy is stored in a battery through a power converter. This mode corresponds to a reverse process of the 2-gear pure electric mode. The specific power transmission route is as shown in FIG. 6, and the corresponding transmission ratio is: $i=K1/(K2+1)$.

(6) The First Engine Restarting Mode

If the battery power is insufficient when the vehicle is operating in the pure electric mode, when the long-term braking process is about to be completed, or when the engine needs to get involved again for other reasons, only the first brake 16 needs to be engaged to restart the engine. Specifically, when the output power of the hybrid driving system in the pure electric mode is insufficient to meet the driving power demand of the vehicle or the battery power is relatively low, the engine is restarted to establish the first engine restarting mode. When the braking process in the braking energy recovery mode is about to be completed, the engine is restarted to establish the second engine restarting mode.

When the output power of the hybrid driving system in the 1-gear pure electric mode is insufficient to meet the driving power demand of the vehicle or the battery power is relatively low, the engine is restarted to establish the first engine restarting mode.

Figure 7:
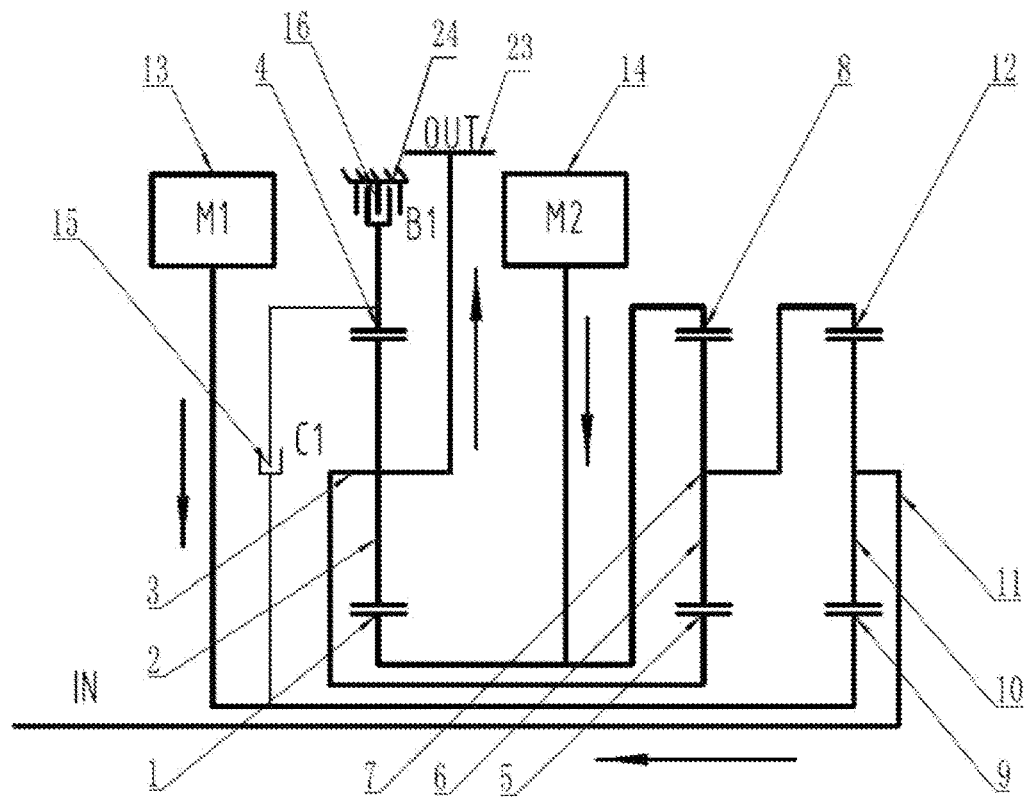
FIG. 7 is a power transmission route diagram of the hybrid driving system provided by the first embodiment of the present disclosure in a first engine restarting mode.

In the first engine restarting mode, according to the power demand, either the first motor 13 or the second motor 14 can be used as the electromotor to restart the engine, or both the first motor 13 and the second motor 14 can be used as the electromotors to restart the engine. The power transmission route in the first engine restarting mode is as shown in FIG. 7.

(7) The Second Engine Restarting Mode

Figure 8:
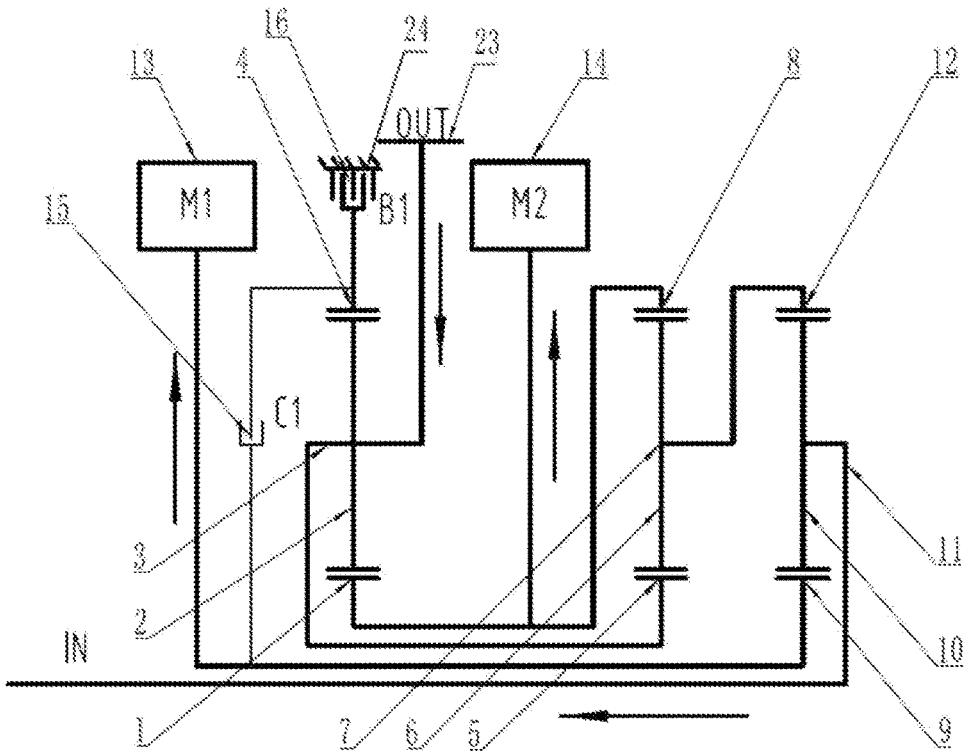
FIG. 8 is a power transmission route diagram of the hybrid driving system provided by the first embodiment of the present disclosure in a second engine restarting mode.

When the output power of the 2-gear pure electric mode of the hybrid driving system in the braking energy recovery mode is insufficient to meet the driving power demand of the vehicle or the battery power is relatively low, the engine is restarted to establish the second engine restarting mode. In the second engine restarting mode, according to the power demand, either the first motor 13 or the second motor 14 can be used as the electromotor to restart the engine, or both the first motor 13 and the second motor 14 can be used as the electromotors to restart the engine. The power transmission route in the second engine restarting mode is as shown in FIG. 8.

The hybrid driving system in the first embodiment has the following advantages:

(1) Two E-CVT modes (the first E-CVT mode and the second E-CVT mode) are realized. The first E-CVT mode (the input splitting mode) is used at the low speed section, and the second E-CVT mode (the composite splitting mode) is used at the medium and high speed sections, so that the system can obtain transmission efficiency as high as possible.

(2) The pure electric mode is realized.

(3) Working modes of multiple fixed speed ratios are realized, the electric power loss is reduced, the transmission efficiency is improved, the stalling of the motors can be eliminated by introducing the fixed speed ratios, the losses of the motors are reduced, and the lives of the motors are prolonged.

(4) One engine direct drive/parallel mode is realized.

(5) The braking energy recovery mode is realized.

(6) The engine restarting modes of two fixed speed ratios (the first engine restarting mode and the second engine restarting mode) are realized, so that the engine can be started at any time on demand in the pure electric mode or the braking energy recovery mode at each speed section.

Referring to FIG. 9 to FIG. 33, a hybrid driving system provided by a second embodiment of the present disclosure is shown, including an engine (not shown in the figures), an input element 20, an output element 23, a box body 24, a first motor 13, a second motor 14, a first planet row, a second planet row, a third planet row, a first clutch 15, a second clutch 17, a third clutch 18, a first brake 16 and a second brake 19.

In the present embodiment, the first planet row, the second planet row and the third planet row are all single planet rows (simple planet rows).

The first planet row includes a first sun gear 1, a first planet gear 2, a first gear ring 4 and a first planet carrier 3, the first sun gear 1 is in external meshing transmission with the first planet gear 2, the first planet gear 2 is in internal meshing transmission with the first gear ring 4, and the first planet gear 2 is rotatably supported on the first planet carrier 3 through a rolling bearing or a sliding bearing.

The second planet row includes a second sun gear 5, a second planet gear 6, a second gear ring 8 and a second planet carrier 7, the second sun gear 5 is in external meshing transmission with the second planet gear 6, the second planet gear 6 is in internal meshing transmission with the second gear ring 8, and the second planet gear 6 is rotatably supported on the second planet carrier 7 through a rolling bearing or a sliding bearing.

The third planet row includes a third sun gear 9, a third planet gear 10, a third gear ring 12 and a third planet carrier 11, the third sun gear 9 is in external meshing transmission with the third planet gear 10, the third planet gear 10 is in internal meshing transmission with the third gear ring 12, and the third planet gear 10 is rotatably supported on the third planet carrier 11 through a rolling bearing or a sliding bearing.

Figure 9:
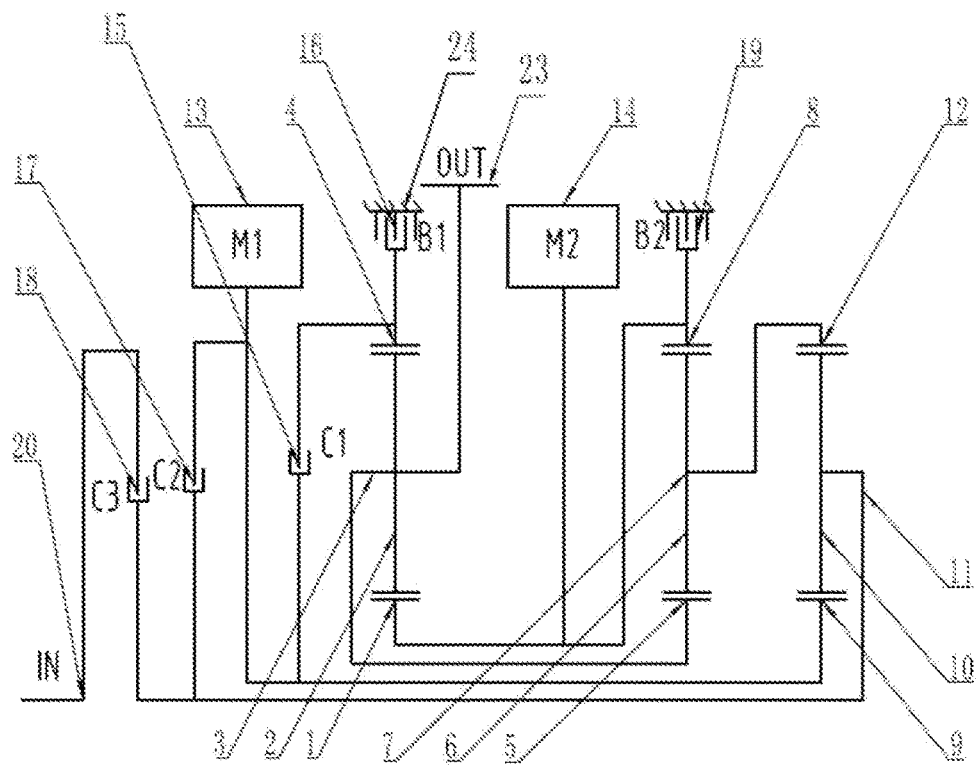
FIG. 9 is a schematic diagram of a hybrid driving system provided by a second embodiment of the present disclosure.

As shown in FIG. 9, the first sun gear 1 and the second gear ring 8 are both connected to the second motor 14, the first planet carrier 3 is fixedly connected to the second sun gear 5, the second planet carrier 7 is fixedly connected to the third gear ring 12, the third sun gear 9 is connected to the first motor 13, the input element 20 is connected between the engine and the third planet carrier 11, and the output element 23 is connected to the first planet carrier 3. The fixed connection here can be spline connection, welding or integral formation. That is, the first sun gear 1 and the second gear ring 8 are splined, welded or integrally formed with the rotor of the second motor 14, the first planet carrier 3 is splined, welded or integrally formed with the second sun gear 5, the second planet carrier 7 is splined, welded or integrally formed with the third gear ring 12, and the third sun gear 9 is splined, welded or integrally formed with the rotor of the first motor 13.

As shown in FIG. 9, the first gear ring 4 is connected to the third sun gear 9 through the first clutch 15, the first gear ring 4 is connected to the box body 24 through the first brake 16, the second gear ring 8 is connected to the box body 24 through the second brake 19, and the second clutch 17 is connected between the third sun gear 9 and the third planet carrier 11.

The function of the second clutch 17 is to realize the integral rotation of the third planet row. Therefore, the second clutch 17 is connected between any two of the third sun gear 9, the third planet carrier 11 and the third gear ring 12.

In the present embodiment, the input element 20 is connected to the third planet carrier 11 through the third clutch 18.

The function of the clutch is to realize the fixed connection and disengagement between two members through engagement or disengagement. In the present embodiment, a multi-disc wet clutch or a dog clutch (Dog Clutch) can be used. That is, the first clutch 15, the second clutch 17 and the third clutch 18 are multi-disc wet clutches or dog clutches.

The function of the brake is to realize the connection or separation of the member and the box body 24 by engaging or disengaging to brake or separate the member. In the present embodiment, a drum brake, a multi-disc wet brake, a multi-mode clutch or a one-way clutch can be used. That is, the first brake 16 and the second brake 19 are drum brakes, multi-disc wet brakes, multi-mode clutches, or one-way clutches.

According to the hybrid driving system in the second embodiment of the present disclosure, a basic double-planet-row planet gear configuration is provided through the planet row mechanical structure and the reasonable layout of multiple operating elements (the first clutch 15, the second clutch 17, the third clutch 18, the first brake 16 and the second brake 19), which can realize three E-CVT working modes to obtain higher transmission efficiency. By selectively engaging one or more of the first clutch 15, the second clutch 17, the third clutch 18, the first brake 16 and the second brake 19, more working modes can be realized to further obtain higher transmission efficiency.

The hybrid driving system in the present embodiment has multiple working modes, specifically: two E-CVT modes (a first E-CVT mode and a second E-CVT mode), 5 gears of pure electric modes (a 1-gear pure electric mode, a 2-gear pure electric mode, a 3-gear pure electric mode, a 4-gear pure electric mode and a 5-gear pure electric mode), 4 gears of engine direct drive/parallel modes (a 1-gear engine direct drive/parallel mode, a 2-gear engine direct drive/parallel mode, a 3-gear engine direct drive/parallel mode and a 4-gear engine direct drive/parallel mode), 5 braking energy recovery modes (a first braking energy recovery mode, a second braking energy recovery mode, a third braking energy recovery mode, a fourth braking energy recovery mode and a fifth braking energy recovery mode), and 10 engine restarting modes (a first engine restarting mode, a second engine restarting mode, a third engine restarting mode, a fourth engine restarting mode, a fifth engine restarting mode, a sixth engine restarting mode, a seventh engine restarting mode, an eighth engine restarting mode, a ninth engine restarting mode and a tenth engine restarting mode). The operating logic in each working mode is as shown in Table 2.

TABLE 2

Working mode operating logic table (second embodiment)

| Working mode | First clutch | Second clutch | Third clutch | First brake | Second brake | Speed ratio or mechanical point speed ratio (transmission ratio) |
|---|---|---|---|---|---|---|
| First E-CVT mode | | | • | • | | $K3 * (K1 * K2 + K2 + 1)/(1 + K2)/(1 + K3)$ |
| Second E-CVT mode | • | | | • | | $i1 = K3 * (K1 * K2 + K2 + 1)/(1 + K2)/(1 + K3)$<br>$i2 = (K1 * K3 + (1 + K1) * (1 + K2))/K1/(1 + K2)$ |
| 1-gear pure electric mode | | • | | | • | $(K1 * K2 + K2 + 1)/(K2 + 1)$ |
| 2-gear pure electric mode | | • | | • | | $K1 + 1$ |
| 3-gear pure electric mode | • | | | • | | $K1 + 1$ |

TABLE 2-continued

Working mode operating logic table (second embodiment)

| Working mode | First clutch | Second clutch | Third clutch | First brake | Second brake | Speed ratio or mechanical point speed ratio (transmission ratio) |
|---|---|---|---|---|---|---|
| 4-gear pure electric mode | • | | | | • | $(K1 + 1)/K1$ |
| 5-gear pure electric mode | • | • | | | | 1 |
| 1-gear engine direct drive/parallel mode | | • | • | • | | $(K1 * K2 + K2 + 1)/(K2 + 1)$ |
| 2-gear engine direct drive/parallel mode | • | | • | • | | $K3 * (1 + K2 + K1 * K2)/(1 + K2)/(1 + K3)$ |
| 3-gear engine direct drive/parallel mode | • | • | • | | | 1 |
| 4-gear engine direct drive/parallel mode | • | | • | | • | $(1 + K1 + K2 + K1 * K2 + K1 * K3)/K1/(1 + K2)/(1 + K3)$ |
| First braking energy recovery mode | | • | | • | | $(K2 + 1)/(K1 * K2 + K2 + 1)$ |
| Second braking energy recovery mode | | • | | • | | $1/(K1 + 1)$ |
| Third braking energy recovery mode | • | | | • | | $1/(K1 + 1)$ |
| Fourth braking energy recovery mode | • | | | | • | $K1/(1 + K1)$ |
| Fifth braking energy recovery mode | • | • | | | | 1 |
| First engine restarting mode | | • | • | • | | |
| Second engine restarting mode | | • | • | • | | |
| Third engine restarting mode | • | | • | • | | |
| Fourth engine restarting mode | • | | • | | • | |
| Fifth engine restarting mode | • | • | • | | | |
| Sixth engine restarting mode | • | | • | • | | |
| Seventh engine restarting mode | | • | • | • | | |
| Eight engine restarting mode | • | | • | • | | |
| Ninth engine restarting mode | • | | • | | • | |
| Tenth engine restarting mode | • | • | • | | | |

In Table 2, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

The power transmission routes (lines on the transmission routes are thickened) in various working modes in the second embodiment will be described in detail below in conjunction with FIG. 10 to FIG. 33.

(1) The 1-Gear Pure Electric Mode

Figure 10:
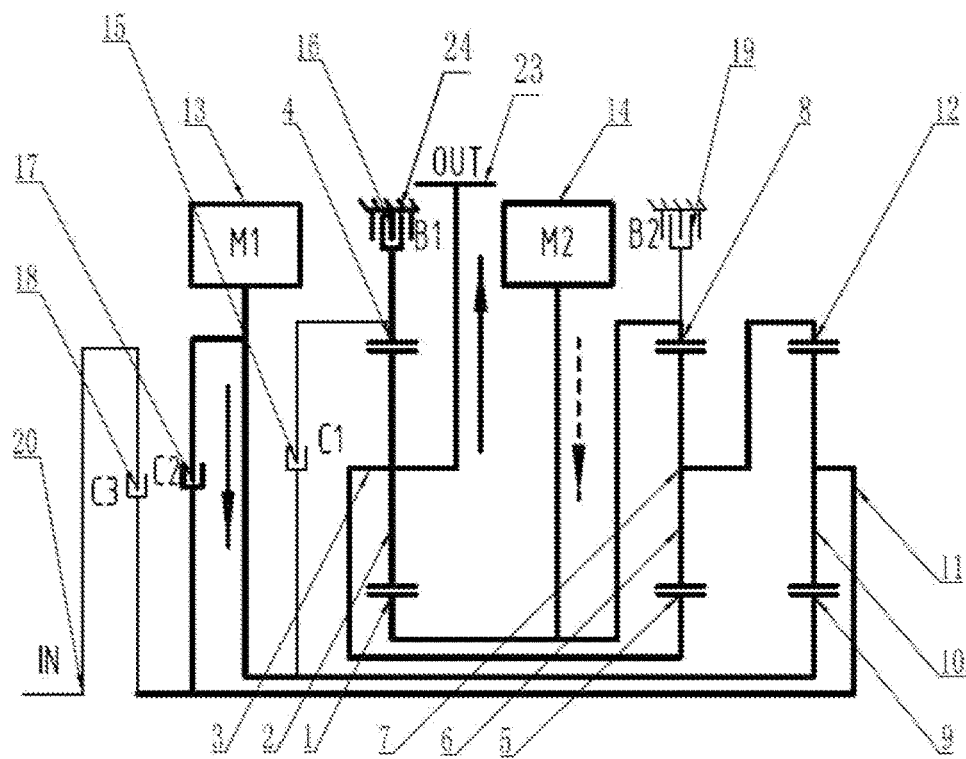
FIG. 10 is a power transmission route diagram of the hybrid driving system provided by the second embodiment of the present disclosure in a 1-gear pure electric mode.

The second clutch 17 and the first brake 16 are engaged, and the first clutch 15, the third clutch 18 and the second brake 19 are disengaged to realize the 1-gear pure electric mode of the first gear. In this mode, the engine does not participate in working, the first motor 13 and the second motor 14 are both driving motors, the first motor 13 performs main driving and the second motor 14 performs auxiliary driving, the first motor 13 performs main driving to realize large speed ratio starting, and when the output power of the main driving motor (the first motor 13) is insufficient to drive the vehicle, the second motor 14 performs auxiliary driving. Herein, the main driving and the auxiliary driving are distinguished by the output power when the first motor 13 and the second motor 14 serve as the driving motors, that is, the motor with the greater output power in the first motor 13 and the second motor 14 performs the main driving, and the motor with the smaller output power in the first motor 13 and the second motor 14 performs the auxiliary driving. In this mode, the third clutch 18 is disengaged to reduce the loss caused by the inertia of the engine. The power transmission route in this mode is as shown in FIG. 10, and the transmission ratio is: $i=(K1*K2+K2+1)/(K2+1)$.

(2) The 2-Gear Pure Electric Mode

Figure 11:
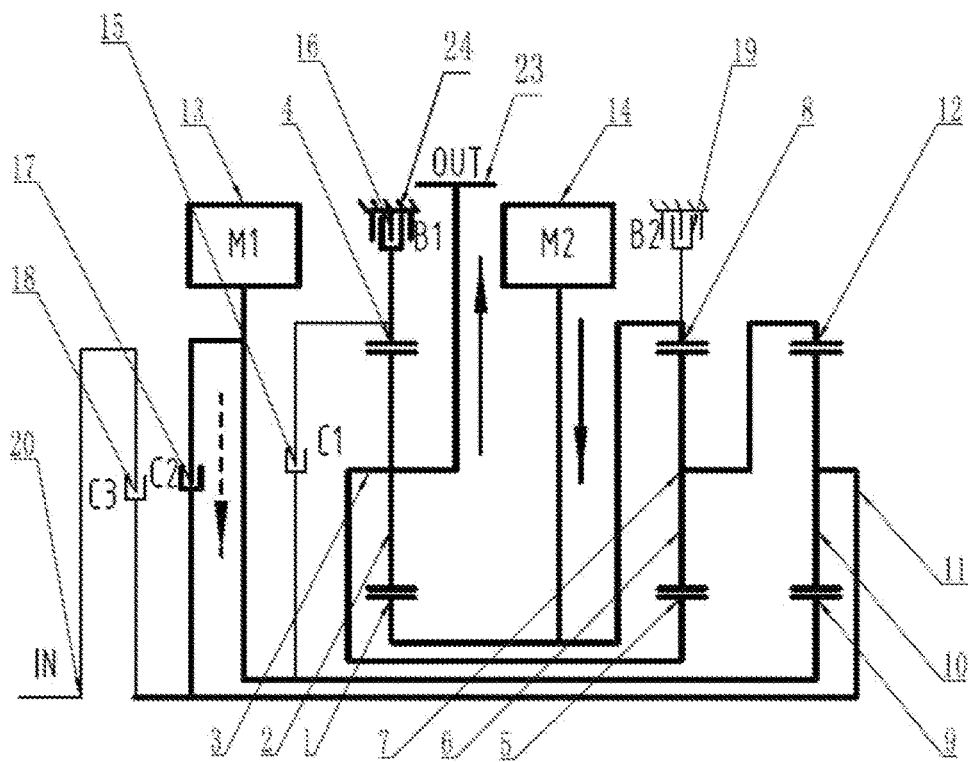
FIG. 11 is a power transmission route diagram of the hybrid driving system provided by the second embodiment of the present disclosure in a 2-gear pure electric mode.

The second clutch 17 and the first brake 16 are engaged, and the first clutch 15, the third clutch 18 and the second brake 19 are disengaged to realize the 2-gear pure electric mode. In this mode, the engine does not participate in working, the first motor 13 and the second motor 14 are both driving motors, the first motor 13 performs auxiliary driving and the second motor 14 performs main driving, the second motor 14 performs main driving to realize large speed ratio starting, and when the output power of the main driving motor (the second motor 14) is insufficient to drive the vehicle, the first motor 13 performs auxiliary driving. In this mode, the third clutch 18 is disengaged to reduce the loss caused by the inertia of the engine. The power transmission route in this mode is as shown in FIG. 11, and the transmission ratio is: $i=K1+1$.

(3) The 3-Gear Pure Electric Mode

Figure 12:
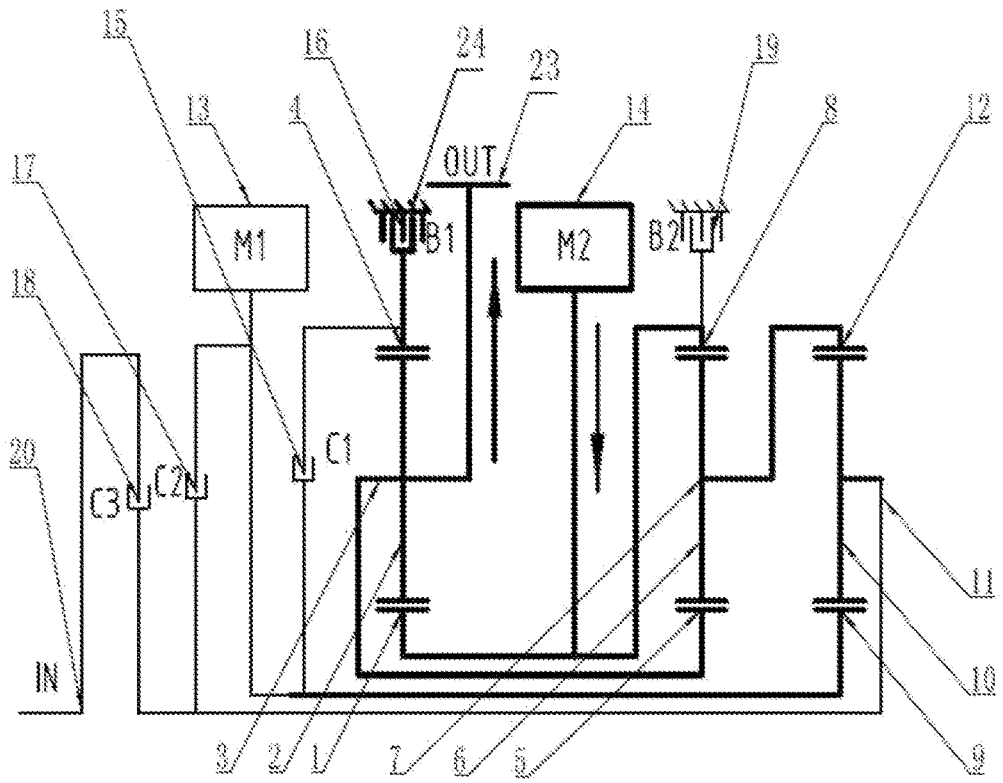
FIG. 12 is a power transmission route diagram of the hybrid driving system provided by the second embodiment of the present disclosure in a 3-gear pure electric mode.

The first clutch 15 and the first brake 16 are engaged, and the second clutch 17, the third clutch 18 and the second brake 19 are disengaged to realize the 3-gear pure electric mode. In this mode, the engine and the first motor 13 do not participate in working, and the second motor 14 performs driving. The difference with the 2-gear pure electric mode is that only the second motor 14 can be used, when its power meets the requirements of the vehicle, compared with the 2-gear pure electric mode, the dragging can be reduced, and the transmission efficiency can be improved. In this mode, the third clutch 18 is disengaged to reduce the loss caused by the inertia of the engine. The power transmission route in this mode is as shown in FIG. 12, and the transmission ratio is: $i=K1+1$.

(4) The 4-Gear Pure Electric Mode

Figure 13:
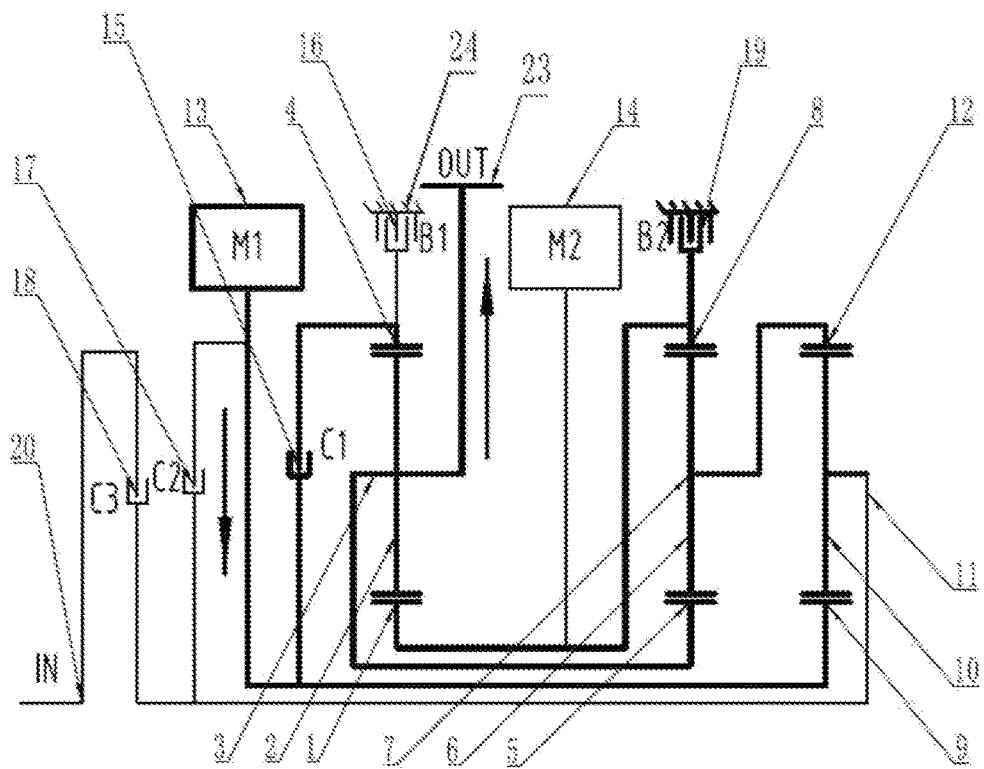
FIG. 13 is a power transmission route diagram of the hybrid driving system provided by the second embodiment of the present disclosure in a 4-gear pure electric mode.

The first clutch 15 and the second brake 19 are engaged, and the second clutch 17, the third clutch 18 and the first brake 16 are disengaged to realize the 4-gear pure electric mode. In this mode, the engine and the second motor 14 do not participate in working, and the first motor 13 performs driving. In this mode, the third clutch 18 is disengaged to reduce the loss caused by the inertia of the engine. The power transmission route in this mode is as shown in FIG. 13, and the transmission ratio is: $i=(K1+1)/K1$.

(5) The 5-Gear Pure Electric Mode

Figure 14:
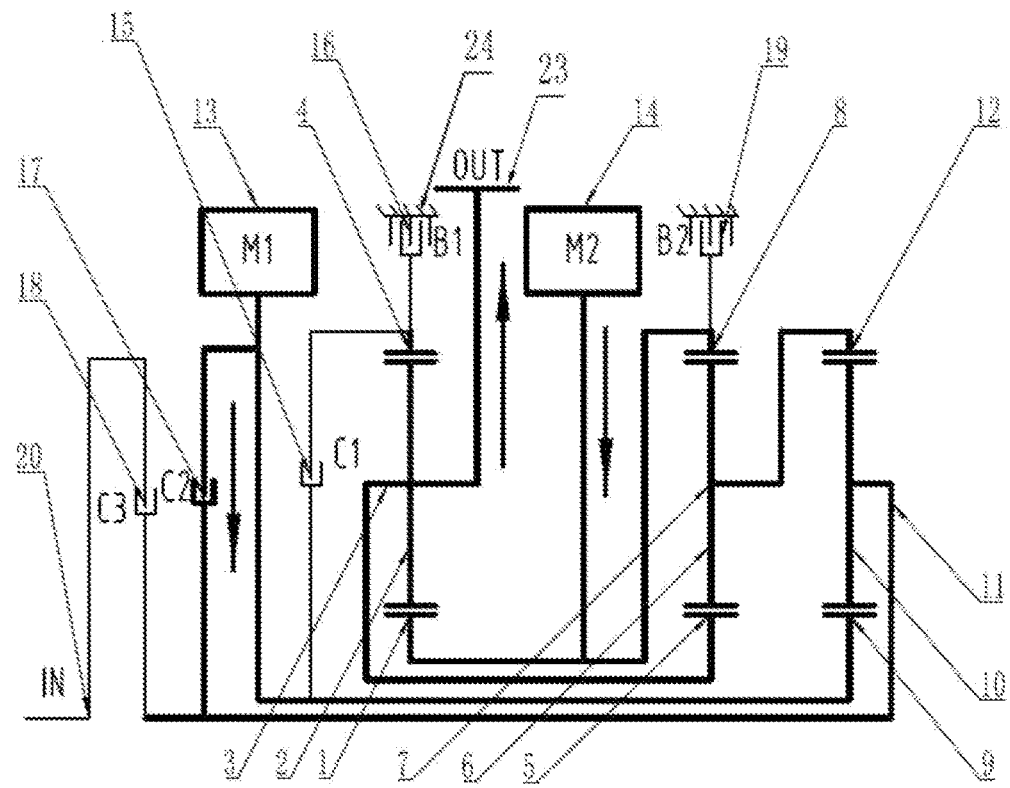
FIG. 14 is a power transmission route diagram of the hybrid driving system provided by the second embodiment of the present disclosure in a 5-gear pure electric mode.

The first clutch 15 and the second clutch 17 are engaged, and the third clutch 18, the first brake 16 and the second brake 19 are disengaged to realize the 5-gear pure electric mode. In this mode, the engine does not participate in working, the first motor 13 and the second motor 14 are both driving motors, both the first motor 13 and the second motor 14 can be used as main driving motors, that is, one of the first motor 13 and the second motor 14 is used as a main driving motor, and the other is used as an auxiliary driving motor. When the output power of one of the motors is insufficient to drive the vehicle, the output power of the other motor provides assistance. In this mode, the third clutch 18 is disengaged to reduce the loss caused by the inertia of the engine. The power transmission route in this mode is as shown in FIG. 14. The 5-gear pure electric mode is a direct gear, and its transmission ratio is 1.

(6) The First E-CVT Mode

The first brake 16 and the third clutch 18 are engaged, and the first clutch 15, the second clutch 17 and the second brake 19 are disengaged to realize the first E-CVT mode. The first E-CVT mode is the input power splitting mode, which has high transmission efficiency when the speed ratio is lower than the mechanical point speed ratio in this mode, so it is suitable for low-speed working conditions. In this mode, the engine and the second motor 14 perform driving together, and the first motor 13 generates electricity for the driving of the second motor 14. The power transmission route is the same as the power transmission route in the first E-CVT mode in the first embodiment. The mechanical point speed ratio in this mode is: $i=K3*(K1*K2+K2+1)/(1+K2)/(1+K3)$.

(7) The Second E-CVT Mode

The first brake 16 and the third clutch 18 are engaged, and the first clutch 15, the second clutch 17 and the second brake 19 are disengaged to realize the second E-CVT mode. This mode is the composite power splitting mode, which has high transmission efficiency when the speed ratio is between the two mechanical point speed ratios in the second E-CVT mode, so it is suitable for medium and high speed sections. In this mode, the engine performs driving, the first motor 13 performs driving or generates electricity, and the second motor 14 performs driving or generates electricity. Generally, when the vehicle speed is close to the low speed section, the second motor 14 generates electricity, the first motor 13 performs driving, and the electricity generated by the second motor 14 is directly used for the driving of the first motor 13. When the vehicle speed is close to the high speed section, the first motor 13 generates electricity, the second motor 14 performs driving, and the electricity generated by the first motor 13 is directly used for the driving of the second motor 14. The power transmission route is the same as the power transmission route in the second E-CVT mode in the first embodiment. At this time, the two mechanical point speed ratios are respectively as follows: the first mechanical point speed ratio $i1=K3*(K1*K2+K2+1)/(1+K2)/(1+K3)$, and the second mechanical point speed ratio $i2=(K1*K3+(1+K1)*(1+K2))/K1/(1+K2)/(1+K3)$.

(8) The 1-Gear Engine Direct Drive/Parallel Mode

Figures 15, 16:
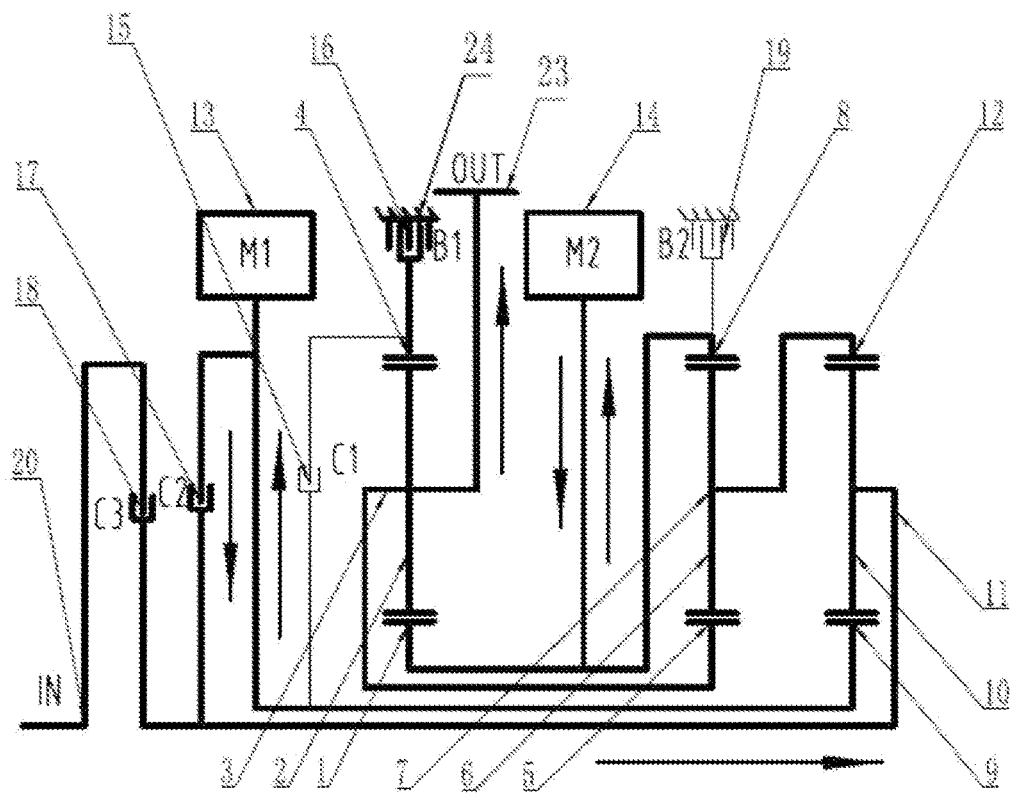
FIG. 15 is a power transmission route diagram of the hybrid driving system provided by the second embodiment of the present disclosure in a 1-gear engine direct drive/parallel mode.
FIG. 16 is a power transmission route diagram of the hybrid driving system provided by the second embodiment of the present disclosure in a 2-gear engine direct drive/parallel mode.

The second clutch 17, the third clutch 18 and the first brake 16 are engaged, and the first clutch 15 and the second brake 19 are disengaged to realize the 1-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The specific power transmission route is as shown in FIG. 15, and the corresponding transmission ratio is: $i=(K1*K2+K2+1)/(K2+1)$.

(9) The 2-Gear Engine Direct Drive/Parallel Mode

The second clutch 17, the third clutch 18 and the first brake 16 are engaged, and the first clutch 15 and the second brake 19 are disengaged to realize the 2-gear engine direct drive/parallel mode. In this mode, the first motor 13 does not participate in working, the engine performs driving, and the second motor 14 generates electricity or performs driving. When the output power of the engine is insufficient, the output power of the second motor 14 provides compensation. When the output power of the engine is excessive, the second motor 14 generates electricity, and the electricity is stored in the battery so as to realize parallel driving. The specific power transmission route is as shown in FIG. 16. The transmission ratio in this mode is the first mechanical point speed ratio in the second E-CVT mode (the composite splitting mode), specifically: $i=K3*(1+K2+K1*K2)/(1+K2)/(1+K3)$.

(10) The 3-Gear Engine Direct Drive/Parallel Mode

Figure 17:
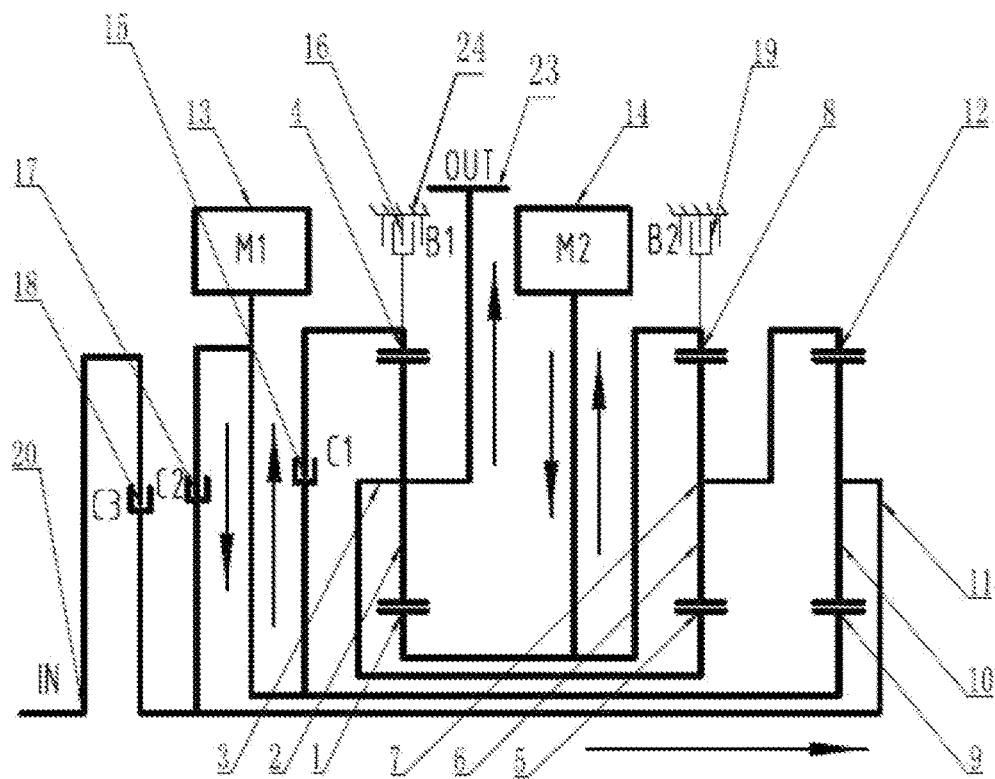
FIG. 17 is a power transmission route diagram of the hybrid driving system provided by the second embodiment of the present disclosure in a 3-gear engine direct drive/parallel mode.

The first clutch 15, the second clutch 17 and the third clutch 18 are engaged, and the first brake 16 and the second brake 19 are disengaged to realize the 3-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The specific power transmission route is as shown in FIG. 17, and its transmission ratio is 1.

(11) The 4-Gear Engine Direct Drive/Parallel Mode

Figure 18:
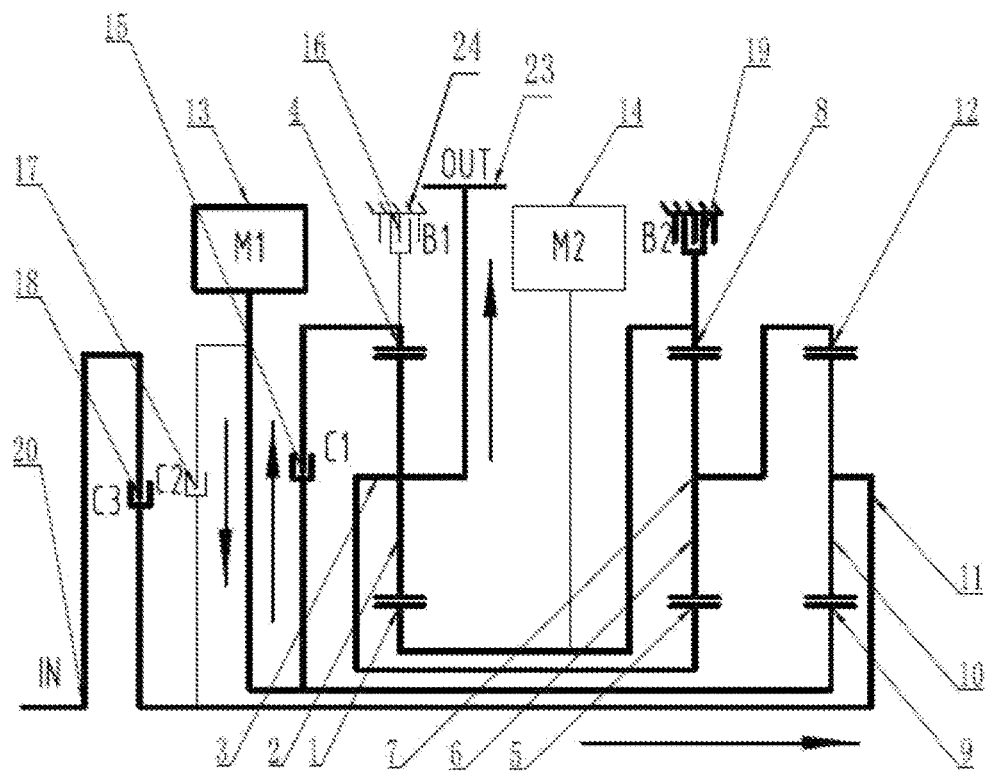
FIG. 18 is a power transmission route diagram of the hybrid driving system provided by the second embodiment of the present disclosure in a 4-gear engine direct drive/parallel mode.

The second clutch 17, the third clutch 18 and the first brake 16 are engaged, and the first clutch 15 and the second brake 19 are disengaged to realize the 4-gear engine direct drive/parallel mode. In this mode, the second motor 14 does not participate in working, the engine performs driving, and the first motor 13 generates electricity or performs driving. When the output power of the engine is insufficient, the output power of the first motor 13 provides compensation. When the output power of the engine is excessive, the first motor 13 generates electricity, and the electricity is stored in the battery so as to realize parallel driving. The specific power transmission route is as shown in FIG. 18. The transmission ratio in this mode is the second mechanical point speed ratio in the second E-CVT mode (the composite splitting mode), specifically: $i=(1+K1+K2+K1*K2+K1*K3)/K1/(1+K2)/(1+K3)$.

(12) The First Braking Energy Recovery Mode

Figure 19:
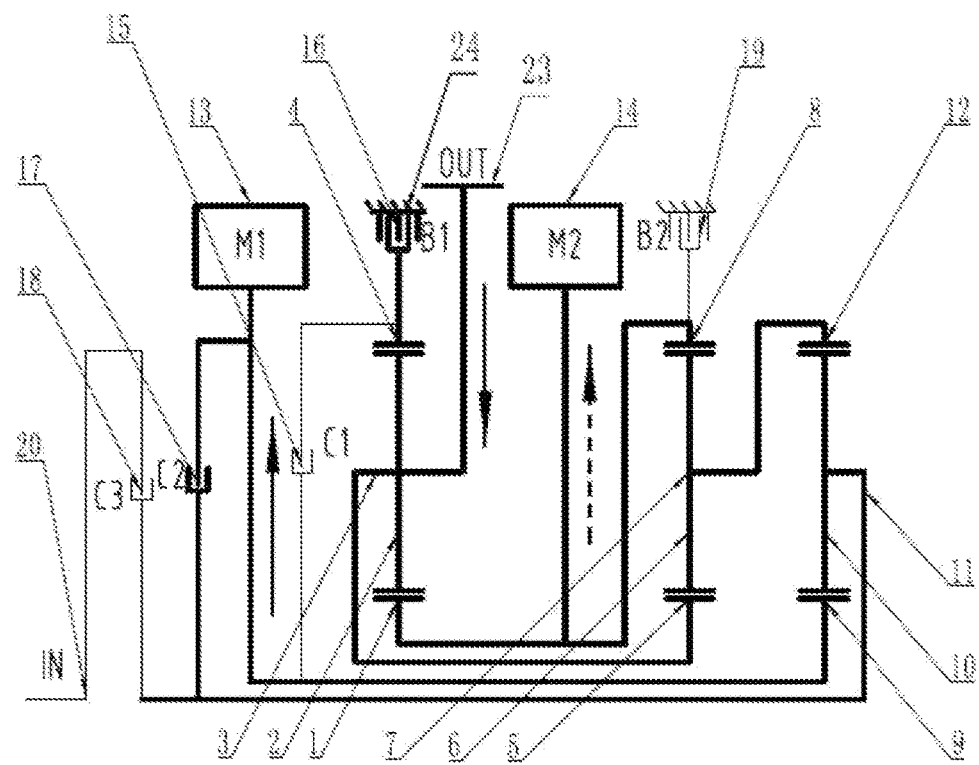
FIG. 19 is a power transmission route diagram of the hybrid driving system provided by the second embodiment of the present disclosure in a first braking energy recovery mode.

The second clutch 17 and the first brake 16 are engaged, and the first clutch 15, the third clutch 18 and the second brake 19 are disengaged to realize the first braking energy recovery mode, and this mode corresponds to the inverse process of the 1-gear pure electric mode. In this mode, the engine does not participate in working, the first motor 13 and the second motor 14 are both generators, the first motor 13 performs main power generation and the second motor 14 performs auxiliary power generation, and when the generated output of the main generator (the first motor 13) is insufficient to absorb all the braking energy, in order to avoid the waste of the braking energy, the second motor 14 performs auxiliary power generation. In this paper, the main power generation and the auxiliary power generation are distinguished by the generated output when the first motor 13 and the second motor 14 are used as generators, that is, the motor with greater generated output in the first motor 13 and the second motor 14 performs main power generation, and the motor with smaller generated output in the first motor 13 and the second motor 14 performs auxiliary power generation. In this mode, the third clutch 18 is disengaged to reduce the loss caused by the inertia of the engine. The specific power transmission route is as shown in FIG. 19, and the corresponding transmission ratio is: $i=(K2+1)/(K1*K2+K2+1)$.

(13) The Second Braking Energy Recovery Mode

Figure 20:
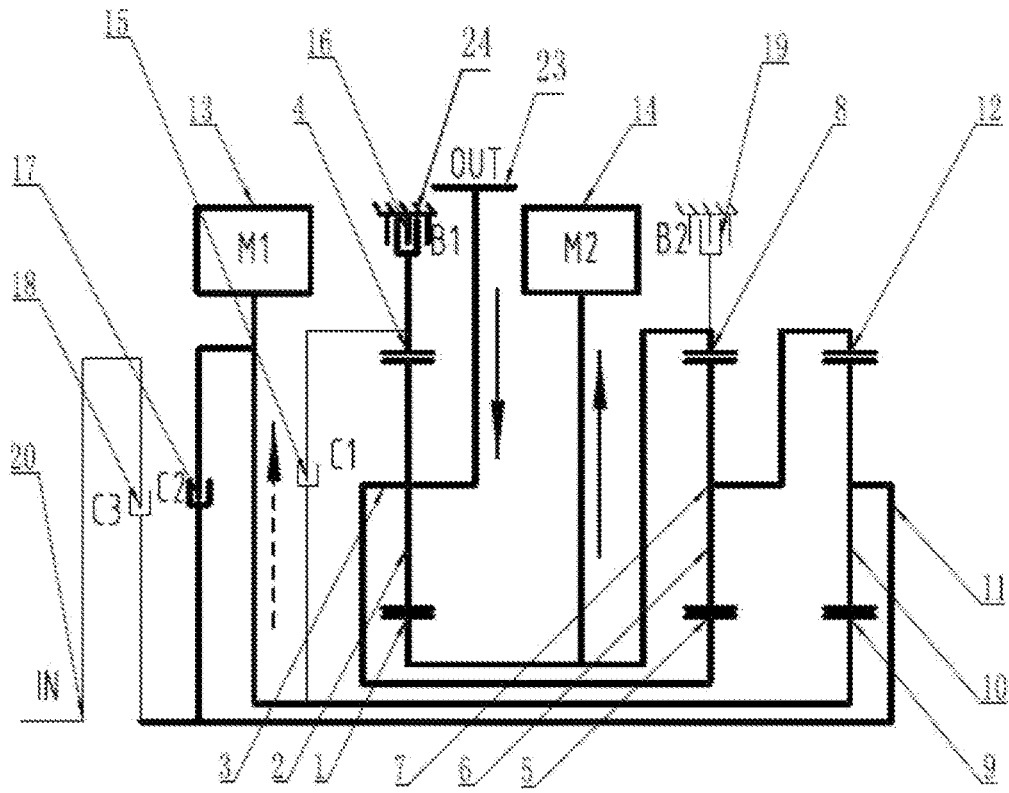
FIG. 20 is a power transmission route diagram of the hybrid driving system provided by the second embodiment of the present disclosure in a second braking energy recovery mode.

The second clutch 17 and the first brake 16 are engaged, and the first clutch 15, the third clutch 18 and the second brake 19 are disengaged to realize the second braking energy recovery mode, and this mode corresponds to the inverse process of the 2-gear pure electric mode. In this mode, the engine does not participate in working, the first motor 13 and the second motor 14 are both generators, the first motor 13 performs auxiliary power generation and the second motor 14 performs main power generation, and when the generated output of the main generator (the second motor 14) is insufficient to absorb all the braking energy, in order to avoid the waste of the braking energy, the first motor 13 performs auxiliary power generation. In this mode, the third clutch 18 is disengaged to reduce the loss caused by the inertia of the engine. The specific power transmission route is as shown in FIG. 20, and the corresponding transmission ratio is: $i=1/(K1+1)$.

(14) The Third Braking Energy Recovery Mode

Figure 21:
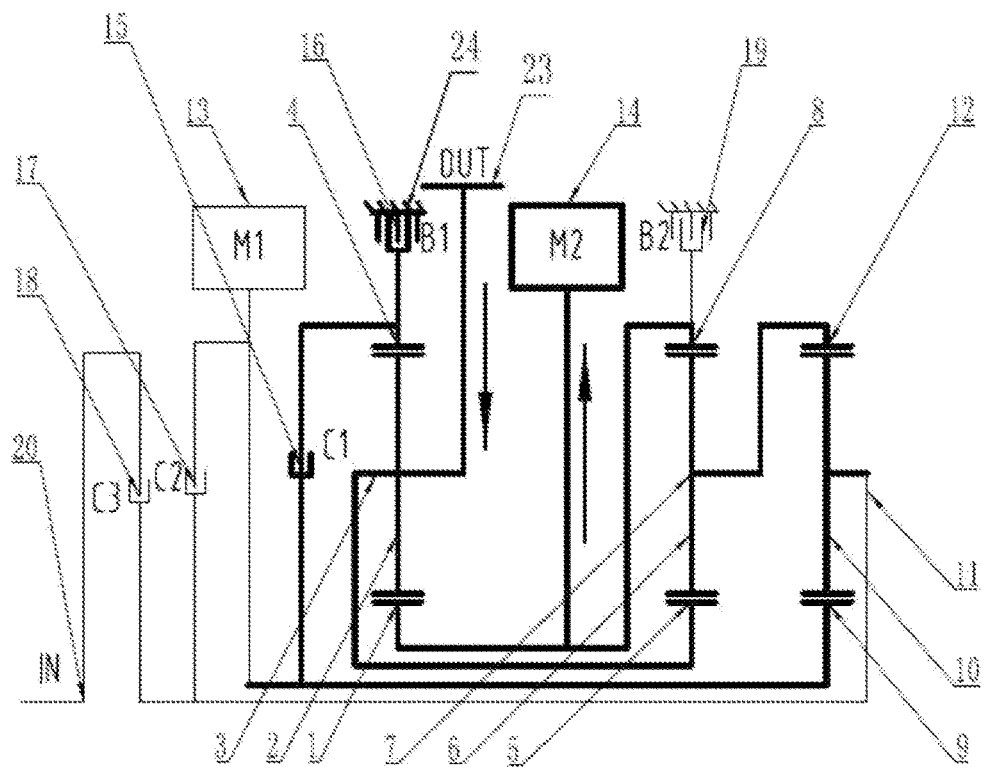
FIG. 21 is a power transmission route diagram of the hybrid driving system provided by the second embodiment of the present disclosure in a third braking energy recovery mode.

The first clutch 15 and the first brake 16 are engaged, and the second clutch 17, the third clutch 18 and the second brake 19 are disengaged to realize the third braking energy recovery mode, and this mode corresponds to the inverse process of the 3-gear pure electric mode. In this mode, the engine and the first motor 13 do not participate in working, and the second motor 14 generates electricity. The difference with the second braking energy recovery mode is that only the second motor 14 can be used, when its generated output is sufficient to match the braking energy, compared with the second braking energy recovery mode, the dragging can be reduced, and the transmission efficiency can be improved. In this mode, the third clutch 18 is disengaged to reduce the loss caused by the inertia of the engine. The specific power transmission route is as shown in FIG. 21, and the corresponding transmission ratio is: $i=1/(K1+1)$.

(15) The Fourth Braking Energy Recovery Mode

Figure 22:
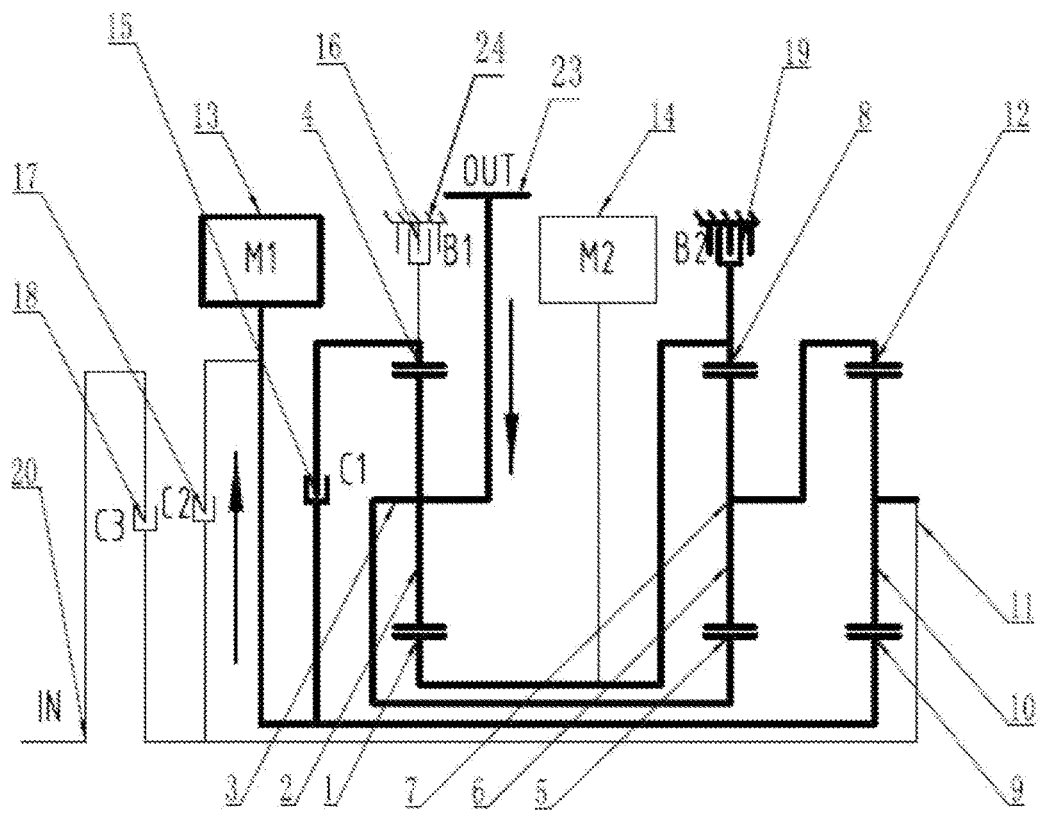
FIG. 22 is a power transmission route diagram of the hybrid driving system provided by the second embodiment of the present disclosure in a fourth braking energy recovery mode.

The first clutch 15 and the second brake 19 are engaged, and the second clutch 17, the third clutch 18 and the first brake 16 are disengaged to realize the fourth braking energy recovery mode, and this mode corresponds to the inverse process of the 4-gear pure electric mode. In this mode, the engine and the second motor 14 do not participate in working, and the first motor 13 generates electricity. The difference with the second braking energy recovery mode is that only the first motor 13 can be used, when its generated output is sufficient to match the braking energy, compared with the second braking energy recovery mode, the dragging can be reduced, and the transmission efficiency can be improved. In this mode, the third clutch 18 is disengaged to reduce the loss caused by the inertia of the engine. The specific power transmission route is as shown in FIG. 22, and the corresponding transmission ratio is: $i=K1/(1+K1)$.

(16) The Fifth Braking Energy Recovery Mode

Figure 23:
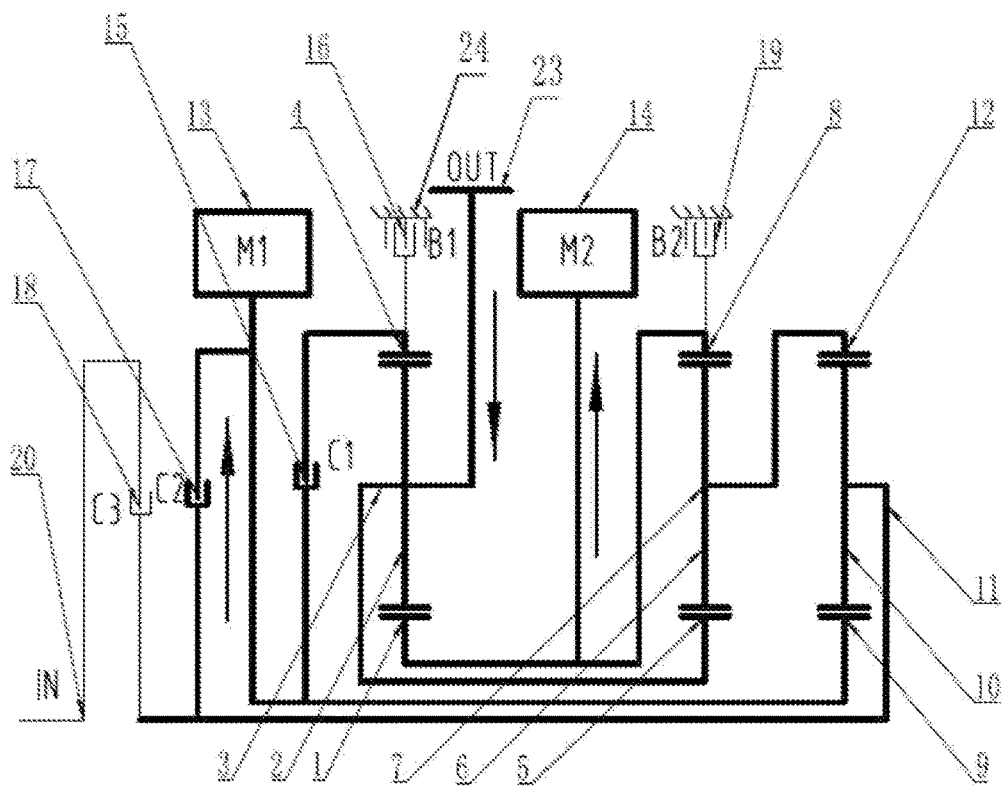
FIG. 23 is a power transmission route diagram of the hybrid driving system provided by the second embodiment of the present disclosure in a fifth braking energy recovery mode.

The first clutch 15 and the second clutch 17 are engaged, and the third clutch 18, the first brake 16 and the second brake 19 are disengaged to realize the fifth braking energy recovery mode, and this mode corresponds to the inverse process of the 5-gear pure electric mode. In this mode, the engine does not participate in working, the first motor 13 and the second motor 14 are both generators, one of the first motor 13 and the second motor 14 performs main power generation, and the other performs auxiliary power generation. When the generated output of one of the first motor 13 and the second motor 14 is insufficient to absorb all the braking energy, in order to avoid the waste of the braking energy, the other motor performs auxiliary power generation. In this mode, the third clutch 18 is disengaged to reduce the loss caused by the inertia of the engine. The specific power transmission route is as shown in FIG. 23, and the corresponding transmission ratio is 1.

(17) The First Engine Restarting Mode

Each pure electric mode and each braking energy recovery mode can correspond to an engine restarting mode.

Specifically, when the power in each pure electric mode is insufficient to meet the driving power demand of the vehicle or the battery power is relatively low, and when the engine must be introduced, the engine restarting mode is used. When the long braking process is about to be completed and the engine needs to be restarted, the engine restarting mode is also used. The third clutch 19 is disengaged in each engine restarting mode.

Figure 24:
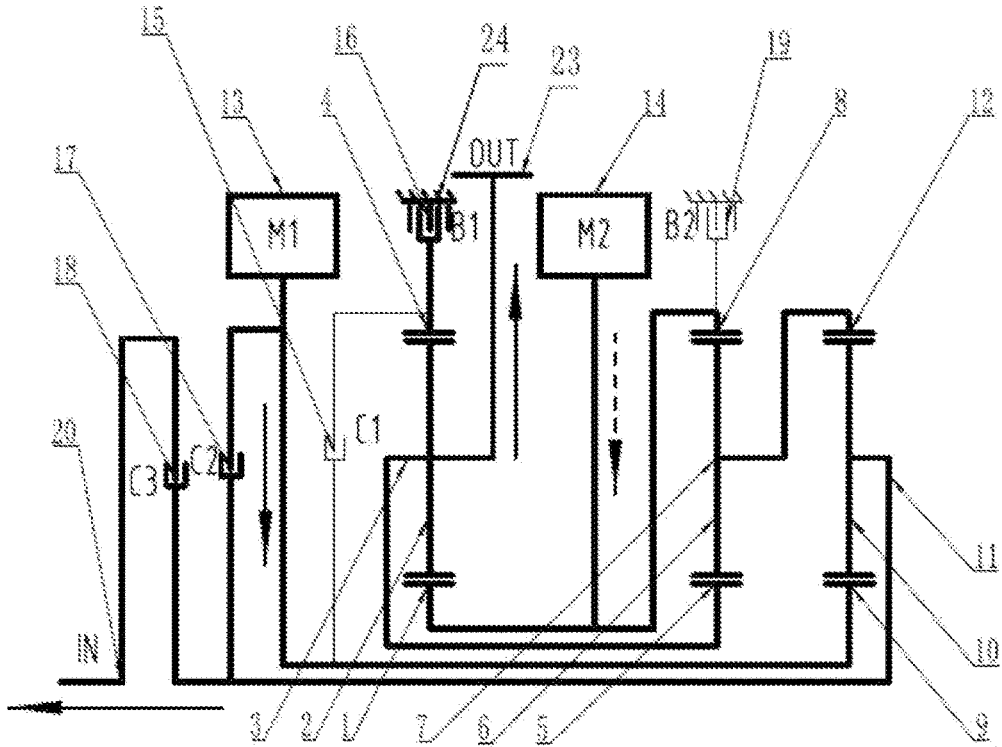
FIG. 24 is a power transmission route diagram of the hybrid driving system provided by the second embodiment of the present disclosure in a first engine restarting mode.

When the output power of the hybrid driving system in the 1-gear pure electric mode is insufficient to meet the driving power demand of the vehicle or the battery power is relatively low, the engine is restarted to establish the first engine restarting mode. When the hybrid driving system is in the first engine restarting mode, and when the power of one motor is insufficient to meet the driving power demand of the vehicle and start the engine, the output power of the other motor is used. The power transmission route in the first engine restarting mode is as shown in FIG. 24.

(18) The Second Engine Restarting Mode

Figure 25:
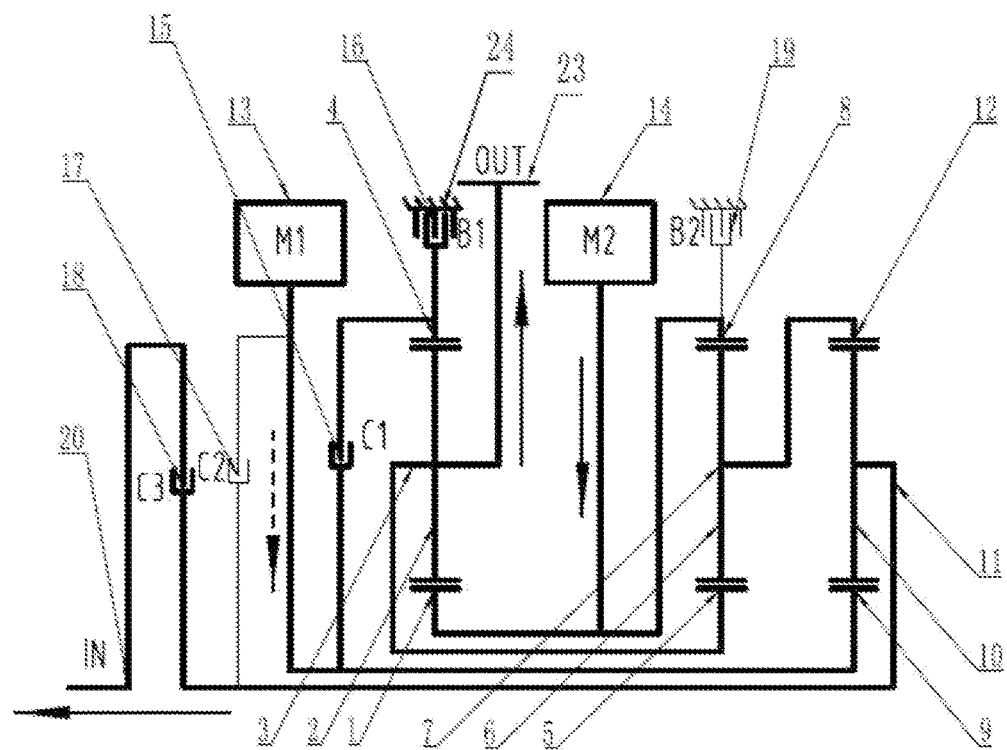
FIG. 25 is a power transmission route diagram of the hybrid driving system provided by the second embodiment of the present disclosure in a second engine restarting mode.

When the output power of the hybrid driving system in the 2-gear pure electric mode is insufficient to meet the driving power demand of the vehicle or the battery power is relatively low, the engine is restarted to establish the second engine restarting mode. When the hybrid driving system is in the second engine restarting mode, and when the power of one motor is insufficient to meet the driving power demand of the vehicle and start the engine, the output power of the other motor is used. The power transmission route in the second engine restarting mode is as shown in FIG. 25.

(19) The Third Engine Restarting Mode

Figure 26:
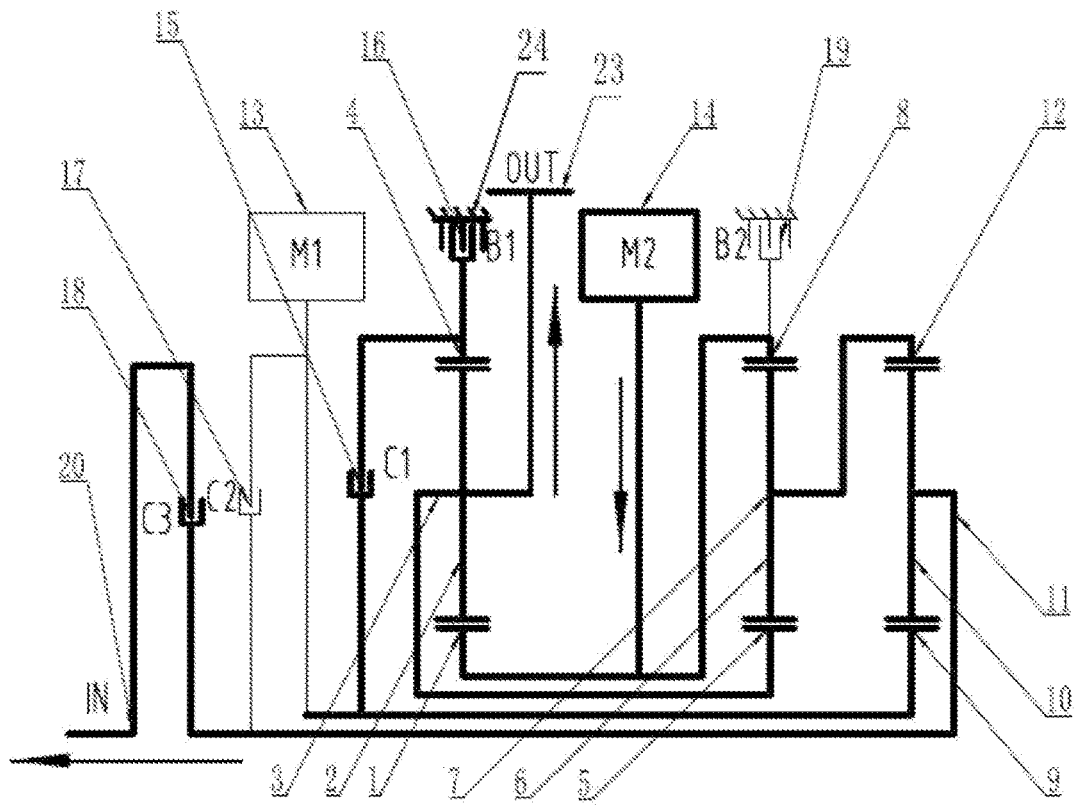
FIG. 26 is a power transmission route diagram of the hybrid driving system provided by the second embodiment of the present disclosure in a third engine restarting mode.

When the output power of the hybrid driving system in the 3-gear pure electric mode is insufficient to meet the driving power demand of the vehicle or the battery power is relatively low, the engine is restarted to establish the third engine restarting mode. When the hybrid driving system is in the third engine restarting mode, and when the power of one motor is insufficient to meet the driving power demand of the vehicle and start the engine, the output power of the other motor is used. The power transmission route in the third engine restarting mode is as shown in FIG. 26.

(20) The Fourth Engine Restarting Mode

Figure 27:
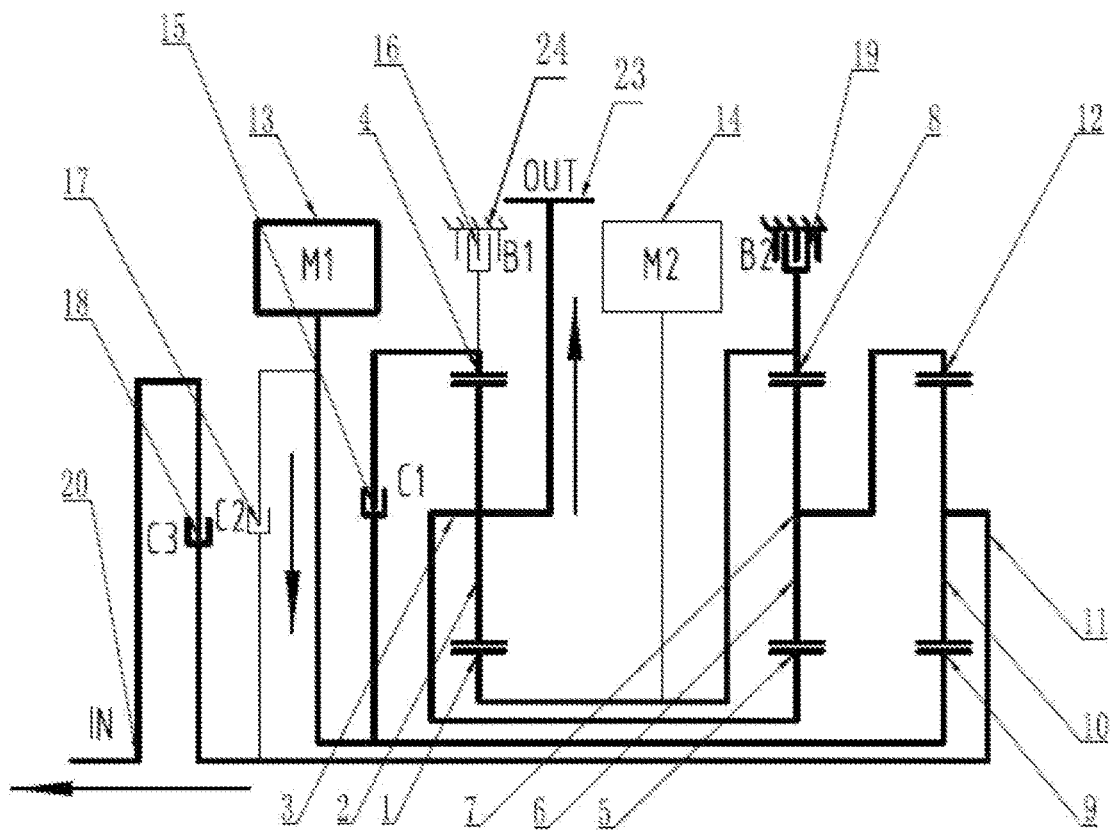
FIG. 27 is a power transmission route diagram of the hybrid driving system provided by the second embodiment of the present disclosure in a fourth engine restarting mode.

When the output power of the hybrid driving system in the 4-gear pure electric mode is insufficient to meet the driving power demand of the vehicle or the battery power is relatively low, the engine is restarted to establish the fourth engine restarting mode. When the hybrid driving system is in the fourth engine restarting mode, and when the power of one motor is insufficient to meet the driving power demand of the vehicle and start the engine, the output power of the other motor is used. The power transmission route in the fourth engine restarting mode is as shown in FIG. 27.

(21) The Fifth Engine Restarting Mode

Figure 28:
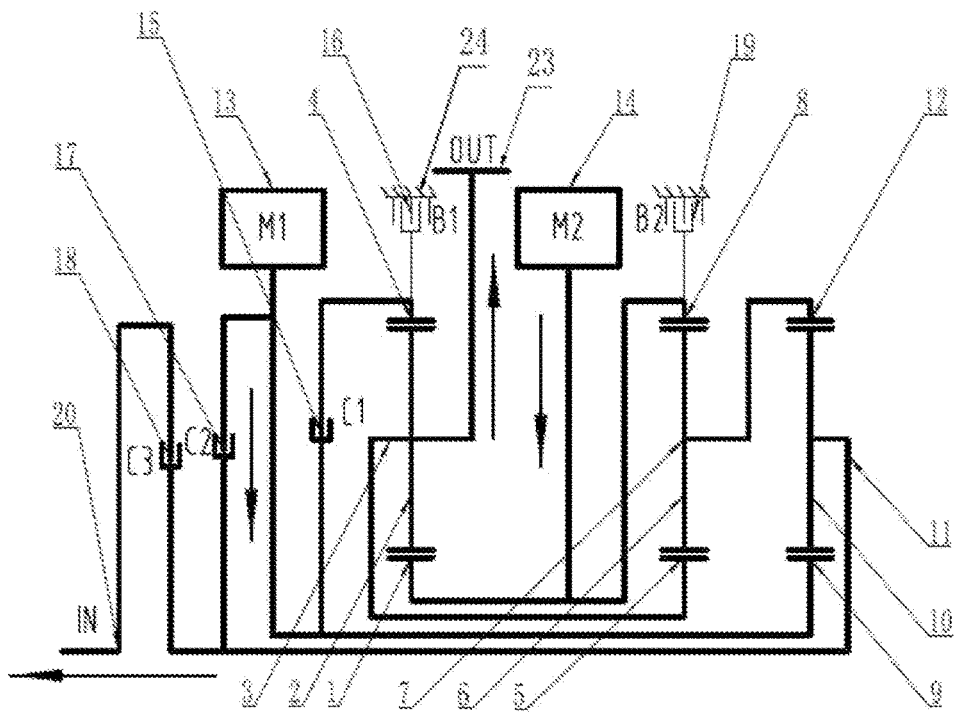
FIG. 28 is a power transmission route diagram of the hybrid driving system provided by the second embodiment of the present disclosure in a fifth engine restarting mode.

When the output power of the hybrid driving system in the 5-gear pure electric mode is insufficient to meet the driving power demand of the vehicle or the battery power is relatively low, the engine is restarted to establish the fifth engine restarting mode. When the hybrid driving system is in the fifth engine restarting mode, and when the power of one motor is insufficient to meet the driving power demand of the vehicle and start the engine, the output power of the other motor is used. The power transmission route in the fifth engine restarting mode is as shown in FIG. 28.

(22) The Sixth Engine Restarting Mode

Figure 29:
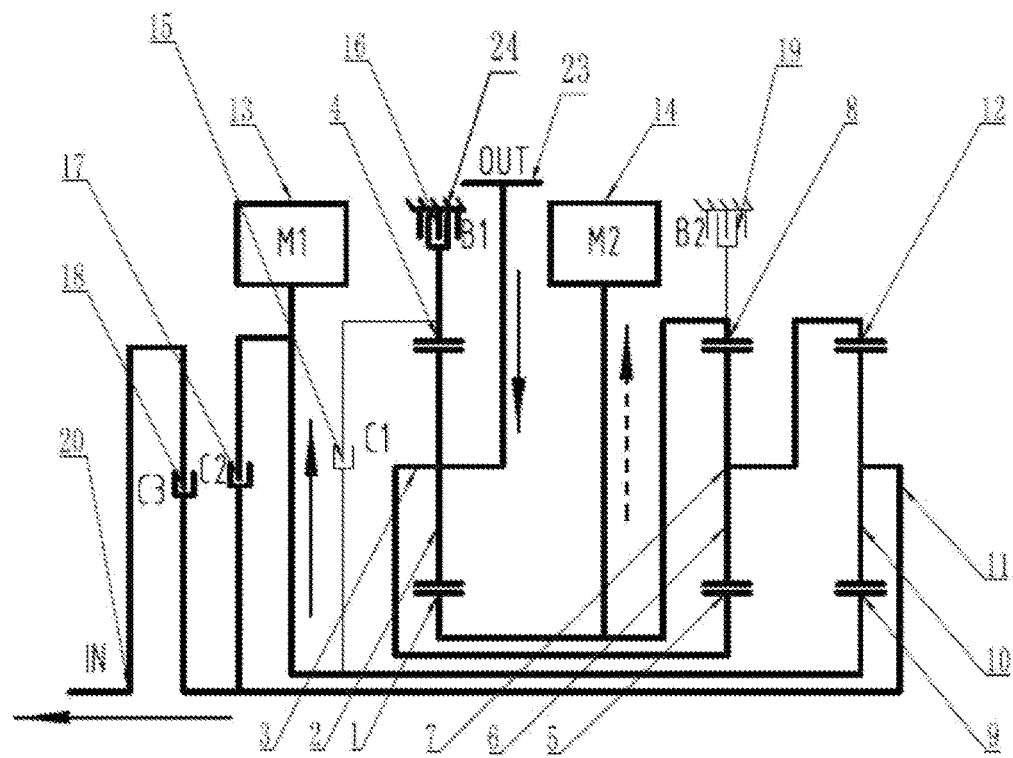
FIG. 29 is a power transmission route diagram of the hybrid driving system provided by the second embodiment of the present disclosure in a sixth engine restarting mode.

When the braking process (long braking) in the first braking energy recovery mode is about to be completed, the engine is restarted to establish the sixth engine restarting mode. When the hybrid driving system is in the sixth engine restarting mode, and when the remaining braking energy is insufficient to restart the engine, only a single motor is used for energy recovery; and when only a single motor is used for braking energy recovery, and when the remaining braking energy is still insufficient to start the engine, the first braking energy recovery mode is disabled, and the engine is restarted by using all the braking energy. The power transmission route in the sixth engine restarting mode is as shown in FIG. 29.

(23) The Seventh Engine Restarting Mode

Figure 30:
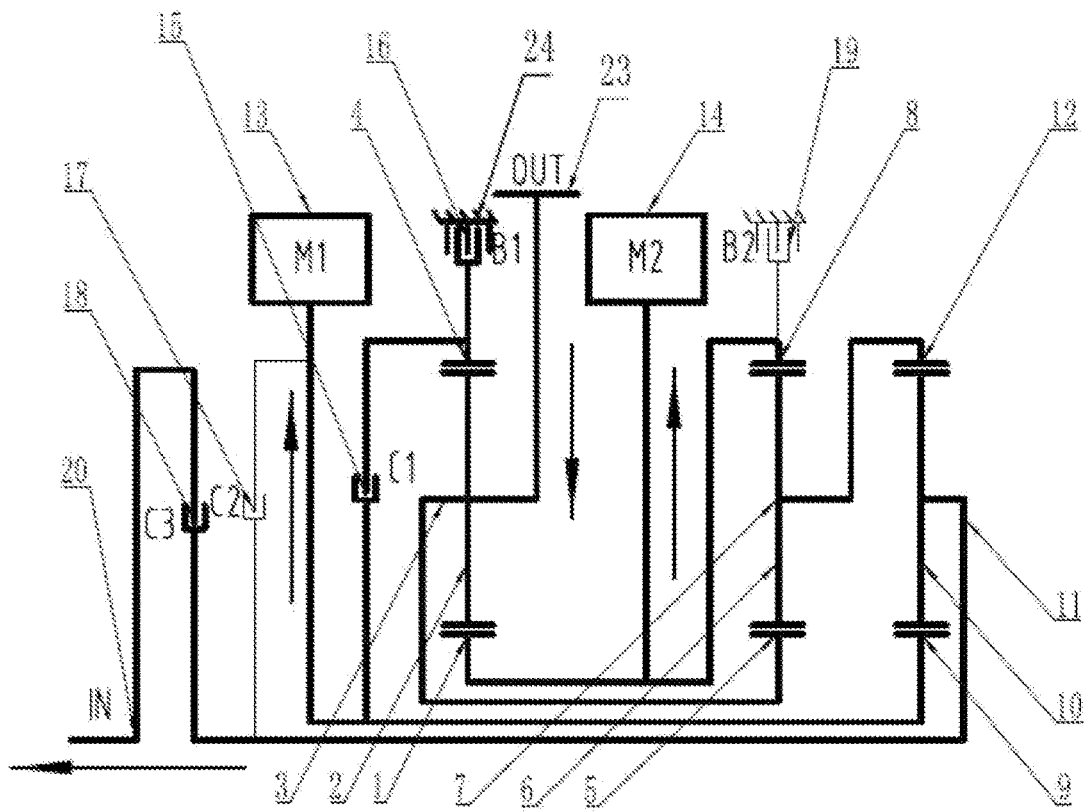
FIG. 30 is a power transmission route diagram of the hybrid driving system provided by the second embodiment of the present disclosure in a seventh engine restarting mode.

When the braking process (long braking) in the second braking energy recovery mode is about to be completed, the engine is restarted to establish the seventh engine restarting mode. When the hybrid driving system is in the seventh engine restarting mode, and when the remaining braking energy is insufficient to restart the engine, only a single motor is used for energy recovery; and when only a single motor is used for braking energy recovery, and when the remaining braking energy is still insufficient to start the engine, the second braking energy recovery mode is disabled, and the engine is restarted by using all the braking energy. The power transmission route in the seventh engine restarting mode is as shown in FIG. 30.

(24) The Eighth Engine Restarting Mode

Figure 31:
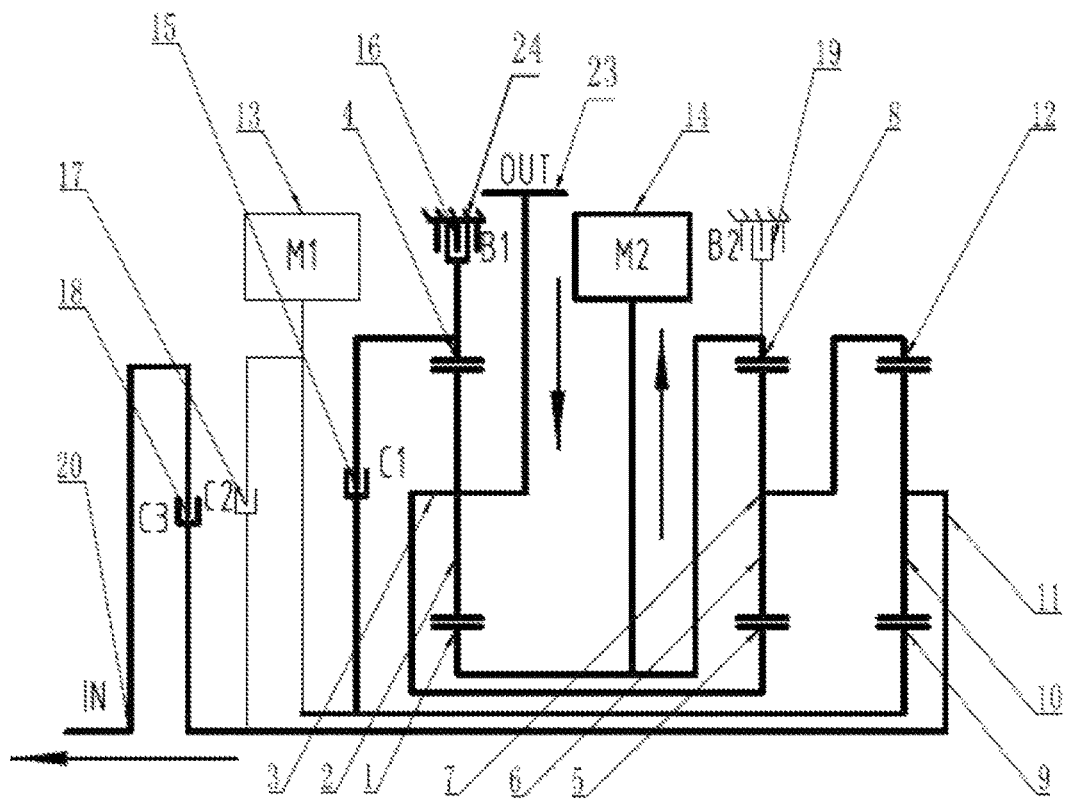
FIG. 31 is a power transmission route diagram of the hybrid driving system provided by the second embodiment of the present disclosure in an eighth engine restarting mode.

When the braking process (long braking) in the third braking energy recovery mode is about to be completed, the engine is restarted to establish the eighth engine restarting mode. When the hybrid driving system is in the eighth engine restarting mode, and when the remaining braking energy is insufficient to restart the engine, only a single motor is used for energy recovery; and when only a single motor is used for braking energy recovery, and when the remaining braking energy is still insufficient to start the engine, the third braking energy recovery mode is disabled, and the engine is restarted by using all the braking energy. The power transmission route in the eighth engine restarting mode is as shown in FIG. 31.

(25) The Ninth Engine Restarting Mode

Figure 32:
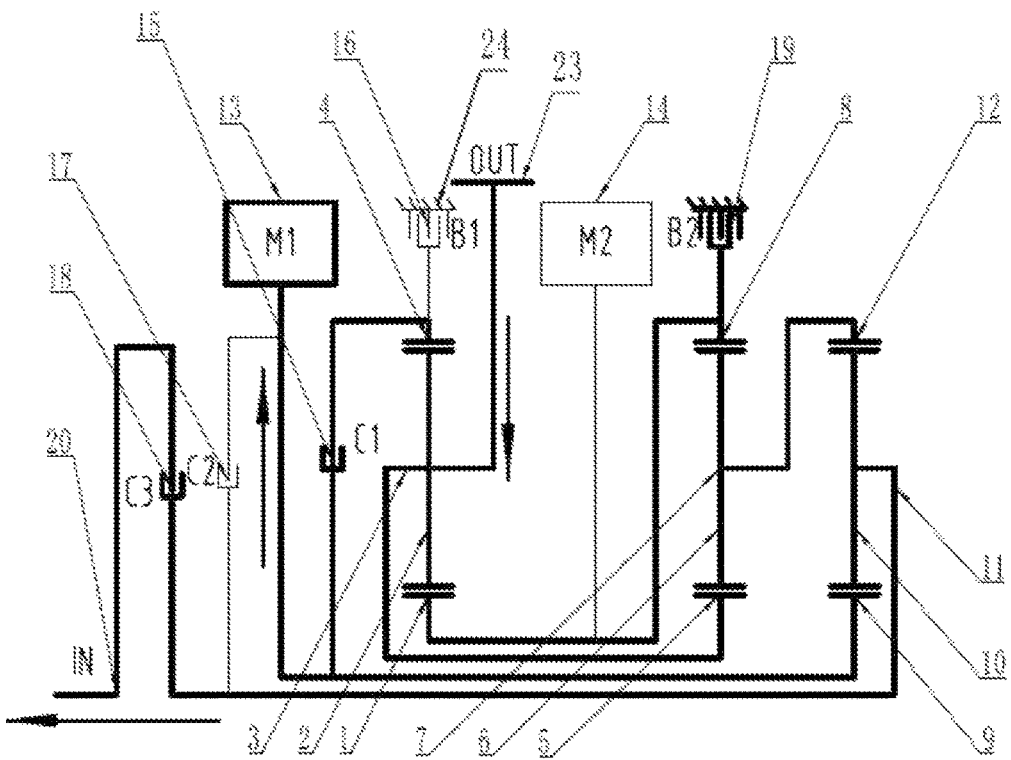
FIG. 32 is a power transmission route diagram of the hybrid driving system provided by the second embodiment of the present disclosure in a ninth engine restarting mode.

When the braking process (long braking) in the fourth braking energy recovery mode is about to be completed, the engine is restarted to establish the ninth engine restarting mode. When the hybrid driving system is in the ninth engine restarting mode, and when the remaining braking energy is insufficient to restart the engine, only a single motor is used for energy recovery; and when only a single motor is used for braking energy recovery, and when the remaining braking energy is still insufficient to start the engine, the fourth braking energy recovery mode is disabled, and the engine is restarted by using all the braking energy. The power transmission route in the ninth engine restarting mode is as shown in FIG. 32.

(26) The Tenth Engine Restarting Mode

Figure 33:
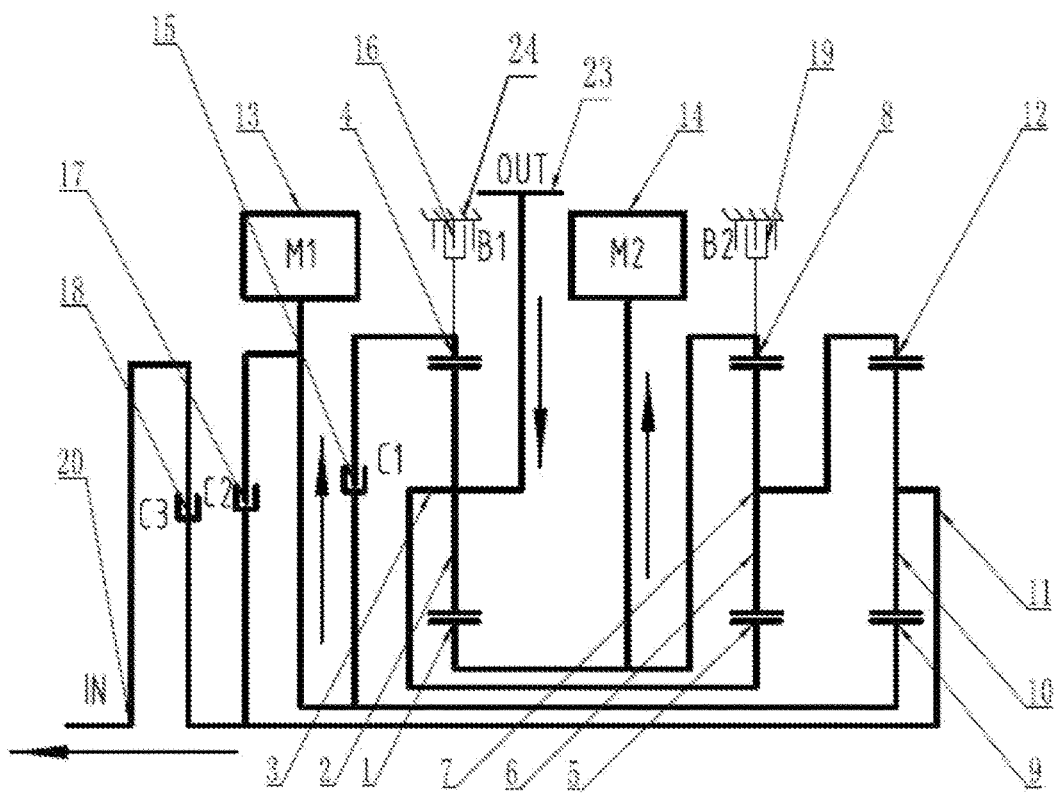
FIG. 33 is a power transmission route diagram of the hybrid driving system provided by the second embodiment of the present disclosure in a tenth engine restarting mode.

When the braking process (long braking) in the fifth braking energy recovery mode is about to be completed, the engine is restarted to establish the tenth engine restarting mode. When the hybrid driving system is in the tenth engine restarting mode, and when the remaining braking energy is insufficient to restart the engine, only a single motor is used for energy recovery; and when only a single motor is used for braking energy recovery, and when the remaining braking energy is still insufficient to start the engine, the fifth braking energy recovery mode is disabled, and the engine is restarted by using all the braking energy. The power transmission route in the tenth engine restarting mode is as shown in FIG. 33.

The hybrid driving system in the second embodiment has the following advantages:

(1) Two E-CVT modes (the first E-CVT mode and the second E-CVT mode) are realized. The first E-CVT mode (the input splitting mode) is used at the low speed section, and the second E-CVT mode (the composite splitting mode) is used at the medium and high speed sections, so that the system can obtain transmission efficiency as high as possible.

(2) Five gears of pure electric modes (the 1-gear pure electric drive mode, the 2-gear pure electric drive mode, the 3-gear pure electric drive mode, the 4-gear pure electric drive mode and the 5-gear pure electric drive mode) are realized, therefore the motors can be in a high efficiency working interval as much as possible in the pure electric modes, and the transmission efficiency is improved, which is particularly important for plug-in hybrid electric vehicles.

(3) Working modes of multiple fixed speed ratios are realized, the electric power loss is further reduced, the transmission efficiency is improved, the stalling of the motors can be eliminated by introducing the fixed speed ratios, the losses of the motors can be reduced, and the lives of the motors are prolonged.

(4) Four engine direct drive/parallel modes (the 1-gear engine direct-drive/parallel mode, the 2-gear engine direct-drive/parallel mode, the 3-gear engine direct-drive/parallel mode and the 4-gear engine direct-drive/parallel mode) are realized, the electric power loss is further reduced, the transmission efficiency is improved, the stalling of the motors can be eliminated by introducing the fixed speed ratios, the losses of the motors can be reduced, and the lives of the motors are prolonged.

(5) The braking energy recovery modes of five fixed gears (the first braking energy recovery mode, the second braking energy recovery mode, the third braking energy recovery mode, the fourth braking energy recovery mode and the fifth braking energy recovery mode) are realized, and there are corresponding braking energy recovery modes in low, medium and high speed sections to ensure that the braking capacity of each speed section can be fully utilized.

(6) The engine restarting modes of ten fixed gears (the first engine restarting mode, the second engine restarting mode, the third engine restarting mode, the fourth engine restarting mode, the fifth engine restarting mode, the sixth engine restarting mode, the seventh engine restarting mode, the eighth engine restarting mode, the ninth engine restarting mode and the tenth engine restarting mode) are realized, so that the engine can be started at any time on demand in the pure electric modes or the braking energy recovery modes at various speed sections.

Figure 34:
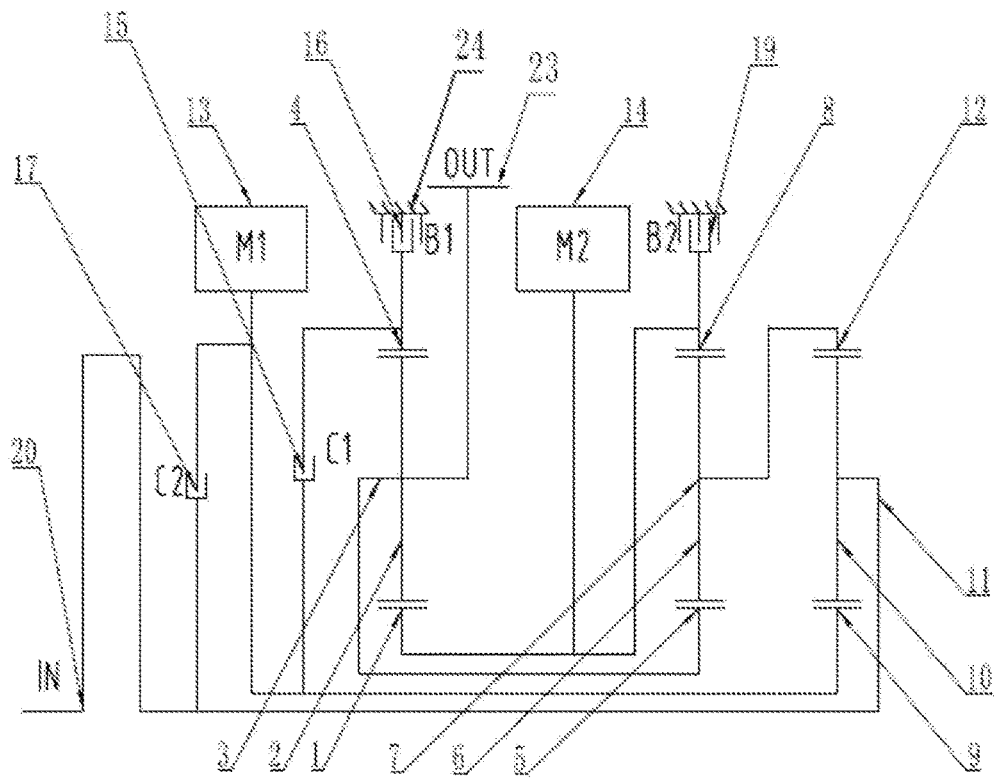
FIG. 34 is a schematic diagram of a hybrid driving system provided by a third embodiment of the present disclosure.

In addition, referring to FIG. 34, it shows a hybrid driving system provided by a third embodiment of the present disclosure. The difference with the second embodiment is that in the present embodiment, the third clutch 18 is canceled, and the input element 20 is directly connected to the third planet carrier 11. The direct connection between the input element 20 and the third planet carrier 11 is spline connection, welding or integral formation. Compared with the second embodiment, one clutch is omitted in the third embodiment, so that the structure of the hybrid driving system is simpler, and the cost is lower. In addition, the third embodiment does not involve the control of the third clutch 18, so that the control of the hybrid driving system is simpler. In the third embodiment, the operating logic in each working mode is as shown in Table 3.

TABLE 3

| Working mode operating logic table (third embodiment) | | | | | |
|---|---|---|---|---|---|
| Working mode | First clutch | Second clutch | First brake | Second brake | Speed ratio or mechanical point speed ratio (transmission ratio) |
| First E-CVT mode | | | • | | $K3*(K1*K2 + K2 + 1)/(1 + K2)/(1 + K3)$ |
| Second E-CVT mode | • | | | | $i1 = K3*(K1*K2 + K2 + 1)/(1 + K2)/(1 + K3)$ $i2 = (K1*K3 + (1 + K1)*(1 + K2))/K1/(1 + K2)/(1 + K3)$ |
| 1-gear pure electric mode | | • | • | | $(K1*K2 + K2 + 1)/(K2 + 1)$ |
| 2-gear pure electric mode | • | | • | | $K1 + 1$ |
| 3-gear pure electric mode | • | | • | | $K1 + 1$ |
| 4-gear pure electric mode | • | | | • | $(K1 + 1)/K1$ |
| 5-gear pure electric mode | • | • | | | $1$ |
| First engine direct drive/parallel mode | | • | • | | $(K1*K2 + K2 + 1)/(K2 + 1)$ |
| Second engine direct drive/parallel mode | • | | • | | $K3*(1 + K2 + K1*K2)/(1 + K2)/(1 + K3)$ |
| Third engine direct drive/parallel mode | • | • | | | $1$ |
| Fourth engine direct drive/parallel mode | • | | | • | $(1 + K1 + K2 + K1*K2 + K1*K3)/K1/(1 + K2)/(1 + K3)$ |
| First braking energy recovery mode | | • | • | | $(K2 + 1)/(K1*K2 + K2 + 1)$ |

TABLE 3-continued

Working mode operating logic table (third embodiment)

| Working mode | First clutch | Second clutch | First brake | Second brake | Speed ratio or mechanical point speed ratio (transmission ratio) |
|---|---|---|---|---|---|
| Second braking energy recovery mode |  | • | • |  | $1/(K1 + 1)$ |
| Third braking energy recovery mode | • |  | • |  | $1/(K1 + 1)$ |
| Fourth braking energy recovery mode | • |  |  | • | $K1/(1 + K1)$ |
| Fifth braking energy recovery mode | • | • |  |  | 1 |
| First engine restarting mode |  | • | • |  |  |
| Second engine restarting mode |  | • | • |  |  |
| Third engine restarting mode | • |  | • |  |  |
| Fourth engine restarting mode | • |  |  | • |  |
| Fifth engine restarting mode | • | • |  |  |  |
| Sixth engine restarting mode |  | • | • |  |  |
| Seventh engine restarting mode |  | • | • |  |  |
| Eight engine restarting mode | • |  | • |  |  |
| Ninth engine restarting mode | • |  |  | • |  |
| Tenth engine restarting mode | • | • |  |  |  |

In Table 3, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

In the third embodiment, it is only necessary to cancel the third clutch 18 and its control on the basis of the second embodiment. Therefore, in the third embodiment, the power transmission routes in various operating modes are similar to those in the second embodiment.

Referring to FIG. 35 to FIG. 44, a hybrid driving system provided by a fourth embodiment of the present disclosure is shown, including an engine (not shown in the figures), an input element 20, an output element 23, a box body 24, a first motor 13, a second motor 14, a first planet row, a second planet row, a third planet row, a first clutch 15, a second clutch 17, a third clutch 18, a first brake 16, a second brake 19 and a third brake 21. It can be seen that the third brake 21 is added in the fourth embodiment on the basis of the second embodiment.

In the present embodiment, the first planet row, the second planet row and the third planet row are all single planet rows (simple planet rows).

The first planet row includes a first sun gear 1, a first planet gear 2, a first gear ring 4 and a first planet carrier 3, the first sun gear 1 is in external meshing transmission with the first planet gear 2, the first planet gear 2 is in internal meshing transmission with the first gear ring 4, and the first planet gear 2 is rotatably supported on the first planet carrier 3 through a rolling bearing or a sliding bearing.

The second planet row includes a second sun gear 5, a second planet gear 6, a second gear ring 8 and a second planet carrier 7, the second sun gear 5 is in external meshing transmission with the second planet gear 6, the second planet gear 6 is in internal meshing transmission with the second gear ring 8, and the second planet gear 6 is rotatably supported on the second planet carrier 7 through a rolling bearing or a sliding bearing.

The third planet row includes a third sun gear 9, a third planet gear 10, a third gear ring 12 and a third planet carrier 11, the third sun gear 9 is in external meshing transmission with the third planet gear 10, the third planet gear 10 is in internal meshing transmission with the third gear ring 12, and the third planet gear 10 is rotatably supported on the third planet carrier 11 through a rolling bearing or a sliding bearing.

Figure 35:
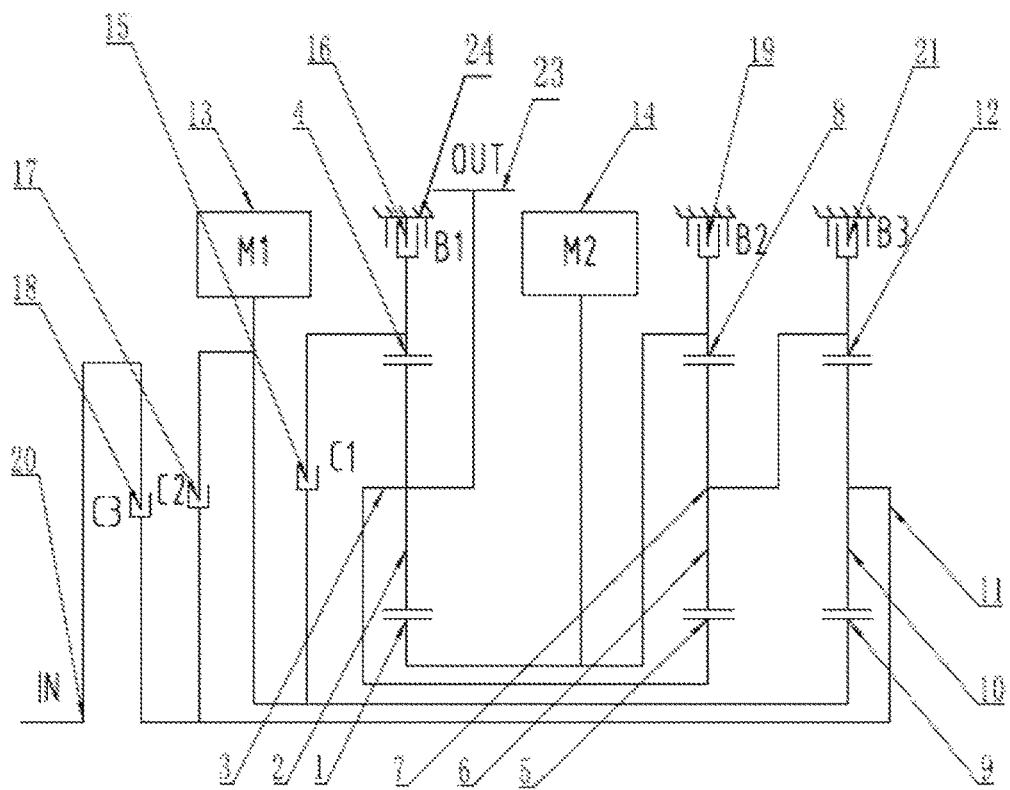
FIG. 35 is a schematic diagram of a hybrid driving system provided by a fourth embodiment of the present disclosure.

As shown in FIG. 35, the first sun gear 1 and the second gear ring 8 are both connected to the second motor 14, the first planet carrier 3 is fixedly connected to the second sun gear 5, the second planet carrier 7 is fixedly connected to the third gear ring 12, the third sun gear 9 is connected to the first motor 13, the input element 20 is connected between the engine and the third planet carrier 11, and the output element 23 is connected to the first planet carrier 3. The fixed connection here can be spline connection, welding or integral formation. That is, the first sun gear 1 and the second gear ring 8 are splined, welded or integrally formed with the rotor of the second motor 14, the first planet carrier 3 is splined, welded or integrally formed with the second sun gear 5, the second planet carrier 7 is splined, welded or integrally formed with the third gear ring 12, and the third sun gear 9 is splined, welded or integrally formed with the rotor of the first motor 13.

As shown in FIG. 35, the first gear ring 4 is connected to the third sun gear 9 through the first clutch 15, the first gear ring 4 is connected to the box body 24 through the first brake 16, the second gear ring 8 is connected to the box body 24 through the second brake 19, the second clutch 17 is connected between the third sun gear 9 and the third planet carrier 11, and the third gear ring 12 is connected to the box body 24 through the third brake 21.

The function of the second clutch 17 is to realize the integral rotation of the third planet row. Therefore, the second clutch 17 is connected between any two of the third sun gear 9, the third planet carrier 11 and the third gear ring 12.

In the present embodiment, the input element 20 is connected to the third planet carrier 11 through the third clutch 18.

According to the hybrid driving system in the fourth embodiment of the present disclosure, a basic three-planet-row planet gear configuration is provided through the planet row mechanical structure and the reasonable layout of multiple operating elements (the first clutch 15, the second clutch 17, the third clutch 18, the first brake 16, the second brake 19 and the third brake 21), which can realize two E-CVT working modes to obtain higher transmission efficiency. By selectively engaging one or more of the first clutch 15, the second clutch 17, the third clutch 18, the first brake 16, the second brake 19 and the third brake 21, more working modes can be realized to further obtain higher transmission efficiency.

The hybrid driving system in the present embodiment has multiple working modes, specifically: two E-CVT modes (a first E-CVT mode and a second E-CVT mode), 7 gears of pure electric modes (a 1-gear pure electric mode, a 2-gear pure electric mode, a 3-gear pure electric mode, a 4-gear pure electric mode, a 5-gear pure electric mode, a 6-gear pure electric mode and a 7-gear pure electric mode), 5 gears of engine direct drive/parallel modes (a 1-gear engine direct drive/parallel mode, a 2-gear engine direct drive/parallel mode, a 3-gear engine direct drive/parallel mode, a 4-gear engine direct drive/parallel mode and a 5-gear engine direct drive/parallel mode), 7 braking energy recovery modes (a first braking energy recovery mode, a second braking energy recovery mode, a third braking energy recovery mode, a fourth braking energy recovery mode, a fifth braking energy recovery mode, a sixth braking energy recovery mode and a seventh braking energy recovery mode), and 14 engine restarting modes (a first engine restarting mode, a second engine restarting mode, a third engine restarting mode, a fourth engine restarting mode, a fifth engine restarting mode, a sixth engine restarting mode, a seventh engine restarting mode, an eighth engine restarting mode, a ninth engine restarting mode, a tenth engine restarting mode, an eleventh engine restarting mode, a twelfth engine restarting mode, a thirteenth engine restarting mode and a fourteenth engine restarting mode). The operating logic in each working mode is as shown in Table 4.

TABLE 4

Working mode operating logic table (fourth embodiment)

| Working mode | First clutch | Second clutch | Third clutch | First brake | Second brake | Third brake | Speed ratio or mechanical point speed ratio (transmission ratio) |
|---|---|---|---|---|---|---|---|
| First E-CVT mode | | | • | • | | | $K3 * (K1 * K2 + K2 + 1)/(1 + K2)/(1 + K3)$ |
| Second E-CVT mode | • | | • | | | | $i1 = K3 * (K1 * K2 + K2 + 1)/(1 + K2)/(1 + K3)$ $i2 = (K1 * K3 + (1 + K1) * (1 + K2))/$ $K1/(1 + K2)/(1 + K3)$ |
| 1-gear pure electric mode | | • | | • | | | $(K1 * K2 + K2 + 1)/(K2 + 1)$ |
| 2-gear pure electric mode | | • | | | • | | $K1 + 1$ |
| 3-gear pure electric mode | • | | | | • | | $K1 + 1$ |
| 4-gear pure electric mode | • | | | | | • | $(K1 + 1)/K1$ |
| 5-gear pure electric mode | • | • | | | | | $1$ |
| 6-gear pure electric mode | | • | | | | • | $(1 + K1 * K2 + K2)/K1/K2$ |
| 7-gear pure electric mode | | | | | | • | $-1/K2$ |
| 1-gear engine direct drive/parallel mode | | • | • | • | | | $(K1 * K2 + K2 + 1)/(K2 + 1)$ |
| 2-gear engine direct drive/parallel mode | • | | • | • | | | $K3 * (1 + K2 + K1 * K2)/(1 + K2)/(1 + K3)$ |
| 3-gear engine direct drive/parallel mode | • | • | • | | | | $1$ |

TABLE 4-continued

Working mode operating logic table (fourth embodiment)

| Working mode | First clutch | Second clutch | Third clutch | First brake | Second brake | Third brake | Speed ratio or mechanical point speed ratio (transmission ratio) |
|---|---|---|---|---|---|---|---|
| 4-gear engine direct drive/parallel mode | • | | • | | • | | $(1 + K1 + K2 + K1 * K2 + K1 * K3)/K1/(1 + K2)/(1 + K3)$ |
| 5-gear engine direct drive/parallel mode | • | | • | | | • | $(1 + K2 * (1 + K1))/K1/K2/(1 + K3)$ |
| First braking energy recovery mode | | • | | • | | | $(K2 + 1)/(K1 * K2 + K2 + 1)$ |
| Second braking energy recovery mode | | • | | • | | | $1/(K1 + 1)$ |
| Third braking energy recovery mode | • | | | • | | | $1/(K1 + 1)$ |
| Fourth braking energy recovery mode | • | | | | • | | $K1/(1 + K1)$ |
| Fifth braking energy recovery mode | • | • | | | | | $1$ |
| Sixth braking energy recovery mode | • | | | | | • | |
| Seventh braking energy recovery mode | • | | | | | • | |
| First engine restarting mode | | • | • | • | | | |
| Second engine restarting mode | | • | • | • | | | |
| Third engine restarting mode | • | | • | • | | | |
| Fourth engine restarting mode | • | | • | | • | | |
| Fifth engine restarting mode | • | • | • | | | | |
| Sixth engine restarting mode | | • | • | • | | | |
| Seventh engine restarting mode | | • | • | • | | | |
| Eight engine restarting mode | • | | | • | • | | |
| Ninth engine restarting mode | • | | • | | • | | |

TABLE 4-continued

Working mode operating logic table (fourth embodiment)

| Working mode | First clutch | Second clutch | Third clutch | First brake | Second brake | Third brake | Speed ratio or mechanical point speed ratio (transmission ratio) |
|---|---|---|---|---|---|---|---|
| Tenth engine restarting mode | • | • | • | | | | |
| Eleventh engine restarting mode | • | | | | • | | |
| Twelfth engine restarting mode | • | | | | • | | |
| Thirteenth engine restarting mode | • | | | | • | | |
| fourteenth engine restarting mode | • | | | | • | | |

In Table 4, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

The power transmission routes (lines on the transmission routes are thickened) in various working modes in the fourth embodiment will be described in detail below in conjunction with FIG. 35 to FIG. 44.

(1) The 1-Gear Pure Electric Mode

The second clutch 17 and the first brake 16 are engaged, and the first clutch 15, the third clutch 18, the second brake 19 and the third brake 21 are disengaged to realize the 1-gear pure electric mode of the first gear. In this mode, the engine does not participate in working, the first motor 13 and the second motor 14 are both driving motors, the first motor 13 performs main driving and the second motor 14 performs auxiliary driving, the first motor 13 performs main driving to realize large speed ratio starting, and when the output power of the main driving motor (the first motor 13) is insufficient to drive the vehicle, the second motor 14 performs auxiliary driving. The motor with the smaller output power in the first motor 13 and the second motor 14 performs the auxiliary driving. In this mode, the third clutch 18 is disengaged to reduce the loss caused by the inertia of the engine. The power transmission route in this mode is the same as the power transmission route in the 1-gear pure electric mode in the second embodiment, and the transmission ratio is: $i=(K1*K2+K2+1)/(K2+1)$.

(2) The 2-Gear Pure Electric Mode

The second clutch 17 and the first brake 16 are engaged, and the first clutch 15, the third clutch 18, the second brake 19 and the third brake 21 are disengaged to realize the 2-gear pure electric mode. In this mode, the engine does not participate in working, the first motor 13 and the second motor 14 are both driving motors, the first motor 13 performs auxiliary driving and the second motor 14 performs main driving, the second motor 14 performs main driving to realize large speed ratio starting, and when the output power of the main driving motor (the second motor 14) is insufficient to drive the vehicle, the first motor 13 performs auxiliary driving. In this mode, the third clutch 18 is disengaged to reduce the loss caused by the inertia of the engine. The power transmission route in this mode is the same as the power transmission route in the 2-gear pure electric mode in the second embodiment, and the transmission ratio is: $i=K1+1$.

(3) The 3-Gear Pure Electric Mode

The first clutch 15 and the first brake 16 are engaged, and the second clutch 17, the third clutch 18, the second brake 19 and the third brake 21 are disengaged to realize the 3-gear pure electric mode. In this mode, the engine and the first motor 13 do not participate in working, and the second motor 14 performs driving. The difference with the 2-gear pure electric mode is that only the second motor 14 can be used, when its power meets the requirements of the vehicle, compared with the 2-gear pure electric mode, the dragging can be reduced, and the transmission efficiency can be improved. In this mode, the third clutch 18 is disengaged to reduce the loss caused by the inertia of the engine. The power transmission route in this mode is the same as the power transmission route in the 3-gear pure electric mode in the second embodiment, and the transmission ratio is: $i=K1+1$.

(4) The 4-Gear Pure Electric Mode

The first clutch 15 and the second brake 19 are engaged, and the second clutch 17, the third clutch 18, the first brake 16 and the third brake 21 are disengaged to realize the 4-gear pure electric mode. In this mode, the engine and the second motor 14 do not participate in working, and the first motor 13 performs driving. In this mode, the third clutch 18 is disengaged to reduce the loss caused by the inertia of the engine. The power transmission route in this mode is the same as the power transmission route in the 4-gear pure electric mode in the second embodiment, and the transmission ratio is: $i=(K1+1)/K1$.

(5) The 5-Gear Pure Electric Mode

The first clutch 15 and the second clutch 17 are engaged, and the third clutch 18, the first brake 16, the second brake 19 and the third brake 21 are disengaged to realize the 5-gear pure electric mode. In this mode, the engine does not participate in working, the first motor 13 and the second motor 14 are both driving motors, both the first motor 13 and the second motor 14 can be used as main driving motors, that is, one of the first motor 13 and the second motor 14 is used as a main driving motor, and the other is used as an auxiliary driving motor. When the output power of one of the motors is insufficient to drive the vehicle, the output power of the other motor provides assistance. In this mode, the third clutch 18 is disengaged to reduce the loss caused by the inertia of the engine. The power transmission route in this mode is the same as the power transmission route in the 5-gear pure electric mode in the second embodiment. The 5-gear pure electric mode is a direct gear, and its transmission ratio is 1.

(6) The 6-Gear Pure Electric Mode

Figure 37:
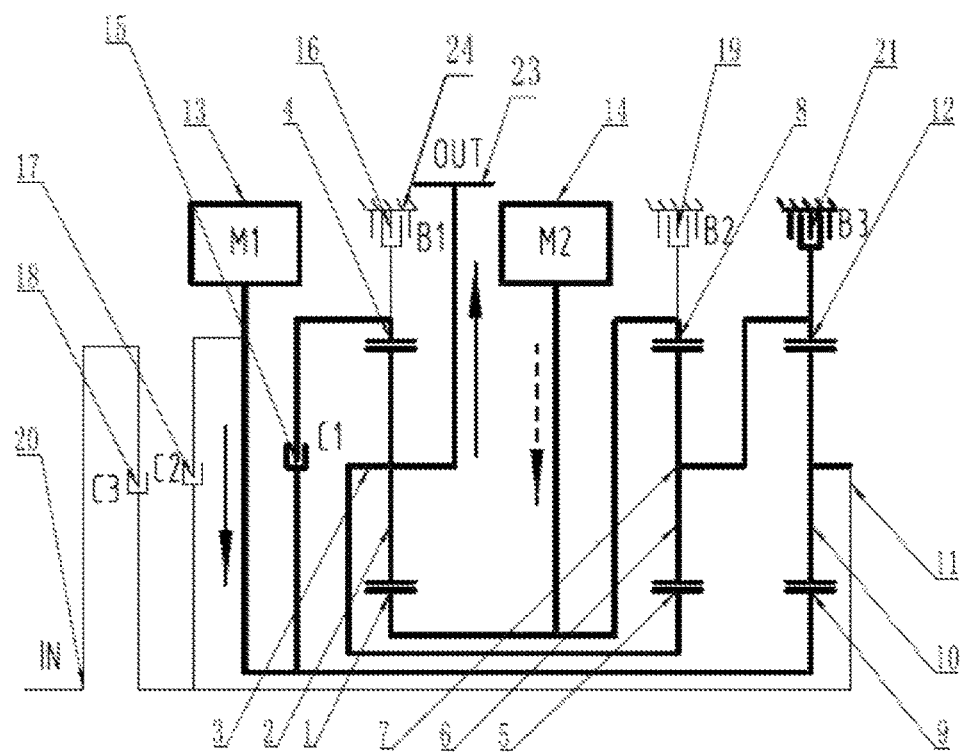
FIG. 37 is a power transmission route diagram of the hybrid driving system provided by the fourth embodiment of the present disclosure in a 6-gear pure electric mode.

The first clutch 15 and the third brake 21 are engaged, and the second clutch 17, the third clutch 18, the first brake 16 and the second brake 19 are disengaged to realize the 6-gear pure electric mode. In this mode, the engine does not participate in working, the first motor 13 and the second motor 14 are both driving motors, the first motor 13 performs main driving, and the second motor 14 performs auxiliary driving. When the output power of the first motor 13 is insufficient to drive the vehicle, the output power of the second motor 14 provides assistance. In this mode, the third clutch 18 is disengaged to reduce the loss caused by the inertia of the engine. The power transmission route in this mode is as shown in FIG. 37. The transmission ratio is $i=(1+K1*K2+K2)/K1/K2$.

(7) The 7-Gear Pure Electric Mode

Figure 38:
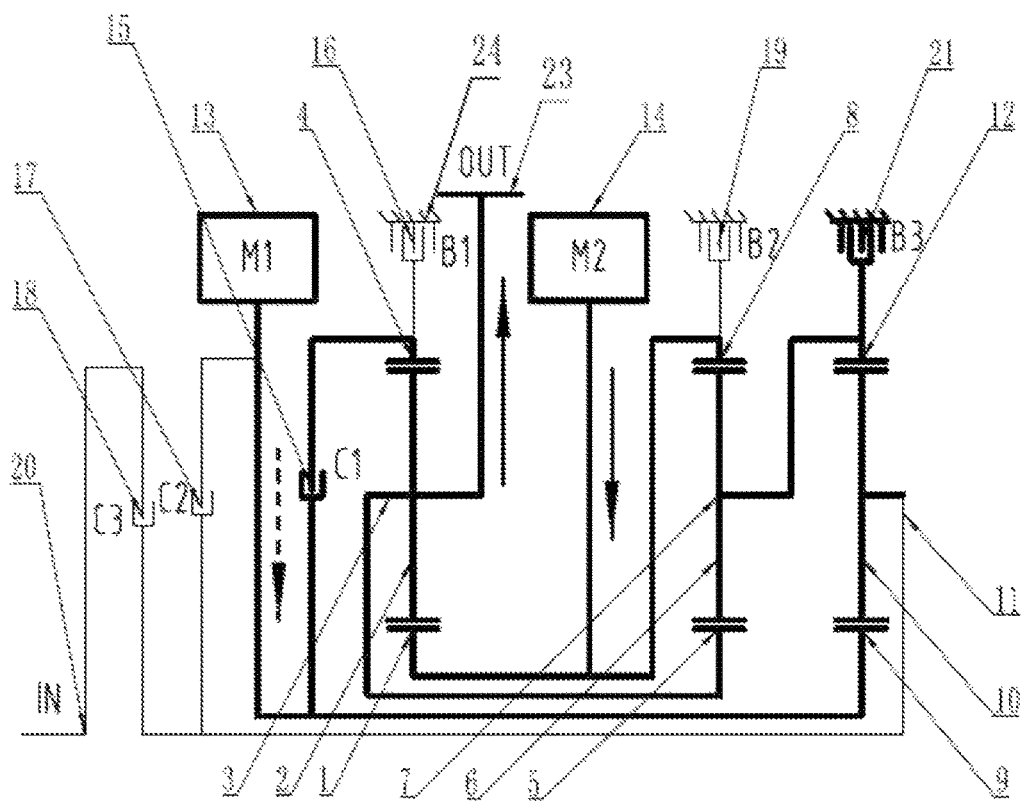
FIG. 38 is a power transmission route diagram of the hybrid driving system provided by the fourth embodiment of the present disclosure in a 7-gear pure electric mode.

The first clutch 15 and the third brake 21 are engaged, and the second clutch 17, the third clutch 18, the first brake 16 and the second brake 19 are disengaged to realize the 7-gear pure electric mode. The power transmission route in this mode is as shown in FIG. 37. In this mode, the engine does not participate in working, the first motor 13 and the second motor 14 are both driving motors, the first motor 13 performs auxiliary driving, and the second motor 14 performs main driving. When the output power of the second motor 14 is insufficient to drive the vehicle, the output power of the first motor 13 provides assistance. In this mode, the third clutch 18 is disengaged to reduce the loss caused by the inertia of the engine. The power transmission route in this mode is as shown in FIG. 38. The transmission ratio is $i=-1/K2$.

(8) The First E-CVT Mode

The first brake 16 and the third clutch 18 are engaged, and the first clutch 15, the second clutch 17, the second brake 19 and the third brake 21 are disengaged to realize the first E-CVT mode. The first E-CVT mode is the input power splitting mode, which has high transmission efficiency when the speed ratio is lower than the mechanical point speed ratio in this mode, so it is suitable for low-speed working conditions. In this mode, the engine and the second motor 14 perform driving together, and the first motor 13 generates electricity for the driving of the second motor 14. The power transmission route is the same as the power transmission route in the first E-CVT mode in the second embodiment. The mechanical point speed ratio in this mode is: $i=K3*(K1*K2+K2+1)/(1+K2)/(1+K3)$.

(9) The Second E-CVT Mode

The first brake 16 and the third clutch 18 are engaged, and the first clutch 15, the second clutch 17, the second brake 19 and the third brake 21 are disengaged to realize the second E-CVT mode. This mode is the composite power splitting mode, which has high transmission efficiency when the speed ratio is between the two mechanical point speed ratios in the second E-CVT mode, so it is suitable for medium and high speed sections. In this mode, the engine performs driving, the first motor 13 performs driving or generates electricity, and the second motor 14 performs driving or generates electricity. Generally, when the vehicle speed is close to the low speed section, the second motor 14 generates electricity, the first motor 13 performs driving, and the electricity generated by the second motor 14 is directly used for the driving of the first motor 13. When the vehicle speed is close to the high speed section, the first motor 13 generates electricity, the second motor 14 performs driving, and the electricity generated by the first motor 13 is directly used for the driving of the second motor 14. The power transmission route in this mode is the same as the power transmission route in the second E-CVT mode in the second embodiment. At this time, the two mechanical point speed ratios are respectively as follows: the first mechanical point speed ratio $i1=K3*(K1*K2+K2+1)/(1+K2)/(1+K3)$, and the second mechanical point speed ratio $i2=(K1*K3+(1+K1)*(1+K2))/K1/(1+K2)/(1+K3)$.

(10) The 1-Gear Engine Direct Drive/Parallel Mode

The second clutch 17, the third clutch 18 and the first brake 16 are engaged, and the first clutch 15, the second brake 19 and the third brake 21 are disengaged to realize the 1-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The power transmission route in this mode is the same as that in the 1-gear engine direct drive/parallel mode in the second embodiment, and the corresponding transmission ratio is: $i=(K1*K2+K2+1)/(K2+1)$.

(11) The 2-Gear Engine Direct Drive/Parallel Mode

The second clutch 17, the third clutch 18 and the first brake 16 are engaged, and the first clutch 15, the second brake 19 and the third brake 21 are disengaged to realize the 2-gear engine direct drive/parallel mode. In this mode, the first motor 13 does not participate in working, the engine performs driving, and the second motor 14 generates electricity or performs driving. When the output power of the engine is insufficient, the output power of the second motor 14 provides compensation. When the output power of the engine is excessive, the second motor 14 generates electricity, and the electricity is stored in the battery so as to realize parallel driving. The power transmission route in this mode is the same as that in the 2-gear engine direct drive/parallel mode in the second embodiment, and the transmission ratio in this mode is the first mechanical point speed ratio in the second E-CVT mode (the composite splitting mode), specifically: $i=K3*(1+K2+K1*K2)/(1+K2)/(1+K3)$.

(12) The 3-Gear Engine Direct Drive/Parallel Mode

The first clutch 15, the second clutch 17 and the third clutch 18 are engaged, and the first brake 16, the second brake 19 and the third brake 21 are disengaged to realize the 3-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The power transmission route in this mode is the same as that in the 3-gear engine direct drive/parallel mode in the second embodiment, and its transmission ratio is 1.

(13) The 4-Gear Engine Direct Drive/Parallel Mode

The second clutch 17, the third clutch 18 and the first brake 16 are engaged, and the first clutch 15, the second brake 19 and the third brake 21 are disengaged to realize the 4-gear engine direct drive/parallel mode. In this mode, the second motor 14 does not participate in working, the engine performs driving, and the first motor 13 generates electricity or performs driving. When the output power of the engine is insufficient, the output power of the first motor 13 provides compensation. When the output power of the engine is excessive, the first motor 13 generates electricity, and the electricity is stored in the battery so as to realize parallel driving. The power transmission route in this mode is the same as that in the 4-gear engine direct drive/parallel mode in the second embodiment. The transmission ratio in this mode is the second mechanical point speed ratio in the second E-CVT mode (the composite splitting mode), specifically: $i=(1+K1+K2+K1*K2+K1*K3)/K1/(1+K2)/(1+K3)$.

(14) The 5-Gear Engine Direct Drive/Parallel Mode

Figure 36:
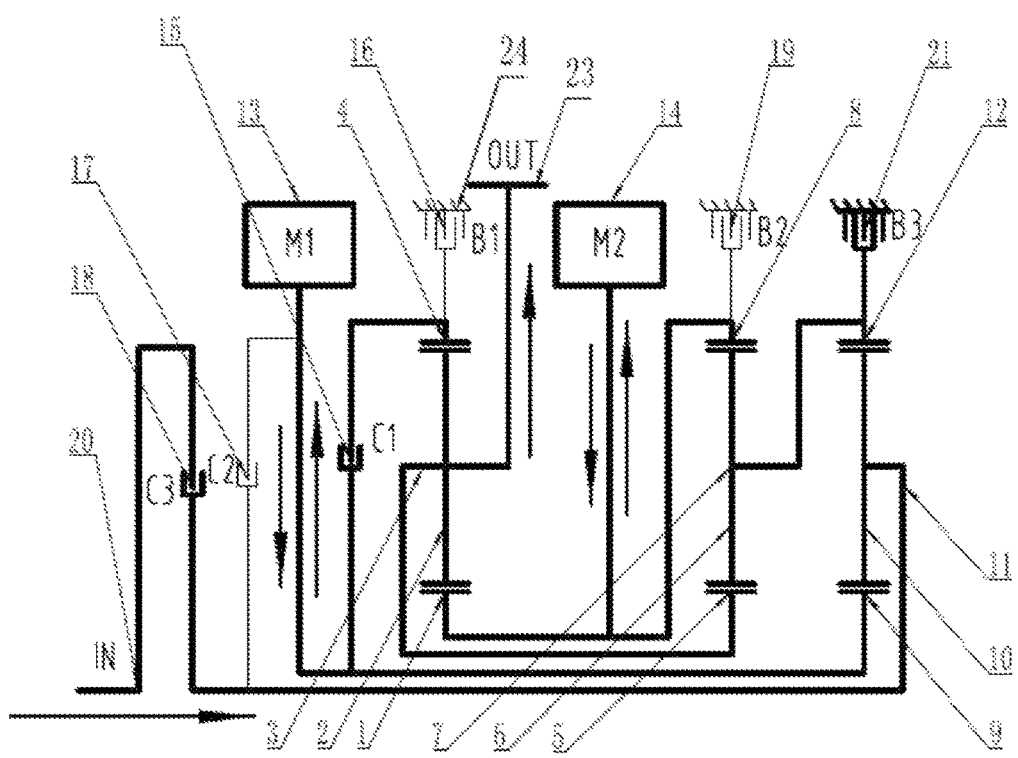
FIG. 36 is a power transmission route diagram of the hybrid driving system provided by the fourth embodiment of the present disclosure in a 5-gear engine direct drive/parallel mode.

The first clutch 15 and the third brake 21 are engaged, and the second clutch 17, the third clutch 18, the first brake 16 and the second brake 19 are disengaged to realize the 5-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The power transmission route in this mode is as shown in FIG. 36, and the corresponding transmission ratio is: $i=(1+K2*(1+K1))/K1/K2/(1+K3)$.

(15) The First Braking Energy Recovery Mode

The second clutch 17 and the first brake 16 are engaged, and the first clutch 15, the third clutch 18, the second brake 19 and the third brake 21 are disengaged to realize the first braking energy recovery mode, and this mode corresponds to the inverse process of the 1-gear pure electric mode. In this mode, the engine does not participate in working, the first motor 13 and the second motor 14 are both generators, the first motor 13 performs main power generation and the second motor 14 performs auxiliary power generation, and when the generated output of the main generator (the first motor 13) is insufficient to absorb all the braking energy, in order to avoid the waste of the braking energy, the second motor 14 performs auxiliary power generation. Herein, the main power generation and the auxiliary power generation are distinguished by the generated output when the first motor 13 and the second motor 14 are used as generators, that is, the motor with greater generated output in the first motor 13 and the second motor 14 performs main power generation, and the motor with smaller generated output in the first motor 13 and the second motor 14 performs auxiliary power generation. In this mode, the third clutch 18 is disengaged to reduce the loss caused by the inertia of the engine. The power transmission route in this mode is the same as the power transmission route in the first braking energy recovery mode in the second embodiment, and the corresponding transmission ratio is: $i=(K2+1)/(K1*K2+K2+1)$.

(16) The Second Braking Energy Recovery Mode

The second clutch 17 and the first brake 16 are engaged, and the first clutch 15, the third clutch 18, the second brake 19 and the third brake 21 are disengaged to realize the second braking energy recovery mode, and this mode corresponds to the inverse process of the 2-gear pure electric mode. In this mode, the engine does not participate in working, the first motor 13 and the second motor 14 are both generators, the first motor 13 performs auxiliary power generation and the second motor 14 performs main power generation, and when the generated output of the main generator (the second motor 14) is insufficient to absorb all the braking energy, in order to avoid the waste of the braking energy, the first motor 13 performs auxiliary power generation. In this mode, the third clutch 18 is disengaged to reduce the loss caused by the inertia of the engine. The power transmission route in this mode is the same as the power transmission route in the second braking energy recovery mode in the second embodiment, and the corresponding transmission ratio is: $i=1/(K1+1)$.

(17) The Third Braking Energy Recovery Mode

The first clutch 15 and the first brake 16 are engaged, and the second clutch 17, the third clutch 18, the second brake 19 and the third brake 21 are disengaged to realize the third braking energy recovery mode, and this mode corresponds to the inverse process of the 3-gear pure electric mode. In this mode, the engine and the first motor 13 do not participate in working, and the second motor 14 generates electricity. The difference with the second braking energy recovery mode is that only the second motor 14 can be used, when its generated output is sufficient to match the braking energy, compared with the second braking energy recovery mode, the dragging can be reduced, and the transmission efficiency can be improved. In this mode, the third clutch 18 is disengaged to reduce the loss caused by the inertia of the engine. The power transmission route in this mode is the same as the power transmission route in the third braking energy recovery mode in the second embodiment, and the corresponding transmission ratio is: $i=1/(K1+1)$.

(18) The Fourth Braking Energy Recovery Mode

The first clutch 15 and the second brake 19 are engaged, and the second clutch 17, the third clutch 18, the first brake 16 and the third brake 21 are disengaged to realize the fourth braking energy recovery mode, and this mode corresponds to the inverse process of the 4-gear pure electric mode. In this mode, the engine and the second motor 14 do not participate in working, and the first motor 13 generates electricity. The difference with the second braking energy recovery mode is that only the first motor 13 can be used, when its generated output is sufficient to match the braking energy, compared with the second braking energy recovery mode, the dragging can be reduced, and the transmission efficiency can be improved. In this mode, the third clutch 18 is disengaged to reduce the loss caused by the inertia of the engine. The power transmission route in this mode is the same as the power transmission route in the fourth braking energy recovery mode in the second embodiment, and the corresponding transmission ratio is: $i=K1/(1+K1)$.

(19) The Fifth Braking Energy Recovery Mode

The first clutch 15 and the second clutch 17 are engaged, and the third clutch 18, the first brake 16, the second brake 19 and the third brake 21 are disengaged to realize the fifth braking energy recovery mode, and this mode corresponds to the inverse process of the 5-gear pure electric mode. In this mode, the engine does not participate in working, the first motor 13 and the second motor 14 are both generators, one of the first motor 13 and the second motor 14 performs main power generation, and the other performs auxiliary power generation. When the generated output of one of the first motor 13 and the second motor 14 is insufficient to absorb all the braking energy, in order to avoid the waste of the braking energy, the other motor performs auxiliary power generation. In this mode, the third clutch 18 is disengaged to reduce the loss caused by the inertia of the engine. The power transmission route in this mode is the same as the power transmission route in the fifth braking energy recovery mode in the second embodiment, and the corresponding transmission ratio is 1.

(20) The Sixth Braking Energy Recovery Mode

Figure 39:
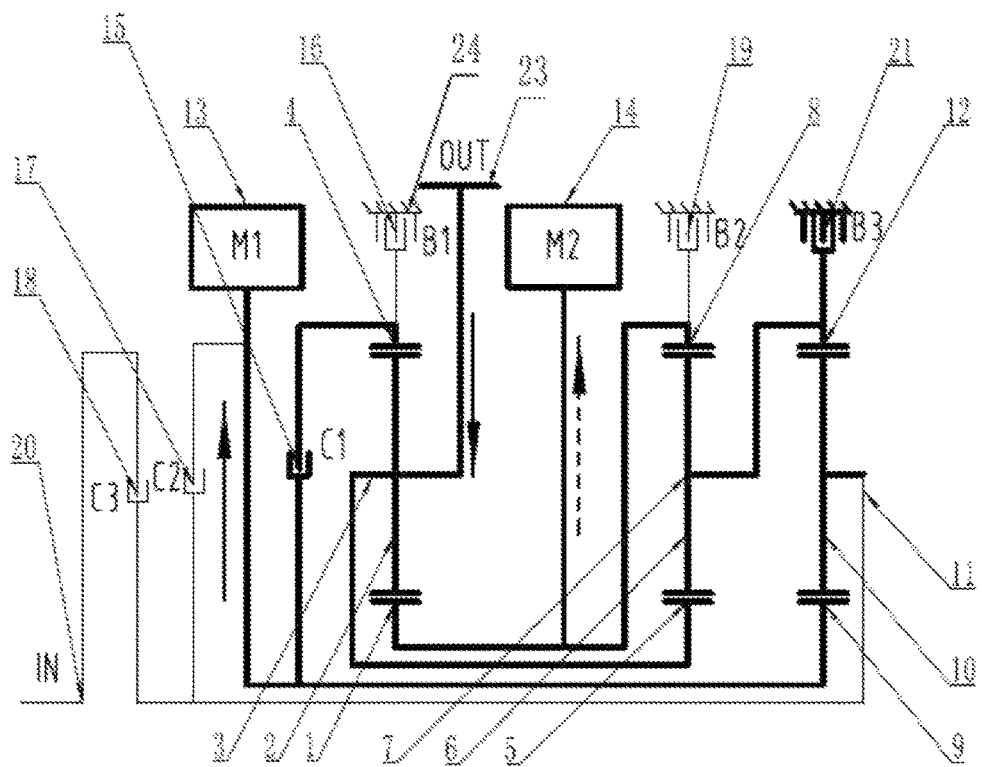
FIG. 39 is a power transmission route diagram of the hybrid driving system provided by the fourth embodiment of the present disclosure in a sixth braking energy recovery mode.

The first clutch 15 and the third brake 21 are engaged, and the second clutch 17, the third clutch 18, the first brake 16 and the second brake 19 are disengaged to realize the sixth braking energy recovery mode, and this mode corresponds to the inverse process of the 6-gear pure electric mode. In this mode, the engine does not participate in working, the first motor 13 and the second motor 14 are both generators, the first motor 13 performs main power generation, and the second motor 14 performs auxiliary power generation. When the generated output of the first motor 13 is insufficient to absorb all the braking energy, in order to avoid the waste of the braking energy, the second motor 14 performs auxiliary power generation. In this mode, the third clutch 18 is disengaged to reduce the loss caused by the inertia of the engine. The power transmission route in this mode is as shown in FIG. 39, and the corresponding transmission ratio is: $i=K1*K2/(1+K2+K1*K2)$.

(21) The Seventh Braking Energy Recovery Mode

Figure 40:
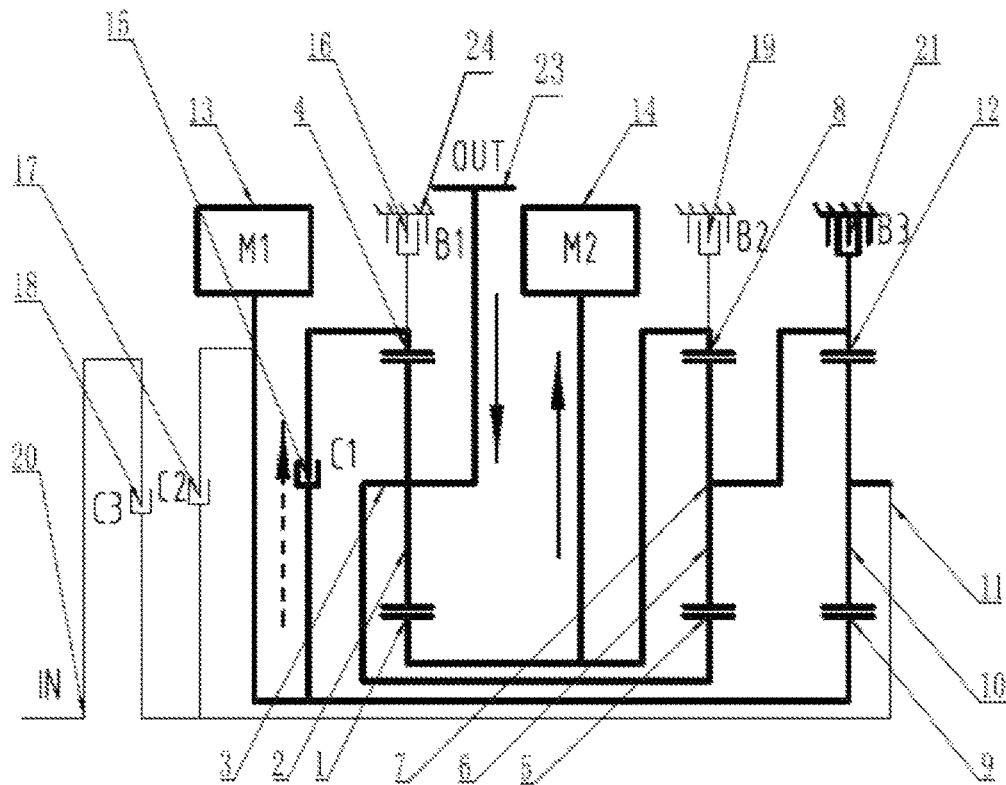
FIG. 40 is a power transmission route diagram of the hybrid driving system provided by the fourth embodiment of the present disclosure in a seventh braking energy recovery mode.

The first clutch 15 and the third brake 21 are engaged, and the second clutch 17, the third clutch 18, the first brake 16 and the second brake 19 are disengaged to realize the seventh braking energy recovery mode, and this mode corresponds to the inverse process of the 7-gear pure electric mode. In this mode, the engine does not participate in working, the first motor 13 and the second motor 14 are both generators, the first motor 13 performs auxiliary power generation, and the second motor 14 performs main power generation. When the generated output of the second motor 14 is insufficient to absorb all the braking energy, in order to avoid the waste of the braking energy, the first motor 13 performs auxiliary power generation. In this mode, the third clutch 18 is disengaged to reduce the loss caused by the inertia of the engine. The power transmission route in this mode is as shown in FIG. 40, and the corresponding transmission ratio is: $i=-K2$.

(22) The First Engine Restarting Mode

Each pure electric mode and each braking energy recovery mode can correspond to an engine restarting mode. Specifically, when the power in each pure electric mode is insufficient to meet the driving power demand of the vehicle or the battery power is relatively low, and when the engine must be introduced, the engine restarting mode is used. When the long braking process is about to be completed and the engine needs to be restarted, the engine restarting mode is also used. The third clutch 19 is disengaged in each engine restarting mode.

When the output power of the hybrid driving system in the 1-gear pure electric mode is insufficient to meet the driving power demand of the vehicle or the battery power is relatively low, the engine is restarted to establish the first engine restarting mode. When the hybrid driving system is in the first engine restarting mode, and when the power of one motor is insufficient to meet the driving power demand of the vehicle and start the engine, the output power of the other motor is used. In the present embodiment, the power transmission route in the first engine restarting mode is the same as the power transmission route in the first engine restarting mode in the second embodiment.

(23) The Second Engine Restarting Mode

When the output power of the hybrid driving system in the 2-gear pure electric mode is insufficient to meet the driving power demand of the vehicle or the battery power is relatively low, the engine is restarted to establish the second engine restarting mode. When the hybrid driving system is in the second engine restarting mode, and when the power of one motor is insufficient to meet the driving power demand of the vehicle and start the engine, the output power of the other motor is used. In the present embodiment, the power transmission route in the second engine restarting mode is the same as the power transmission route in the second engine restarting mode in the second embodiment.

(24) The Third Engine Restarting Mode

When the output power of the hybrid driving system in the 3-gear pure electric mode is insufficient to meet the driving power demand of the vehicle or the battery power is relatively low, the engine is restarted to establish the third engine restarting mode. When the hybrid driving system is in the third engine restarting mode, and when the power of one motor is insufficient to meet the driving power demand of the vehicle and start the engine, the output power of the other motor is used. In the present embodiment, the power transmission route in the third engine restarting mode is the same as the power transmission route in the third engine restarting mode in the second embodiment.

(25) The Fourth Engine Restarting Mode

When the output power of the hybrid driving system in the 4-gear pure electric mode is insufficient to meet the driving power demand of the vehicle or the battery power is relatively low, the engine is restarted to establish the fourth engine restarting mode. When the hybrid driving system is in the fourth engine restarting mode, and when the power of one motor is insufficient to meet the driving power demand of the vehicle and start the engine, the output power of the other motor is used. In the present embodiment, the power transmission route in the fourth engine restarting mode is the same as the power transmission route in the fourth engine restarting mode in the second embodiment.

(26) The Fifth Engine Restarting Mode

When the output power of the hybrid driving system in the 5-gear pure electric mode is insufficient to meet the driving power demand of the vehicle or the battery power is relatively low, the engine is restarted to establish the fifth engine restarting mode. When the hybrid driving system is in the fifth engine restarting mode, and when the power of one motor is insufficient to meet the driving power demand of the vehicle and start the engine, the output power of the other motor is used. In the present embodiment, the power transmission route in the fifth engine restarting mode is the same as the power transmission route in the fifth engine restarting mode in the second embodiment.

(27) The Sixth Engine Restarting Mode

When the braking process (long braking) in the first braking energy recovery mode is about to be completed, the engine is restarted to establish the sixth engine restarting mode. When the hybrid driving system is in the sixth engine restarting mode, and when the remaining braking energy is insufficient to restart the engine, only a single motor is used for energy recovery; and when only a single motor is used for braking energy recovery, and when the remaining braking energy is still insufficient to start the engine, the first braking energy recovery mode is disabled, and the engine is restarted by using all the braking energy. In the present embodiment, the power transmission route in the sixth engine restarting mode is the same as the power transmission route in the sixth engine restarting mode in the second embodiment.

(28) The Seventh Engine Restarting Mode

When the braking process (long braking) in the second braking energy recovery mode is about to be completed, the engine is restarted to establish the seventh engine restarting mode. When the hybrid driving system is in the seventh engine restarting mode, and when the remaining braking energy is insufficient to restart the engine, only a single motor is used for energy recovery; and when only a single motor is used for braking energy recovery, and when the remaining braking energy is still insufficient to start the engine, the second braking energy recovery mode is disabled, and the engine is restarted by using all the braking energy. In the present embodiment, the power transmission route in the seventh engine restarting mode is the same as the power transmission route in the seventh engine restarting mode in the second embodiment.

(29) The Eighth Engine Restarting Mode

When the braking process (long braking) in the third braking energy recovery mode is about to be completed, the engine is restarted to establish the eighth engine restarting mode. When the hybrid driving system is in the eighth engine restarting mode, and when the remaining braking energy is insufficient to restart the engine, only a single motor is used for energy recovery; and when only a single motor is used for braking energy recovery, and when the remaining braking energy is still insufficient to start the engine, the third braking energy recovery mode is disabled, and the engine is restarted by using all the braking energy. In the present embodiment, the power transmission route in the eighth engine restarting mode is the same as the power transmission route in the eighth engine restarting mode in the second embodiment.

(30) The Ninth Engine Restarting Mode

When the braking process (long braking) in the fourth braking energy recovery mode is about to be completed, the engine is restarted to establish the ninth engine restarting mode. When the hybrid driving system is in the ninth engine restarting mode, and when the remaining braking energy is insufficient to restart the engine, only a single motor is used for energy recovery; and when only a single motor is used for braking energy recovery, and when the remaining braking energy is still insufficient to start the engine, the fourth braking energy recovery mode is disabled, and the engine is restarted by using all the braking energy. In the present embodiment, the power transmission route in the ninth engine restarting mode is the same as the power transmission route in the ninth engine restarting mode in the second embodiment.

(31) The Tenth Engine Restarting Mode

When the braking process (long braking) in the fifth braking energy recovery mode is about to be completed, the engine is restarted to establish the tenth engine restarting mode. When the hybrid driving system is in the tenth engine restarting mode, and when the remaining braking energy is insufficient to restart the engine, only a single motor is used for energy recovery; and when only a single motor is used for braking energy recovery, and when the remaining braking energy is still insufficient to start the engine, the fifth braking energy recovery mode is disabled, and the engine is restarted by using all the braking energy. In the present embodiment, the power transmission route in the tenth engine restarting mode is the same as the power transmission route in the tenth engine restarting mode in the second embodiment.

(32) The Eleventh Engine Restarting Mode

Figure 41:
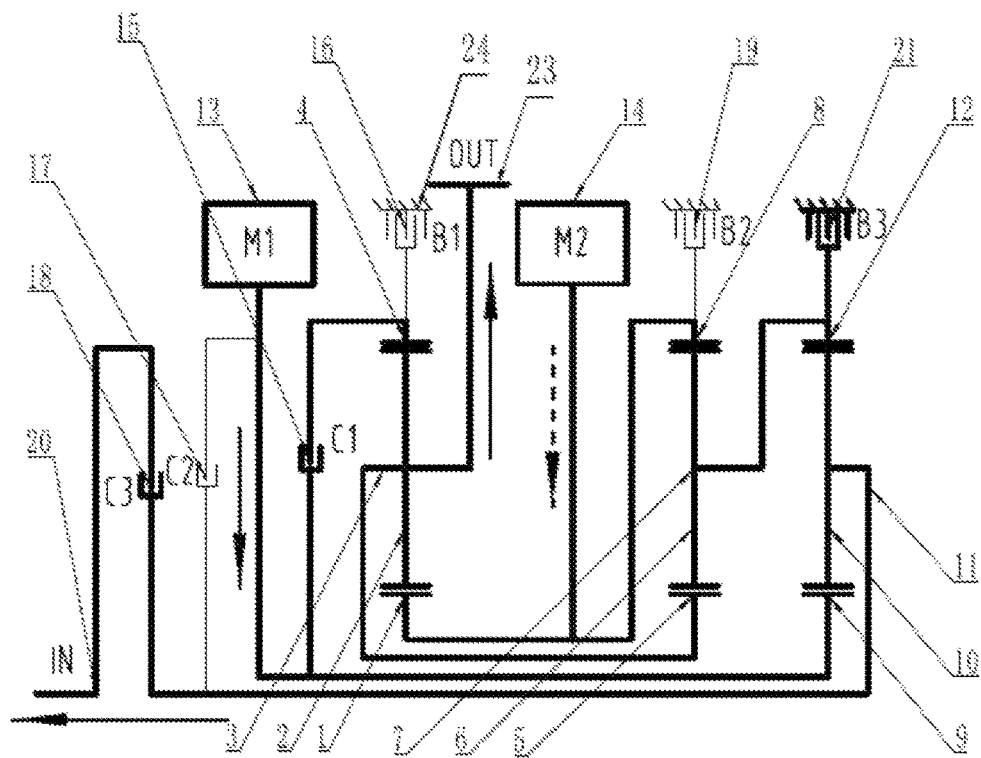
FIG. 41 is a power transmission route diagram of the hybrid driving system provided by the fourth embodiment of the present disclosure in an eleventh engine restarting mode.

When the output power of the hybrid driving system in the 6-gear pure electric mode is insufficient to meet the driving power demand of the vehicle or the battery power is relatively low, the engine is restarted to establish the eleventh engine restarting mode. When the hybrid driving system is in the eleventh engine restarting mode, and when the power of one motor is insufficient to meet the driving power demand of the vehicle and start the engine, the output power of the other motor is used. In the present embodiment, the power transmission route in the eleventh engine restarting mode is as shown in FIG. 41.

(33) The Twelfth Engine Restarting Mode

Figure 42:
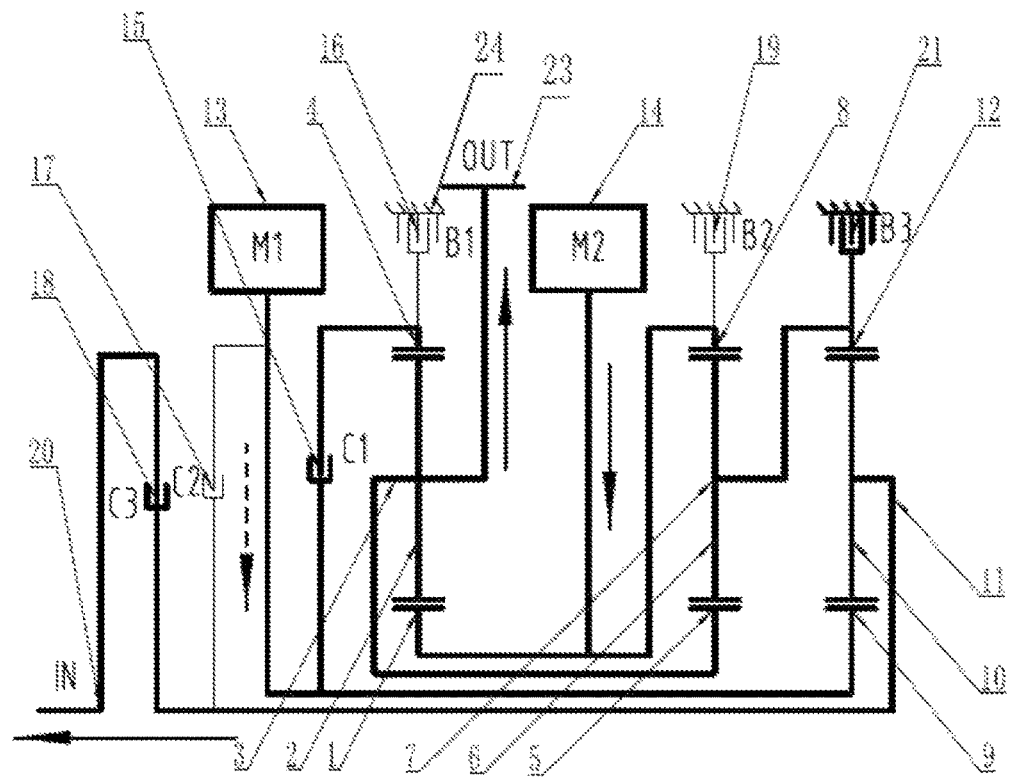
FIG. 42 is a power transmission route diagram of the hybrid driving system provided by the fourth embodiment of the present disclosure in a twelfth engine restarting mode.

When the output power of the hybrid driving system in the 7-gear pure electric mode is insufficient to meet the driving power demand of the vehicle or the battery power is relatively low, the engine is restarted to establish the twelfth engine restarting mode. When the hybrid driving system is in the twelfth engine restarting mode, and when the power of one motor is insufficient to meet the driving power demand of the vehicle and start the engine, the output power of the other motor is used. In the present embodiment, the power transmission route in the twelfth engine restarting mode is as shown in FIG. 42.

(34) The Thirteenth Engine Restarting Mode

Figure 43:
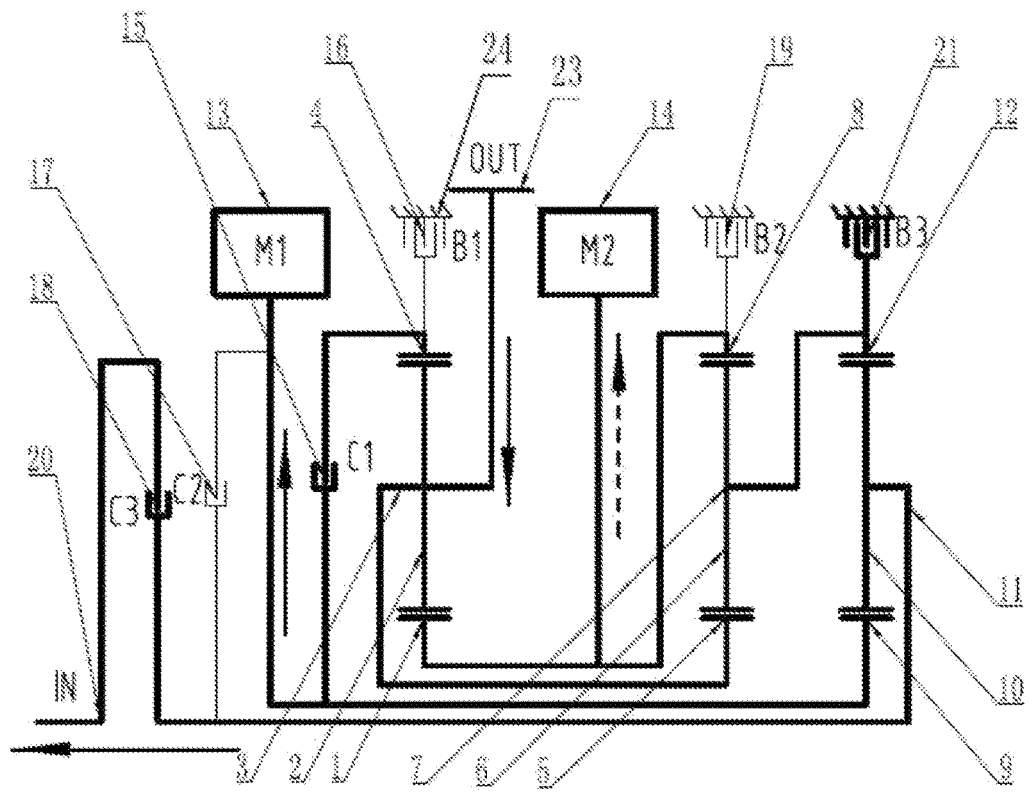
FIG. 43 is a power transmission route diagram of the hybrid driving system provided by the fourth embodiment of the present disclosure in a thirteenth engine restarting mode.

When the braking process (long braking) in the sixth braking energy recovery mode is about to be completed, the engine is restarted to establish the thirteenth engine restarting mode. When the hybrid driving system is in the thirteenth engine restarting mode, and when the remaining braking energy is insufficient to restart the engine, only a single motor is used for energy recovery; and when only a single motor is used for braking energy recovery, and when the remaining braking energy is still insufficient to start the engine, the sixth braking energy recovery mode is disabled, and the engine is restarted by using all the braking energy. In the present embodiment, the power transmission route in the thirteenth engine restarting mode is as shown in FIG. 43.

(35) The Fourteenth Engine Restarting Mode

Figure 44:
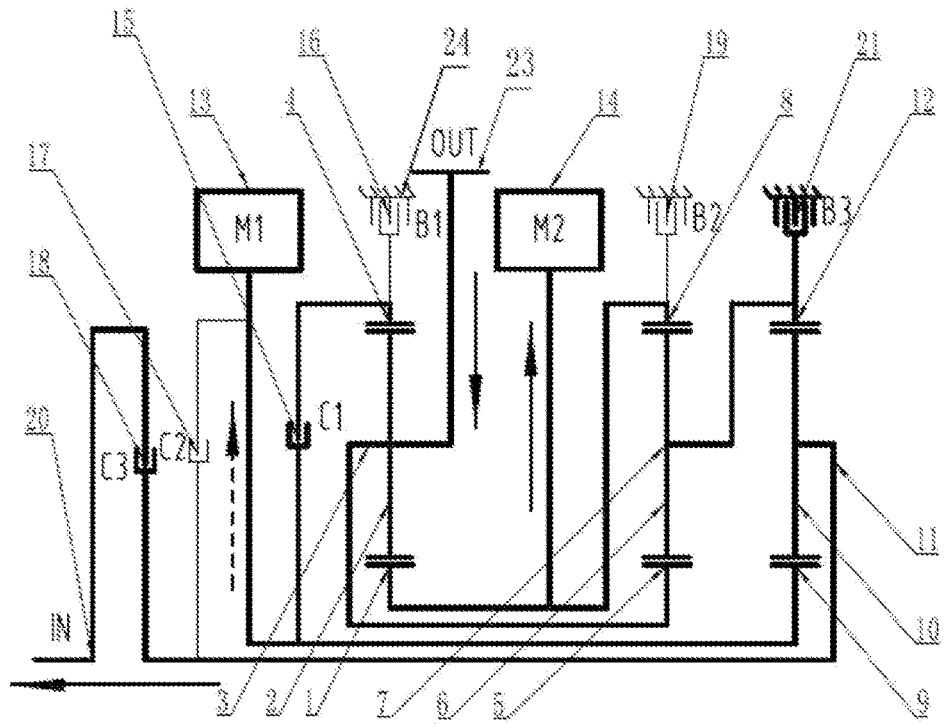
FIG. 44 is a power transmission route diagram of the hybrid driving system provided by the fourth embodiment of the present disclosure in a fourteenth engine restarting mode.

When the braking process (long braking) in the seventh braking energy recovery mode is about to be completed, the engine is restarted to establish the fourteenth engine restarting mode. When the hybrid driving system is in the fourteenth engine restarting mode, and when the remaining braking energy is insufficient to restart the engine, only a single motor is used for energy recovery; and when only a single motor is used for braking energy recovery, and when the remaining braking energy is still insufficient to start the engine, the seventh braking energy recovery mode is disabled, and the engine is restarted by using all the braking energy. In the present embodiment, the power transmission route in the fourteenth engine restarting mode is as shown in FIG. 44.

The hybrid driving system in the fourth embodiment has the following advantages:
  (1) Two E-CVT modes (the first E-CVT mode and the second E-CVT mode) are realized. The first E-CVT mode (the input splitting mode) is used at the low speed section, and the second E-CVT mode (the composite splitting mode) is used at the medium and high speed sections, so that the system can obtain transmission efficiency as high as possible.

(2) Seven gears of pure electric modes (the 1-gear pure electric drive mode, the 2-gear pure electric drive mode, the 3-gear pure electric drive mode, the 4-gear pure electric drive mode, the 5-gear pure electric drive mode, the 6-gear pure electric drive mode and the 7-gear pure electric drive mode) are realized, therefore the motors can be in a high efficiency working interval as much as possible in the pure electric modes, and the transmission efficiency is improved, which is particularly important for plug-in hybrid electric vehicles.

(3) Working modes of multiple fixed speed ratios are realized, the electric power loss is further reduced, the transmission efficiency is improved, the stalling of the motors can be eliminated by introducing the fixed speed ratios, the losses of the motors are reduced, and the lives of the motors are prolonged.

(4) Five engine direct drive/parallel modes (the 1-gear engine direct-drive/parallel mode, the 2-gear engine direct-drive/parallel mode, the 3-gear engine direct-drive/parallel mode, the 4-gear engine direct-drive/parallel mode and the 5-gear engine direct-drive/parallel mode) are realized, the electric power loss is further reduced, the transmission efficiency is improved, the stalling of the motors can be eliminated by introducing the fixed speed ratios, the losses of the motors are reduced, and the lives of the motors are prolonged.

(5) The braking energy recovery modes of seven fixed gears (the first braking energy recovery mode, the second braking energy recovery mode, the third braking energy recovery mode, the fourth braking energy recovery mode, the fifth braking energy recovery mode, the sixth braking energy recovery mode and the seventh braking energy recovery mode) are realized, and there are corresponding braking energy recovery modes at low, medium and high speed sections to ensure that the braking capacity of each speed section can be fully utilized.

(6) The engine restarting modes of fourteen fixed gears (the first engine restarting mode, the second engine restarting mode, the third engine restarting mode, the fourth engine restarting mode, the fifth engine restarting mode, the sixth engine restarting mode, the seventh engine restarting mode, the eighth engine restarting mode, the ninth engine restarting mode, the tenth engine restarting mode, the eleventh engine restarting mode, the twelfth engine restarting mode, the thirteenth engine restarting mode and the fourteenth engine restarting mode) are realized, so that the engine can be started at any time on demand in the pure electric modes or the braking energy recovery modes at various speed sections.

Figure 45:
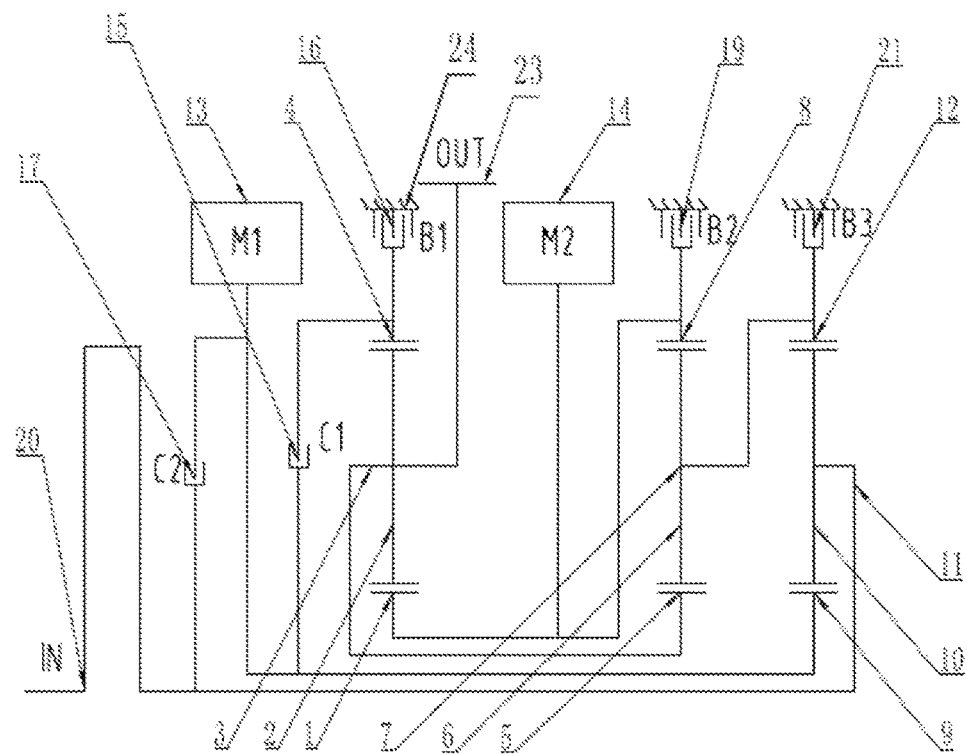
FIG. 45 is a schematic diagram of a hybrid driving system provided by a fifth embodiment of the present disclosure.

In addition, referring to FIG. 45, it shows a hybrid driving system provided by a fifth embodiment of the present disclosure. The difference with the fourth embodiment is that in the present embodiment, the third clutch 18 is canceled, and the input element 20 is directly connected to the third planet carrier 11. The direct connection between the input element 20 and the third planet carrier 11 is spline connection, welding or integral formation. Compared with the fourth embodiment, one clutch is omitted in the fifth embodiment, so that the structure of the hybrid driving system is simpler, and the cost is lower. In addition, the fifth embodiment does not involve the control of the third clutch 18, so that the control of the hybrid driving system is simpler. In the fifth embodiment, the operating logic in each working mode is as shown in Table 5.

TABLE 5

Working mode operating logic table (fifth embodiment)

| Working mode | First clutch | Second clutch | First brake | Second brake | Third brake | Speed ratio or mechanical point speed ratio (transmission ratio) |
|---|---|---|---|---|---|---|
| First E-CVT mode | | | • | | | $K3 * (K1 * K2 + K2 + 1)/(1 + K2)/(1 + K3)$ |
| Second E-CVT mode | • | | | | | $i1 = K3 * (K1 * K2 + K2 + 1)/(1 + K2)/(1 + K3)$ <br> $i2 = (K1 * K3 + (1 + K1) * (1 + K2))/K1/(1 + K2)/(1 + K3)$ |
| 1-gear pure electric mode | | • | • | | | $(K1 * K2 + K2 + 1)/(K2 + 1)$ |
| 2-gear pure electric mode | | • | • | | | $K1 + 1$ |
| 3-gear pure electric mode | • | | • | | | $K1 + 1$ |
| 4-gear pure electric mode | | • | | • | | $(K1 + 1)/K1$ |
| 5-gear pure electric mode | • | • | | | | $1$ |
| 6-gear pure electric mode | • | | | | • | $(1 + K1 * K2 + K2)/K1/K2$ |
| 7-gear pure electric mode | • | | | | • | $-1/K2$ |
| 1-gear engine direct drive/parallel mode | | • | • | | | $(K1 * K2 + K2 + 1)/(K2 + 1)$ |
| 2-gear engine direct drive/parallel mode | | • | | • | | $K3 * (1 + K2 + K1 * K2)/(1 + K2)/(1 + K3)$ |
| 3-gear engine direct drive/parallel mode | • | • | | | | $1$ |

TABLE 5-continued

Working mode operating logic table (fifth embodiment)

| Working mode | First clutch | Second clutch | First brake | Second brake | Third brake | Speed ratio or mechanical point speed ratio (transmission ratio) |
|---|---|---|---|---|---|---|
| 4-gear engine direct drive/parallel mode | • | | | • | | (1 + K1 + K2 + K1 * K2 + K1 * K3)/K1/(1 + K2)/(1 + K3) |
| 5-gear engine direct drive/parallel mode | • | | | | • | (1 + K2 * (1 + K1))/K1/K2/(1 + K3) |
| First braking energy recovery mode | | • | • | | | (K2 + 1)/(K1 * K2 + K2 + 1) |
| Second braking energy recovery mode | | • | • | | | 1/(K1 + 1) |
| Third braking energy recovery mode | | • | • | | | 1/(K1 + 1) |
| Fourth braking energy recovery mode | | • | | • | | K1/(1+K1) |
| Fifth braking energy recovery mode | | • | • | | | 1 |
| Sixth braking energy recovery mode | | • | | • | | |
| Seventh braking energy recovery mode | • | | | • | | |
| First engine restarting mode | | • | • | | | |
| Second engine restarting mode | | • | • | | | |
| Third engine restarting mode | | • | • | | | |
| Fourth engine restarting mode | | • | | • | | |
| Fifth engine restarting mode | | • | • | | | |
| Sixth engine restarting mode | | • | • | | | |
| Seventh engine restarting mode | | • | • | | | |
| Eight engine restarting mode | | • | • | | | |
| Ninth engine restarting mode | | • | | | • | |
| Tenth engine restarting mode | | • | • | | | |
| Eleventh engine restarting mode | • | | | | • | |
| Twelfth engine restarting mode | • | | | | • | |
| Thirteenth engine restarting mode | • | | | | • | |
| Fourteenth engine restarting mode | • | | | | • | |

In Table 5, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

In the fifth embodiment, it is only necessary to cancel the third clutch 18 and its control on the basis of the fourth embodiment. Therefore, in the fifth embodiment, the power transmission routes in various operating modes are similar to those in the fourth embodiment.

Figure 46:
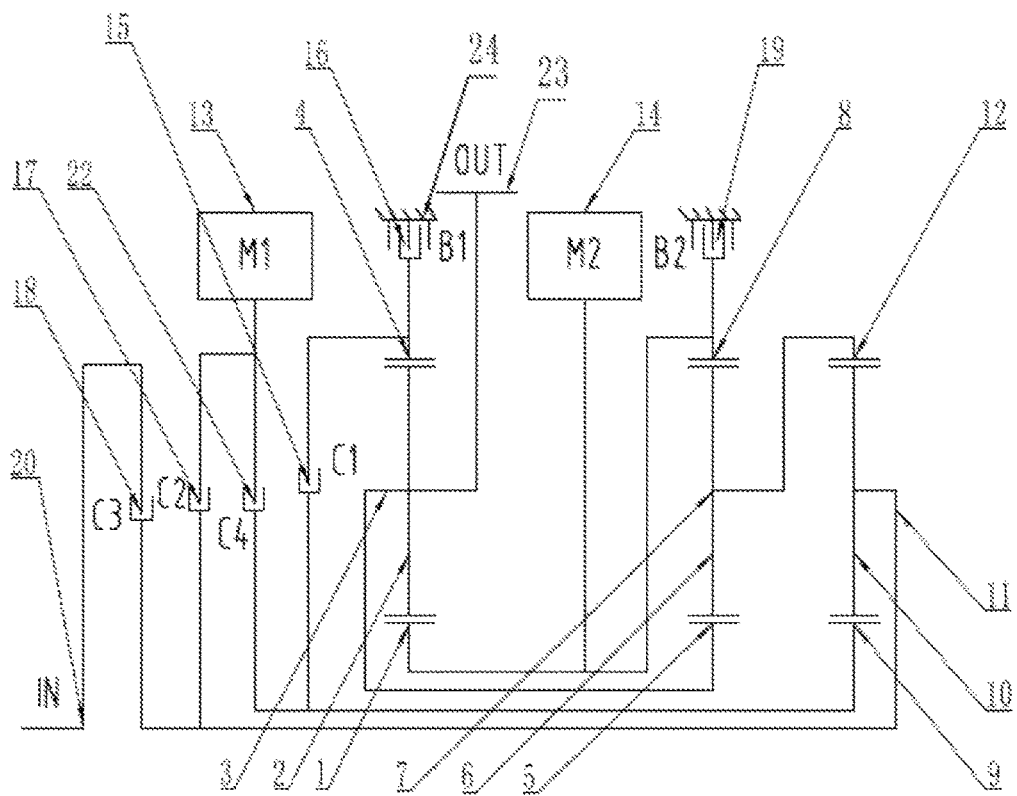
FIG. 46 is a schematic diagram of a hybrid driving system provided by a sixth embodiment of the present disclosure.

Referring to FIG. 46, a hybrid driving system provided by a sixth embodiment of the present disclosure is shown, including an engine (not shown in the figures), an input element 20, an output element 23, a box body 24, a first motor 13, a second motor 14, a first planet row, a second planet row, a third planet row, a first clutch 15, a second clutch 17, a third clutch 18, a fourth clutch 22, a first brake 16 and a second brake 19.

In the present embodiment, the first planet row, the second planet row and the third planet row are all single planet rows (simple planet rows).

The first planet row includes a first sun gear 1, a first planet gear 2, a first gear ring 4 and a first planet carrier 3, the first sun gear 1 is in external meshing transmission with the first planet gear 2, the first planet gear 2 is in internal meshing transmission with the first gear ring 4, and the first planet gear 2 is rotatably supported on the first planet carrier 3 through a rolling bearing or a sliding bearing.

The second planet row includes a second sun gear 5, a second planet gear 6, a second gear ring 8 and a second planet carrier 7, the second sun gear 5 is in external meshing transmission with the second planet gear 6, the second planet gear 6 is in internal meshing transmission with the second gear ring 8, and the second planet gear 6 is rotatably supported on the second planet carrier 7 through a rolling bearing or a sliding bearing.

The third planet row includes a third sun gear 9, a third planet gear 10, a third gear ring 12 and a third planet carrier 11, the third sun gear 9 is in external meshing transmission with the third planet gear 10, the third planet gear 10 is in internal meshing transmission with the third gear ring 12, and the third planet gear 10 is rotatably supported on the third planet carrier 11 through a rolling bearing or a sliding bearing.

As shown in FIG. 46, the first sun gear 1 and the second gear ring 8 are both connected to the second motor 14, the first planet carrier 3 is fixedly connected to the second sun gear 5, the second planet carrier 7 is fixedly connected to the third gear ring 12, the third sun gear 9 is connected to the first motor 13, the input element 20 is connected between the engine and the third planet carrier 11, and the output element 23 is connected to the first planet carrier 3. The fixed connection here can be spline connection, welding or integral formation. That is, the first sun gear 1 and the second gear ring 8 are splined, welded or integrally formed with the rotor of the second motor 14, the first planet carrier 3 is splined, welded or integrally formed with the second sun gear 5, the second planet carrier 7 is splined, welded or integrally formed with the third gear ring 12, and the third sun gear 9 is splined, welded or integrally formed with the rotor of the first motor 13.

As shown in FIG. 9, the first gear ring 4 is connected to the third sun gear 9 through the first clutch 15, the first gear ring 4 is connected to the box body 24 through the first brake 16, the second gear ring 8 is connected to the box body 24 through the second brake 19, the second clutch 17 is connected between the third sun gear 9 and the third planet carrier 11, and the third sun gear 9 is connected to the rotor of the first motor 13 through the fourth clutch 22.

The function of the second clutch 17 is to realize the integral rotation of the third planet row. Therefore, the second clutch 17 is connected between any two of the third sun gear 9, the third planet carrier 11 and the third gear ring 12.

In the present embodiment, the input element 20 is connected to the third planet carrier 11 through the third clutch 18.

According to the hybrid driving system in the sixth embodiment of the present disclosure, a basic double-planet-row planet gear configuration is provided through the planet row mechanical structure and the reasonable layout of multiple operating elements (the first clutch 15, the second clutch 17, the third clutch 18, the fourth clutch 22, the first brake 16 and the second brake 19), which can realize three E-CVT working modes to obtain higher transmission efficiency. By selectively engaging one or more of the first clutch 15, the second clutch 17, the third clutch 18, the fourth clutch 22, the first brake 16 and the second brake 19, more working modes can be realized to further obtain higher transmission efficiency.

The hybrid driving system in the present embodiment has multiple working modes, specifically: four E-CVT modes (a first E-CVT mode, a second E-CVT mode, a third E-CVT mode and a fourth E-CVT mode), 5 gears of pure electric modes (a 1-gear pure electric mode, a 2-gear pure electric mode, a 3-gear pure electric mode, a 4-gear pure electric mode and a 5-gear pure electric mode), four gears of engine direct drive/parallel modes (a 1-gear engine direct drive/parallel mode, a 2-gear engine direct drive/parallel mode, a 3-gear engine direct drive/parallel mode and a 4-gear engine direct drive/parallel mode), 5 braking energy recovery modes (a first braking energy recovery mode, a second braking energy recovery mode, a third braking energy recovery mode, a fourth braking energy recovery mode and a fifth braking energy recovery mode), and 10 engine restarting modes (a first engine restarting mode, a second engine restarting mode, a third engine restarting mode, a fourth engine restarting mode, a fifth engine restarting mode, a sixth engine restarting mode, a seventh engine restarting mode, an eighth engine restarting mode, a ninth engine restarting mode and a tenth engine restarting mode). The operating logic in each working mode is as shown in Table 6.

TABLE 6

Working mode operating logic table (sixth embodiment)

| Working mode | First clutch | Second clutch | Third clutch | Fourth clutch | First brake | Second brake | Speed ratio or mechanical point speed ratio (transmission ratio) |
|---|---|---|---|---|---|---|---|
| First E-CVT mode | | | • | • | • | | $K3 * (K1 * K2 + K2 + 1)/(1 + K2)/(1 + K3)$ |
| Second E-CVT mode | • | | • | • | | | $i1 = K3 * (K1 * K2 + K2 + 1)/(1 + K2)/(1 + K3)$<br>$i2 = (K1 * K3 + (1 + K1) * (1 + K2))/K1/(1 +$ |
| Third E-CVT mode | • | • | • | | | | $((1 + K1) * (1 + K2) + K1 * K3)/K1/(1 + K2)/(1 + K3)$ |
| Fourth E-CVT mode | | • | • | • | | | $1/(1 + K2)$ |
| 1-gear pure electric mode | | • | • | | • | | $(K1 * K2 + K2 + 1)/(K2 + 1)$ |

TABLE 6-continued

Working mode operating logic table (sixth embodiment)

| Working mode | First clutch | Second clutch | Third clutch | Fourth clutch | First brake | Second | Speed ratio or mechanical point speed ratio (transmission ratio) |
|---|---|---|---|---|---|---|---|
| 2-gear pure electric mode | | • | | • | • | | $K1 + 1$ |
| 3-gear pure electric mode | • | | | | • | | $K1 + 1$ |
| 4-gear pure electric mode | • | | | • | | • | $(K1 + 1)/K1$ |
| 5-gear pure electric mode | • | • | | | • | | $1$ |
| 1-gear engine direct drive/parallel mode | • | | • | • | • | | $(K1 * K2 + K2 + 1)/(K2 + 1)$ |
| 2-gear engine direct drive/parallel mode | • | | • | | • | | $K3 * (1 + K2 + K1 * K2)/(1 + K2)/(1 + K3)$ |
| 3-gear engine direct drive/parallel mode | • | • | • | | • | | $1$ |
| 4-gear engine direct drive/parallel mode | • | | • | • | | • | $(1 + K1 + K2 + K1 * K2 + K1 * K3)/K1/(1 + K2)/(1 + K3)$ |
| First braking energy recovery mode | | • | | • | • | | $(K2 + 1)/(K1 * K2 + K2 + 1)$ |
| Second braking energy recovery | | • | | • | • | | $1/(K1 + 1)$ |
| Third braking energy recovery mode | • | | | | • | | $1/(K1 + 1)$ |
| Fourth braking energy recovery mode | • | | | • | | • | $K1/(1 + K1)$ |
| Fifth braking energy recovery mode | • | • | | | • | | $1$ |
| First engine restarting mode | | • | • | | • | | |
| Second engine restarting mode | | • | • | | • | | |
| Third engine restarting mode | • | | • | | • | | |
| Fourth engine restarting mode | • | | • | | | • | |
| Fifth engine restarting mode | • | • | • | | | | |
| Sixth engine restarting mode | | • | • | | • | | |
| Seventh engine restarting mode | • | • | • | | | | |

TABLE 6-continued

Working mode operating logic table (sixth embodiment)

| Working mode | First clutch | Second clutch | Third clutch | Fourth clutch | First brake | Second | Speed ratio or mechanical point speed ratio (transmission ratio) |
|---|---|---|---|---|---|---|---|
| Eight engine restarting mode | • | | • | | • | | |
| Ninth engine restarting mode | • | | • | | | • | |
| Tenth engine restarting mode | • | • | • | | | | |

In Table 6, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

Figure 47:
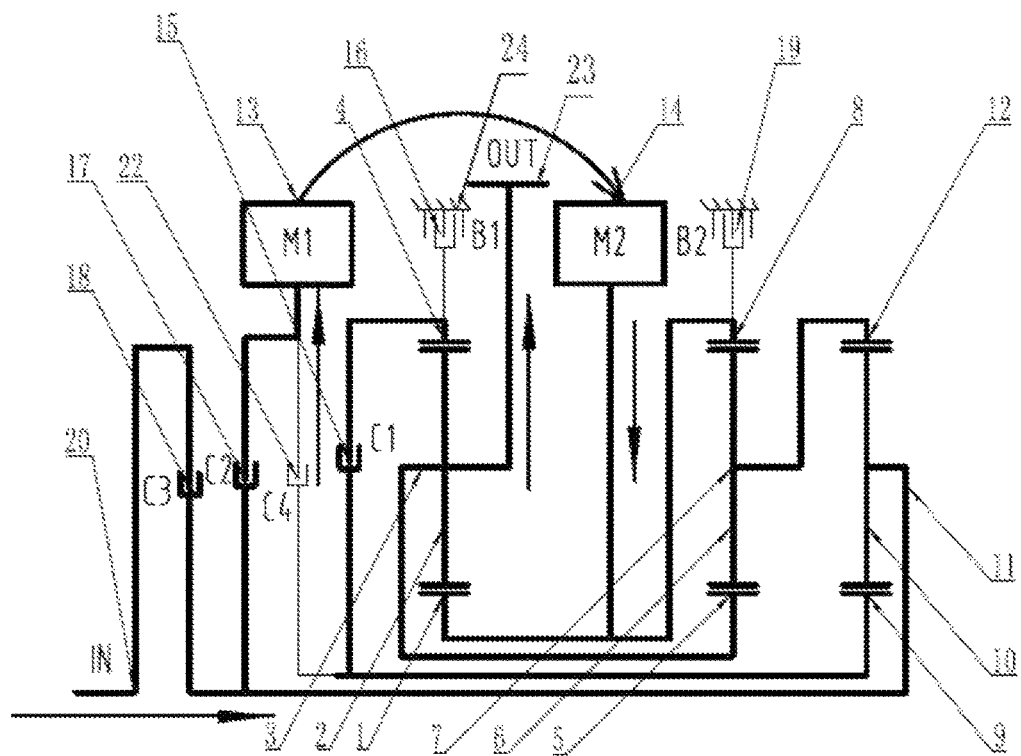
FIG. 47 is a power transmission route diagram of the hybrid driving system provided by the sixth embodiment of the present disclosure in a third E-CVT mode.
Figure 48:
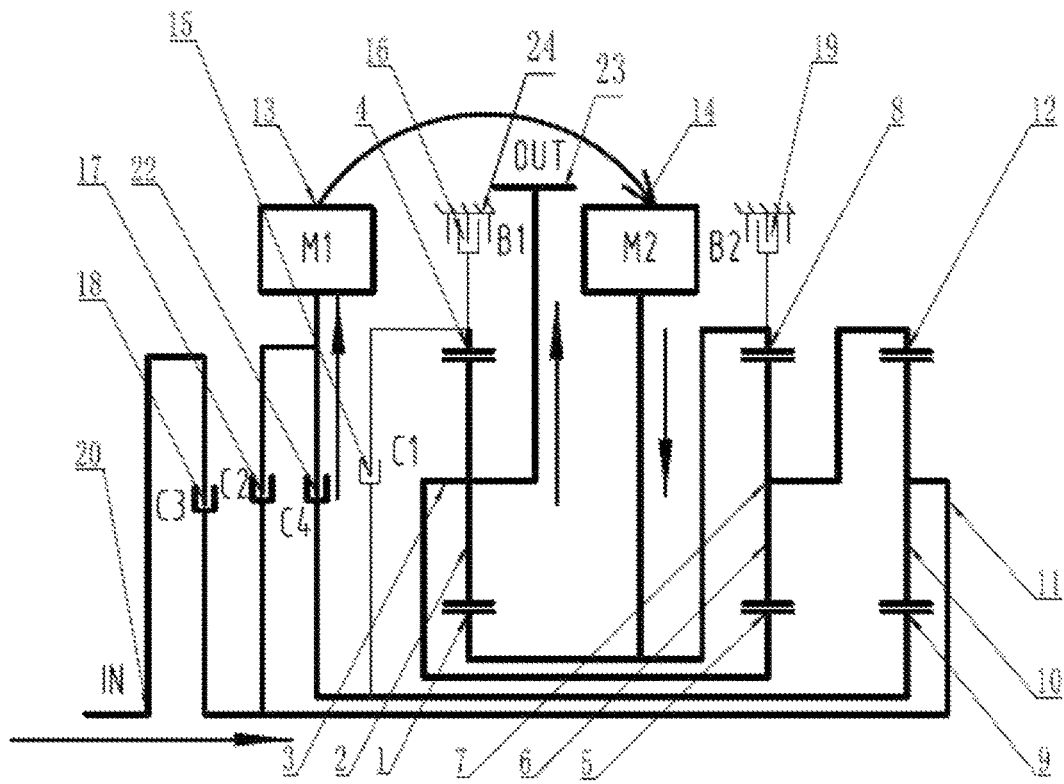
FIG. 48 is a power transmission route diagram of the hybrid driving system provided by the sixth embodiment of the present disclosure in a fourth E-CVT mode.

The power transmission routes (lines on the transmission routes are thickened) in various working modes in the sixth embodiment will be described in detail below in conjunction with FIG. 46 to FIG. 48.

(1) The 1-Gear Pure Electric Mode

The second clutch 17, the fourth clutch 22 and the first brake 16 are engaged, and the first clutch 15, the third clutch 18 and the second brake 19 are disengaged to realize the 1-gear pure electric mode. In this mode, the engine does not participate in working, the first motor 13 and the second motor 14 are both driving motors, the first motor 13 performs main driving and the second motor 14 performs auxiliary driving, the first motor 13 performs main driving to realize large speed ratio starting, and when the output power of the main driving motor (the first motor 13) is insufficient to drive the vehicle, the second motor 14 performs auxiliary driving. In this mode, the third clutch 18 is disengaged to reduce the loss caused by the inertia of the engine. The power transmission route in this mode is the same as the power transmission route in the 1-gear pure electric mode in the second embodiment, and the transmission ratio is: $i=(K1*K2+K2+1)/(K2+1)$.

(2) The 2-Gear Pure Electric Mode

The second clutch 17, the fourth clutch 22 and the first brake 16 are engaged, and the first clutch 15, the third clutch 18 and the second brake 19 are disengaged to realize the 2-gear pure electric mode. In this mode, the engine does not participate in working, the first motor 13 and the second motor 14 are both driving motors, the first motor 13 performs auxiliary driving and the second motor 14 performs main driving, the second motor 14 performs main driving to realize large speed ratio starting, and when the output power of the main driving motor (the second motor 14) is insufficient to drive the vehicle, the first motor 13 performs auxiliary driving. In this mode, the third clutch 18 is disengaged to reduce the loss caused by the inertia of the engine. The power transmission route in this mode is the same as the power transmission route in the 2-gear pure electric mode in the second embodiment, and the transmission ratio is: $i=K1+1$.

(3) The 3-Gear Pure Electric Mode

The first clutch 15, the fourth clutch 22 and the first brake 16 are engaged, and the second clutch 17, the third clutch 18 and the second brake 19 are disengaged to realize the 3-gear pure electric mode. In this mode, the engine and the first motor 13 do not participate in working, and the second motor 14 performs driving. The difference with the 2-gear pure electric mode is that only the second motor 14 can be used, when its power meets the requirements of the vehicle, compared with the 2-gear pure electric mode, the dragging can be reduced, and the transmission efficiency can be improved. In this mode, the third clutch 18 is disengaged to reduce the loss caused by the inertia of the engine. The power transmission route in this mode is the same as the power transmission route in the 3-gear pure electric mode in the second embodiment, and the transmission ratio is: $i=K1+1$.

(4) The 4-Gear Pure Electric Mode

The first clutch 15, the fourth clutch 22 and the second brake 19 are engaged, and the second clutch 17, the third clutch 18 and the first brake 16 are disengaged to realize the 4-gear pure electric mode. In this mode, the engine and the second motor 14 do not participate in working, and the first motor 13 performs driving. In this mode, the third clutch 18 is disengaged to reduce the loss caused by the inertia of the engine. The power transmission route in this mode is the same as the power transmission route in the 4-gear pure electric mode in the second embodiment, and the transmission ratio is: $i=(K1+1)/K1$.

(5) The 5-Gear Pure Electric Mode

The first clutch 15, the second clutch 17 and the fourth clutch 22 are engaged, and the third clutch 18, the first brake 16 and the second brake 19 are disengaged to realize the 5-gear pure electric mode. In this mode, the engine does not participate in working, the first motor 13 and the second motor 14 are both driving motors, both the first motor 13 and the second motor 14 can be used as main driving motors, that is, one of the first motor 13 and the second motor 14 is used as a main driving motor, and the other is used as an auxiliary driving motor. When the output power of one of the motors is insufficient to drive the vehicle, the output power of the other motor provides assistance. In this mode, the third clutch 18 is disengaged to reduce the loss caused by the inertia of the engine. The power transmission route in this mode is the same as the power transmission route in the 5-gear pure electric mode in the second embodiment. The 5-gear pure electric mode is a direct gear, and its transmission ratio is 1.

(6) The First E-CVT Mode

The first brake 16, the third clutch 18 and the fourth clutch 22 are engaged, and the first clutch 15, the second clutch 17 and the second brake 19 are disengaged to realize the first E-CVT mode. The first E-CVT mode is the input power splitting mode, which has high transmission efficiency when the speed ratio is lower than the mechanical point speed ratio in this mode, so it is suitable for low-speed working conditions. In this mode, the engine and the second motor 14 perform driving together, and the first motor 13 generates electricity for the driving of the second motor 14. The power transmission route in this mode is the same as the power transmission route in the first E-CVT mode in the second embodiment, and the mechanical point speed ratio in this mode is: $i=K3*(K1*K2+K2+1)/(1+K2)/(1+K3)$.

(7) The Second E-CVT Mode

The first brake 16, the third clutch 18 and the fourth clutch 22 are engaged, and the first clutch 15, the second clutch 17 and the second brake 19 are disengaged to realize the second E-CVT mode. This mode is the composite power splitting mode, which has high transmission efficiency when the speed ratio is between the two mechanical point speed ratios in the second E-CVT mode, so it is suitable for medium and high speed sections. In this mode, the engine performs driving, the first motor 13 performs driving or generates electricity, and the second motor 14 performs driving or generates electricity. Generally, when the vehicle speed is close to the low speed section, the second motor 14 generates electricity, the first motor 13 performs driving, and the electricity generated by the second motor 14 is directly used for the driving of the first motor 13. When the vehicle speed is close to the high speed section, the first motor 13 generates electricity, the second motor 14 performs driving, and the electricity generated by the first motor 13 is directly used for the driving of the second motor 14. The power transmission route in this mode is the same as the power transmission route in the second E-CVT mode in the second embodiment. At this time, the two mechanical point speed ratios are respectively as follows: the first mechanical point speed ratio $i1=K3*(K1*K2+K2+1)/(1+K2)/(1+K3)$, and the second mechanical point speed ratio $i2=(K1*K3+(1+K1)*(1+K2))/K1/(1+K2)/(1+K3)$.

(8) The Third E-CVT Mode

The first clutch 15, the second clutch 17 and the third clutch 18 are engaged, and the fourth clutch 22, the first brake 16 and the second brake 19 are disengaged to realize the third E-CVT mode. The third E-CVT mode is the output splitting mode, and when the speed ratio exceeds the second mechanical point speed ratio in the second E-CVT mode, in order that the system still obtains higher transmission efficiency, the third E-CVT mode is adopted. The third E-CVT mode is the output splitting mode. In this mode, the engine and the second motor 14 perform driving together, and the first motor 13 generates electricity for the driving of the second motor 14. The power transmission route in this mode is as shown in FIG. 47, and the mechanical point speed ratio in this mode is: $i=i=((1+K1)*(1+K2)+K1*K3)/K1/(1+K2)/(1+K3)$.

(9) The Fourth E-CVT Mode

The second clutch 17, the third clutch 18 and the fourth clutch 22 are engaged, and the first clutch 15, the first brake 16 and the second brake 19 are disengaged to realize the fourth E-CVT mode. The fourth E-CVT mode is the output splitting mode. When the speed ratio exceeds the second mechanical point speed ratio in the second E-CVT mode, and as the vehicle speed further increases, for vehicles pursuing high speed performance, it is hoped that they can still have higher transmission efficiency at higher vehicle speeds. In order that the system still obtains higher transmission efficiency, the fourth E-CVT mode is adopted, and the fourth E-CVT mode is the output splitting mode. In this mode, the engine and the second motor 14 perform driving together, and the first motor 13 generates electricity for the driving of the second motor 14. The power transmission route in this mode is as shown in FIG. 48, and the mechanical point speed ratio in this mode is: $i=1/(1+K2)$.

(10) The 1-Gear Engine Direct Drive/Parallel Mode

The second clutch 17, the third clutch 18, the fourth clutch 22 and the first brake 16 are engaged, and the first clutch 15 and the second brake 19 are disengaged to realize the 1-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The power transmission route in this mode is the same as the power transmission route in the 1-gear engine direct drive/parallel mode in the second embodiment, and the corresponding transmission ratio is: $i=(K1*K2+K2+1)/(K2+1)$.

(11) The 2-Gear Engine Direct Drive/Parallel Mode

The second clutch 17, the third clutch 18, the fourth clutch 22 and the first brake 16 are engaged, and the first clutch 15 and the second brake 19 are disengaged to realize the 2-gear engine direct drive/parallel mode. In this mode, the first motor 13 does not participate in working, the engine performs driving, and the second motor 14 generates electricity or performs driving. When the output power of the engine is insufficient, the output power of the second motor 14 provides compensation. When the output power of the engine is excessive, the second motor 14 generates electricity, and the electricity is stored in the battery so as to realize parallel driving. The power transmission route in this mode is the same as the power transmission route in the 2-gear engine direct drive/parallel mode in the second embodiment. The transmission ratio in this mode is the first mechanical point speed ratio in the second E-CVT mode (the composite splitting mode), specifically: $i=K3*(1+K2+K1*K2)/(1+K2)/(1+K3)$.

(12) The 3-Gear Engine Direct Drive/Parallel Mode

The first clutch 15, the second clutch 17, the third clutch 18 and the fourth clutch 22 are engaged, and the first brake 16 and the second brake 19 are disengaged to realize the 3-gear engine direct drive/parallel mode. In this mode, the engine performs driving, the first motor 13 generates electricity or performs driving, and the second motor 14 generates electricity or performs driving. When the output power of the engine is insufficient, the output power of the first motor 13 and/or the second motor 14 provides compensation. When the output power of the engine is excessive, the first motor 13 and/or the second motor 14 generates electricity, and the electricity is stored in the battery so as to realize parallel driving. The power transmission route in this mode is the same as the power transmission route in the 3-gear engine direct drive/parallel mode in the second embodiment, and its transmission ratio is 1.

(13) The 4-Gear Engine Direct Drive/Parallel Mode

The second clutch 17, the third clutch 18, the fourth clutch 22 and the first brake 16 are engaged, and the first clutch 15 and the second brake 19 are disengaged to realize the 4-gear engine direct drive/parallel mode. In this mode, the second motor 14 does not participate in working, the engine performs driving, and the first motor 13 generates electricity or performs driving. When the output power of the engine is insufficient, the output power of the first motor 13 provides compensation. When the output power of the engine is excessive, the first motor 13 generates electricity, and the electricity is stored in the battery so as to realize parallel driving. The power transmission route in this mode is the same as the power transmission route in the 4-gear engine direct drive/parallel mode in the second embodiment. The transmission ratio in this mode is the second mechanical point speed ratio in the second E-CVT mode (the composite splitting mode), specifically: $i=(1+K1+K2+K1*K2+K1*K3)/K1/(1+K2)/(1+K3)$.

(14) The First Braking Energy Recovery Mode

The second clutch 17, the fourth clutch 22 and the first brake 16 are engaged, and the first clutch 15, the third clutch 18 and the second brake 19 are disengaged to realize the first braking energy recovery mode, and this mode corresponds to the inverse process of the 1-gear pure electric mode. In this mode, the engine does not participate in working, the first motor 13 and the second motor 14 are both generators, the first motor 13 performs main power generation and the second motor 14 performs auxiliary power generation, and when the generated output of the main generator (the first motor 13) is insufficient to absorb all the braking energy, in order to avoid the waste of the braking energy, the second motor 14 performs auxiliary power generation. Herein, the main power generation and the auxiliary power generation are distinguished by the generated output when the first motor 13 and the second motor 14 are used as generators, that is, the motor with greater generated output in the first motor 13 and the second motor 14 performs main power generation, and the motor with smaller generated output in the first motor 13 and the second motor 14 performs auxiliary power generation. In this mode, the third clutch 18 is disengaged to reduce the loss caused by the inertia of the engine. The power transmission route in this mode is the same as the power transmission route in the first braking energy recovery mode in the second embodiment, and the corresponding transmission ratio is: $i=(K2+1)/(K1*K2+K2+1)$.

(15) The Second Braking Energy Recovery Mode

The second clutch 17 and the first brake 16 are engaged, and the first clutch 15, the third clutch 18 and the second brake 19 are disengaged to realize the second braking energy recovery mode, and this mode corresponds to the inverse process of the 2-gear pure electric mode. In this mode, the engine does not participate in working, the first motor 13 and the second motor 14 are both generators, the first motor 13 performs auxiliary power generation and the second motor 14 performs main power generation, and when the generated output of the main generator (the second motor 14) is insufficient to absorb all the braking energy, in order to avoid the waste of the braking energy, the first motor 13 performs auxiliary power generation. In this mode, the third clutch 18 is disengaged to reduce the loss caused by the inertia of the engine. The power transmission route in this mode is the same as the power transmission route in the second braking energy recovery mode in the second embodiment, and corresponding transmission ratio is: $i=1/(K1+1)$.

(16) The Third Braking Energy Recovery Mode

The first clutch 15, the fourth clutch 22 and the first brake 16 are engaged, and the second clutch 17, the third clutch 18 and the second brake 19 are disengaged to realize the third braking energy recovery mode, and this mode corresponds to the inverse process of the 3-gear pure electric mode. In this mode, the engine and the first motor 13 do not participate in working, and the second motor 14 generates electricity. The difference with the second braking energy recovery mode is that only the second motor 14 can be used, when its generated output is sufficient to match the braking energy, compared with the second braking energy recovery mode, the dragging can be reduced, and the transmission efficiency can be improved. In this mode, the third clutch 18 is disengaged to reduce the loss caused by the inertia of the engine. The power transmission route in this mode is the same as the power transmission route in the third braking energy recovery mode in the second embodiment, and the corresponding transmission ratio is: $i=1/(K1+1)$.

(17) The Fourth Braking Energy Recovery Mode

The first clutch 15, the fourth clutch 22 and the second brake 19 are engaged, and the second clutch 17, the third clutch 18 and the first brake 16 are disengaged to realize the fourth braking energy recovery mode, and this mode corresponds to the inverse process of the 4-gear pure electric mode. In this mode, the engine and the second motor 14 do not participate in working, and the first motor 13 generates electricity. The difference with the second braking energy recovery mode is that only the first motor 13 can be used, when its generated output is sufficient to match the braking energy, compared with the second braking energy recovery mode, the dragging can be reduced, and the transmission efficiency can be improved. In this mode, the third clutch 18 is disengaged to reduce the loss caused by the inertia of the engine. The power transmission route in this mode is the same as the power transmission route in the fourth braking energy recovery mode in the second embodiment, and the corresponding transmission ratio is: $i=K1/(1+K1)$.

(18) The Fifth Braking Energy Recovery Mode

The first clutch 15, the second clutch 17 and the fourth clutch 22 are engaged, and the third clutch 18, the first brake 16 and the second brake 19 are disengaged to realize the fifth braking energy recovery mode, and this mode corresponds to the inverse process of the 5-gear pure electric mode. In this mode, the engine does not participate in working, the first motor 13 and the second motor 14 are both generators, one of the first motor 13 and the second motor 14 performs main power generation, and the other performs auxiliary power generation. When the generated output of one of the first motor 13 and the second motor 14 is insufficient to absorb all the braking energy, in order to avoid the waste of the braking energy, the other motor performs auxiliary power generation. In this mode, the third clutch 18 is disengaged to reduce the loss caused by the inertia of the engine. The power transmission route in this mode is the same as the power transmission route in the fifth braking energy recovery mode in the second embodiment, and the corresponding transmission ratio is 1.

(19) The First Engine Restarting Mode

Each pure electric mode and each braking energy recovery mode can correspond to an engine restarting mode. Specifically, when the power in each pure electric mode is insufficient to meet the driving power demand of the vehicle or the battery power is relatively low, and when the engine must be introduced, the engine restarting mode is used. When the long braking process is about to be completed and the engine needs to be restarted, the engine restarting mode is also used. The third clutch 19 is disengaged in each engine restarting mode.

When the output power of the hybrid driving system in the 1-gear pure electric mode is insufficient to meet the driving power demand of the vehicle or the battery power is relatively low, the engine is restarted to establish the first engine restarting mode. When the hybrid driving system is in the first engine restarting mode, and when the power of one motor is insufficient to meet the driving power demand of the vehicle and start the engine, the output power of the other motor is used. In the present embodiment, the power transmission route in the first engine restarting mode is the same as the power transmission route in the first engine restarting mode in the second embodiment.

(20) The Second Engine Restarting Mode

When the output power of the hybrid driving system in the 2-gear pure electric mode is insufficient to meet the driving power demand of the vehicle or the battery power is relatively low, the engine is restarted to establish the second engine restarting mode. When the hybrid driving system is in the second engine restarting mode, and when the power of one motor is insufficient to meet the driving power demand of the vehicle and start the engine, the output power of the other motor is used. In the present embodiment, the power transmission route in the second engine restarting mode is the same as the power transmission route in the second engine restarting mode in the second embodiment.

(21) The Third Engine Restarting Mode

When the output power of the hybrid driving system in the 3-gear pure electric mode is insufficient to meet the driving power demand of the vehicle or the battery power is relatively low, the engine is restarted to establish the third engine restarting mode. When the hybrid driving system is in the third engine restarting mode, and when the power of one motor is insufficient to meet the driving power demand of the vehicle and start the engine, the output power of the other motor is used. In the present embodiment, the power transmission route in the third engine restarting mode is the same as the power transmission route in the third engine restarting mode in the second embodiment.

(22) The Fourth Engine Restarting Mode

When the output power of the hybrid driving system in the 4-gear pure electric mode is insufficient to meet the driving power demand of the vehicle or the battery power is relatively low, the engine is restarted to establish the fourth engine restarting mode. When the hybrid driving system is in the fourth engine restarting mode, and when the power of one motor is insufficient to meet the driving power demand of the vehicle and start the engine, the output power of the other motor is used. In the present embodiment, the power transmission route in the fourth engine restarting mode is the same as the power transmission route in the fourth engine restarting mode in the second embodiment.

(23) The Fifth Engine Restarting Mode

When the output power of the hybrid driving system in the 5-gear pure electric mode is insufficient to meet the driving power demand of the vehicle or the battery power is relatively low, the engine is restarted to establish the fifth engine restarting mode. When the hybrid driving system is in the fifth engine restarting mode, and when the power of one motor is insufficient to meet the driving power demand of the vehicle and to start the engine, the output power of the other motor is used. In the present embodiment, the power transmission route in the fifth engine restarting mode is the same as the power transmission route in the fifth engine restarting mode in the second embodiment.

(24) The Sixth Engine Restarting Mode

When the braking process (long braking) in the first braking energy recovery mode is about to be completed, the engine is restarted to establish the sixth engine restarting mode. When the hybrid driving system is in the sixth engine restarting mode, and when the remaining braking energy is insufficient to restart the engine, only a single motor is used for energy recovery; and when only a single motor is used for braking energy recovery, and when the remaining braking energy is still insufficient to start the engine, the first braking energy recovery mode is disabled, and the engine is restarted by using all the braking energy. In the present embodiment, the power transmission route in the sixth engine restarting mode is the same as the power transmission route in the sixth engine restarting mode in the second embodiment.

(25) The Seventh Engine Restarting Mode

When the braking process (long braking) in the second braking energy recovery mode is about to be completed, the engine is restarted to establish the seventh engine restarting mode. When the hybrid driving system is in the seventh engine restarting mode, and when the remaining braking energy is insufficient to restart the engine, only a single motor is used for energy recovery; and when only a single motor is used for braking energy recovery, and when the remaining braking energy is still insufficient to start the engine, the second braking energy recovery mode is disabled, and the engine is restarted by using all the braking energy. In the present embodiment, the power transmission route in the seventh engine restarting mode is the same as the power transmission route in the seventh engine restarting mode in the second embodiment.

(26) The Eighth Engine Restarting Mode

When the braking process (long braking) in the third braking energy recovery mode is about to be completed, the engine is restarted to establish the eighth engine restarting mode. When the hybrid driving system is in the eighth engine restarting mode, and when the remaining braking energy is insufficient to restart the engine, only a single motor is used for energy recovery; and when only a single motor is used for braking energy recovery, and when the remaining braking energy is still insufficient to start the engine, the third braking energy recovery mode is disabled, and the engine is restarted by using all the braking energy. In the present embodiment, the power transmission route in the eighth engine restarting mode is the same as the power transmission route in the eighth engine restarting mode in the second embodiment.

(27) The Ninth Engine Restarting Mode

When the braking process (long braking) in the fourth braking energy recovery mode is about to be completed, the engine is restarted to establish the ninth engine restarting mode. When the hybrid driving system is in the ninth engine restarting mode, and when the remaining braking energy is insufficient to restart the engine, only a single motor is used for energy recovery; and when only a single motor is used for braking energy recovery, and when the remaining braking energy is still insufficient to start the engine, the fourth braking energy recovery mode is disabled, and the engine is restarted by using all the braking energy. In the present embodiment, the power transmission route in the ninth engine restarting mode is the same as the power transmission route in the ninth engine restarting mode in the second embodiment.

(28) The Tenth Engine Restarting Mode

When the braking process (long braking) in the fifth braking energy recovery mode is about to be completed, the engine is restarted to establish the tenth engine restarting mode. When the hybrid driving system is in the tenth engine restarting mode, and when the remaining braking energy is insufficient to restart the engine, only a single motor is used for energy recovery; and when only a single motor is used for braking energy recovery, and when the remaining braking energy is still insufficient to start the engine, the fifth braking energy recovery mode is disabled, and the engine is restarted by using all the braking energy. In the present embodiment, the power transmission route in the tenth engine restarting mode is the same as the power transmission route in the tenth engine restarting mode in the second embodiment.

The hybrid driving system in the sixth embodiment has the following advantages:

(1) Four E-CVT modes (the first E-CVT mode, the second E-CVT mode, the third E-CVT mode and the fourth E-CVT mode) are realized. When the vehicle speed rises to a certain level and the speed ratio exceeds the second mechanical point speed ratio in the second E-CVT mode, the transmission efficiency of the system will decrease. Therefore, when the speed ratio exceeds the second mechanical point speed of the second E-CVT mode, a fixed speed ratio smaller than the second mechanical point speed ratio of the second E-CVT mode can be used for driving, or, the third E-CVT mode or the fourth E-CVT mode can be used for driving, the third E-CVT mode and the fourth E-CVT mode are both output splitting modes, the mechanical point speed ratio of the third E-CVT mode is the mechanical point speed ratio of the second E-CVT mode, and when the speed ratio reaches the mechanical point speed ratio of the fourth E-CVT mode, in order to further improve the transmission efficiency, the mode is switched to the fourth E-CVT mode. Accordingly, at any vehicle speed section, transmission efficiency as high as possible can be obtained.

(2) Five gears of pure electric modes (the 1-gear pure electric drive mode, the 2-gear pure electric drive mode, the 3-gear pure electric drive mode, the 4-gear pure electric drive mode and the 5-gear pure electric drive mode) are realized, therefore the motors can be in a high efficiency working interval as much as possible in the pure electric modes, and the transmission efficiency is improved, which is particularly important for plug-in hybrid electric vehicles.

(3) Working modes of multiple fixed speed ratios are realized, the electric power loss is further reduced, the transmission efficiency is improved, the stalling of the motors can be eliminated by introducing the fixed speed ratios, the losses of the motors are reduced, and the lives of the motors are prolonged.

(4) Four engine direct drive/parallel modes (the 1-gear engine direct-drive/parallel mode, the 2-gear engine direct-drive/parallel mode, the 3-gear engine direct-drive/parallel mode and the 4-gear engine direct-drive/parallel mode) are realized, the electric power loss is further reduced, the transmission efficiency is improved, the stalling of the motors can be eliminated by introducing the fixed speed ratios, the losses of the motors are reduced, and the lives of the motors are prolonged.

(5) The braking energy recovery modes of five fixed gears (the first braking energy recovery mode, the second braking energy recovery mode, the third braking energy recovery mode, the fourth braking energy recovery mode and the fifth braking energy recovery mode) are realized, and there are corresponding braking energy recovery modes at low, medium and high speed sections to ensure that the braking capacity of each speed section can be fully utilized.

(6) The engine restarting modes of ten fixed gears (the first engine restarting mode, the second engine restarting mode, the third engine restarting mode, the fourth engine restarting mode, the fifth engine restarting mode, the sixth engine restarting mode, the seventh engine restarting mode, the eighth engine restarting mode, the ninth engine restarting mode, and the tenth engine restarting mode) are realized, so that the engine can be started at any time on demand in the pure electric modes or the braking energy recovery modes at various speed sections.

Figure 49:
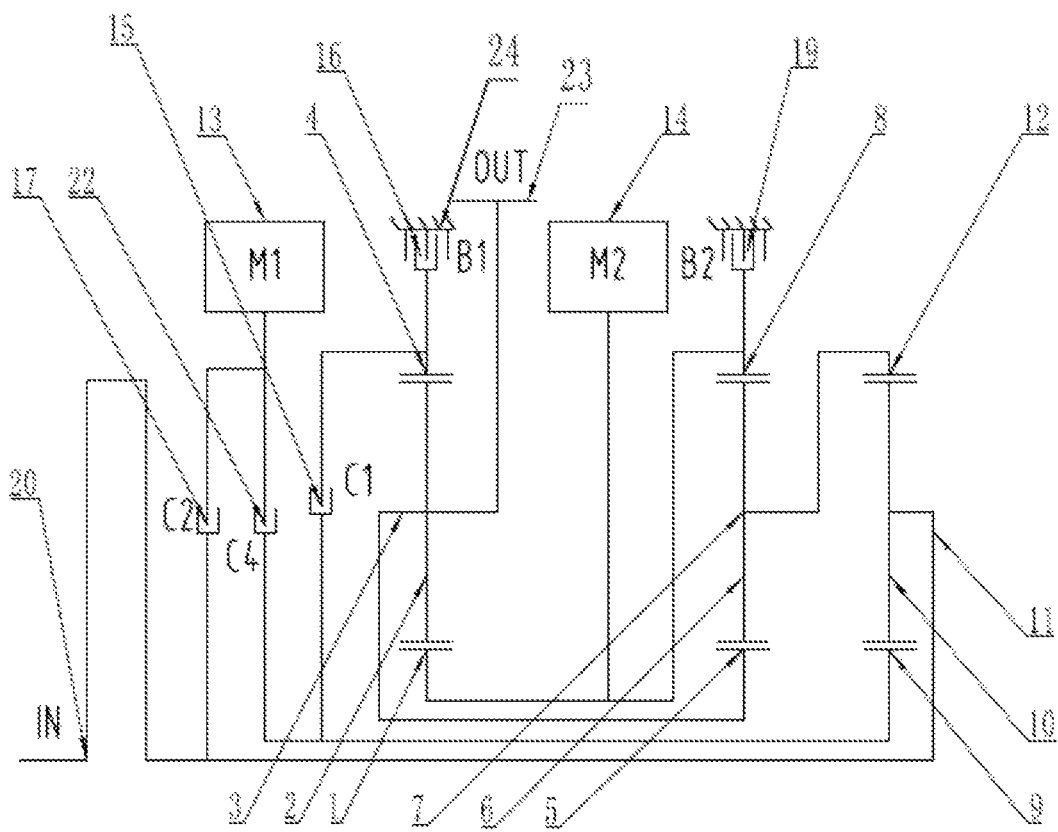
FIG. 49 is a power transmission route diagram of the hybrid driving system provided by a seventh embodiment of the present disclosure in the fourth E-CVT mode.

In addition, referring to FIG. 49, it shows a hybrid driving system provided by a seventh embodiment of the present disclosure. The difference with the sixth embodiment is that in the present embodiment, the third clutch 18 is canceled, and the input element 20 is directly connected to the third planet carrier 11. The direct connection between the input element 20 and the third planet carrier 11 is spline connection, welding or integral formation. Compared with the sixth embodiment, one clutch is omitted in the seventh embodiment, so that the structure of the hybrid driving system is simpler, and the cost is lower. In addition, the seventh embodiment does not involve the control of the third clutch 18, so that the control of the hybrid driving system is simpler. In the seventh embodiment, the operating logic in each working mode is as shown in Table 7.

TABLE 7

Working mode operating logic table (Seventh embodiment)

| Working mode | First clutch | Second clutch | Fourth clutch | First brake | Second brake | Speed ratio or mechanical point speed ratio (transmission ratio) |
|---|---|---|---|---|---|---|
| First E-CVT mode | | | • | • | | $K3 * (K1 * K2 + K2 + 1)/(1 + K2)/(1 + K3)$ |
| Second E-CVT mode | • | | | • | | $i1 = K3 * (K1 * K2 + K2 + 1)/(1 + K2)/(1 + K3)$<br>$i2 = (K1 * K3 + (1 + K1) * (1 + K2))/K1/(1 + K2)/(1 + K3)$ |
| Third E-CVT mode | • | • | | | | $((1 + K1) * (1 + K2) + K1 * K3)/K1/(1 + K2)/(1 + K3)$ |
| Fourth E-CVT mode | | | • | • | | $1/(1 + K2)$ |
| 1-gear pure electric mode | | • | • | • | | $(K1 * K2 + K2 + 1)/(K2 + 1)$ |
| 2-gear pure electric mode | | • | • | • | | $K1 + 1$ |
| 3-gear pure electric mode | • | | | • | | $K1 + 1$ |
| 4-gear pure electric mode | | • | • | | • | $(K1 + 1)/K1$ |
| 5-gear pure electric mode | • | • | • | | | $1$ |

TABLE 7-continued

Working mode operating logic table (Seventh embodiment)

| Working mode | First clutch | Second clutch | Fourth clutch | First brake | Second brake | Speed ratio or mechanical point speed ratio (transmission ratio) |
|---|---|---|---|---|---|---|
| 1-gear engine direct drive/parallel mode | | • | • | • | | $(K_1 * K_2 + K_2 + 1)/(K_2 + 1)$ |
| 2-gear engine direct drive/parallel mode | • | | | • | | $K_3 * (1 + K_2 + K_1 * K_2)/(1 + K_2)/(1 + K_3)$ |
| 3-gear engine direct drive/parallel mode | • | • | • | | | 1 |
| 4-gear engine direct drive/parallel mode | • | | • | | • | $(1 + K_1 + K_2 + K_1 * K_2 + K_1 * K_3)/K_1/(1 + K_2)/(1 + K_3)$ |
| First braking energy recovery mode | | • | • | • | | $(K_2 + 1)/(K_1 * K_2 + K_2 + 1)$ |
| Second braking energy recovery mode | | • | • | | | $1/(K_1 + 1)$ |
| Third braking energy recovery mode | • | | • | | | $1/(K_1 + 1)$ |
| Fourth braking energy recovery mode | • | | • | | • | $K_1/(1 + K_1)$ |
| Fifth braking energy recovery mode | • | • | • | | | 1 |
| First engine restarting mode | | • | | • | | |
| Second engine restarting mode | | • | | • | | |
| Fourth engine restarting mode | • | | | • | | |
| Fifth engine restarting mode | • | • | | | | |
| Sixth engine restarting mode | | • | | • | | |
| Seventh engine restarting mode | | • | | • | | |
| Eight engine restarting mode | • | | | • | | |
| Ninth engine restarting mode | • | | | | • | |
| Tenth engine restarting mode | • | • | | | | |

In Table 7, the mark • indicates that the operating element is engaged, and the blank space indicates that the operating element is disengaged. K1 represents the ratio of the number of teeth of the first gear ring 4 to that of the first sun gear 1. K2 represents the ratio of the number of teeth of the second gear ring 8 to that of the second sun gear 5, and K3 represents the ratio of the number of teeth of the third gear ring 12 to that of the third sun gear 9.

In the seventh embodiment, it is only necessary to cancel the third clutch 18 and its control on the basis of the sixth embodiment. Therefore, in the seventh embodiment, the power transmission routes in various operating modes are similar to those in the sixth embodiment.

In addition, the embodiment of the present disclosure further provides a hybrid electric vehicle, including the hybrid driving system in the foregoing embodiments. The hybrid electric vehicle can be a non-plug-in hybrid electric vehicle or a plug-in hybrid electric vehicle.

The above descriptions are only the preferred embodiments of the present disclosure and are not intended to limit the present disclosure. Any modifications, equivalent substitutions, improvements and the like, made within the spirit and principle of the present disclosure, shall be included in the protection scope of the present disclosure.

What is claimed is:

1. A hybrid driving system, comprising:
an engine;
an input element;
an output element;
a box body;
a first motor and a second motor;
a first planet row, a second planet row and a third planet row, wherein the first planet row comprises a first sun gear, a first planet gear, a first gear ring and a first planet carrier, the first sun gear is in external meshing transmission with the first planet gear, the first planet gear is in internal meshing transmission with the first gear ring, and the first planet gear is rotatably supported on the first planet carrier; the second planet row comprises a second sun gear, a second planet gear, a second gear ring and a second planet carrier, the second sun gear is in external meshing transmission with the second planet gear, the second planet gear is in internal meshing transmission with the second gear ring, and the second planet gear is rotatably supported on the second planet carrier; the third planet row comprises a third sun gear, a third planet gear, a third gear ring and a third planet carrier, the third sun gear is in external meshing transmission with the third planet gear, the third planet gear is in internal meshing transmission with the third gear ring, and the third planet gear is rotatably supported on the third planet carrier; and the first sun gear and the second gear ring are both connected to the second motor, the first planet carrier is fixedly connected to the second sun gear, the second planet carrier is fixedly connected to the third gear ring, the third sun gear is connected to the first motor, the input element is connected between the engine and the third planet carrier, and the output element is connected to the first planet carrier; and
a first clutch and a first brake, wherein the first gear ring is connected to the third sun gear through the first clutch, and the first gear ring is connected to the box body through the first brake.

2. The hybrid driving system of claim 1, wherein the hybrid driving system has a pure electric mode; and
when the engine and the first motor do not participate in working, and only the second motor performs driving, the first brake is engaged, and the first clutch is disengaged to establish the pure electric mode.

3. The hybrid driving system of claim 2, wherein the hybrid driving system further has a first engine restarting mode; and
when an output power of the hybrid driving system in the pure electric mode is insufficient to meet a driving power demand of a vehicle or a battery power is relatively low, the engine is restarted to establish the first engine restarting mode.

4. The hybrid driving system of claim 1, wherein the hybrid driving system has a first E-CVT mode and a second E-CVT mode;
when the engine and the second motor perform driving together, and the first motor generates electricity for driving the second motor, the first brake is engaged, and the first clutch is disengaged to establish the first E-CVT mode; and
when the engine performs driving, the first motor generates electricity or performs driving, and the second motor generates electricity or performs driving, the first clutch is engaged, and the first brake is disengaged to establish the second E-CVT mode.

5. The hybrid driving system of claim 1, wherein the hybrid driving system has an engine direct drive/parallel mode; and
when the first motor does not participate in working, the engine performs driving, and the second motor performs driving or generates electricity, the first clutch and the first brake are engaged to establish the first engine direct drive/parallel mode.

6. The hybrid driving system of claim 1, wherein the hybrid driving system has a braking energy recovery mode; and
when the engine and the first motor do not participate in working, and the second motor generates electricity, the first brake is engaged, and the first clutch is disengaged to establish the braking energy recovery mode.

7. The hybrid driving system of claim 6, wherein the hybrid driving system further has a second engine restarting mode; and
when the braking process in the braking energy recovery mode is about to be completed, the engine is restarted to establish the second engine restarting mode.

8. The hybrid driving system of claim 1, wherein the hybrid driving system further comprises a second clutch and a second brake, the second clutch is connected between any two of the third sun gear, the third planet carrier and the third gear ring, and the second gear ring is connected to the box body through the second brake.

9. The hybrid driving system of claim 8, wherein the hybrid driving system has a 1-gear pure electric mode, a 2-gear pure electric mode, a 3-gear pure electric mode, a 4-gear pure electric mode and a 5-gear pure electric mode;
when the engine does not participate in working, the first motor performs main driving, and the second motor performs auxiliary driving, the second clutch and the first brake are engaged, and the first clutch and the second brake are disengaged to establish the 1-gear pure electric mode;
when the engine does not participate in working, the first motor performs auxiliary driving, and the second motor performs main driving, the second clutch and the first brake are engaged, and the first clutch and the second brake are disengaged to establish the 2-gear pure electric mode;
when the engine and the first motor do not participate in working, and the second motor performs driving, the first clutch and the first brake are engaged, and the second clutch and the second brake are disengaged to establish the 3-gear pure electric mode;
when the engine and the second motor do not participate in working, and the first motor performs driving, the first clutch and the second brake are engaged, and the second clutch and the first brake are disengaged to establish the 4-gear pure electric mode; and
when the engine does not participate in working, and the first motor and the second motor are used together as main drive, the first clutch and the second clutch are engaged, and the first brake and the second brake are disengaged to establish the 5-gear pure electric mode.

10. The hybrid driving system of claim 9, wherein the hybrid driving system has a first engine restarting mode, a second engine restarting mode, a third engine restarting mode, a fourth engine restarting mode and a fifth engine restarting mode;
when an output power of the hybrid driving system in the 1-gear pure electric mode is insufficient to meet a driving power demand of a vehicle or a battery power is relatively low, the engine is restarted to establish the first engine restarting mode;

when the output power of the hybrid driving system in the 2-gear pure electric mode is insufficient to meet the driving power demand of the vehicle or the battery power is relatively low, the engine is restarted to establish the second engine restarting mode;

when the output power of the hybrid driving system in the 3-gear pure electric mode is insufficient to meet the driving power demand of the vehicle or the battery power is relatively low, the engine is restarted to establish the third engine restarting mode;

when the output power of the hybrid driving system in the 4-gear pure electric mode is insufficient to meet the driving power demand of the vehicle or the battery power is relatively low, the engine is restarted to establish the fourth engine restarting mode; and when the output power of the hybrid driving system in the 5-gear pure electric mode is insufficient to meet the driving power demand of the vehicle or the battery power is relatively low, the engine is restarted to establish the fifth engine restarting mode.

11. The hybrid driving system of claim 8, wherein the hybrid driving system has a first E-CVT mode and a second E-CVT mode;

when the engine and the second motor perform driving together, and the first motor generates electricity for the driving of the second motor, the first brake is engaged, and the first clutch, the second clutch and the second brake are disengaged to establish the first E-CVT mode; and when the engine performs driving, the first motor generates electricity or performs driving, and the second motor generates electricity or performs driving, the first clutch is engaged, and the second clutch, the first brake and the second brake are disengaged to establish the second E-CVT mode.

12. The hybrid driving system of claim 8, wherein the hybrid driving system has a 1-gear engine direct drive/ parallel mode, a 2-gear engine direct drive/parallel mode, a 3-gear engine direct drive/parallel mode and a 4-gear engine direct drive/parallel mode;

when the engine performs driving, the first motor generates electricity or performs driving, and the second motor generates electricity or performs driving, the second clutch and the first brake are engaged, and the first clutch and the second brake are disengaged to establish the 1-gear engine direct drive/parallel mode;

when the first motor does not participate in working, the engine performs driving, and the second motor performs driving or generates electricity, the first clutch and the first brake are engaged, and the second clutch and the second brake are disengaged to establish the 2-gear engine direct drive/parallel mode;

when the engine performs driving, the first motor generates electricity or performs driving, and the second motor generates electricity or performs driving, the first clutch and the second clutch are engaged, and the first brake and the second brake are disengaged to establish the 3-gear engine direct drive/parallel mode; and when the second motor does not participate in working, the engine performs driving, and the first motor performs driving or generates electricity, the first clutch and the second brake are engaged, and the second clutch and the first brake are disengaged to establish the 4-gear engine direct drive/parallel mode.

13. The hybrid driving system of claim 8, wherein the hybrid driving system has a first braking energy recovery mode, a second braking energy recovery mode, a third braking energy recovery mode, a fourth braking energy recovery mode and a fifth braking energy recovery mode;

when the engine does not participate in working, the first motor performs main power generation, and the second motor performs auxiliary power generation, the second clutch and the first brake are engaged, and the first clutch and the second brake are disengaged to establish the first braking energy recovery mode;

when the engine does not participate in working, the first motor performs auxiliary power generation, and the second motor performs main power generation, the second clutch and the first brake are engaged, and the first clutch and the second brake are disengaged to establish the second braking energy recovery mode;

when the engine and the first motor do not participate in working, and the second motor generates electricity, the first clutch and the first brake are engaged, and the second clutch and the second brake are disengaged to establish the third braking energy recovery mode;

when the engine and the second motor do not participate in working, and the first motor generates electricity, the first clutch and the second brake are engaged, and the second clutch and the first brake are disengaged to establish the fourth braking energy recovery mode; and when the engine does not participate in working, the first motor and the second motor perform main power generation together, the first clutch and the second clutch are engaged, and the first brake and the second brake are disengaged to establish the fifth braking energy recovery mode.

14. The hybrid driving system of claim 13, wherein the hybrid driving system has a sixth engine restarting mode, a seventh engine restarting mode, an eighth engine restarting mode, a ninth engine restarting mode and a tenth engine restarting mode;

when a braking process in the first braking energy recovery mode is about to be completed, the engine is restarted to establish the sixth engine restarting mode;

when the braking process in the second braking energy recovery mode is about to be completed, the engine is restarted to establish the seventh engine restarting mode;

when the braking process in the third braking energy recovery mode is about to be completed, the engine is restarted to establish the eighth engine restarting mode;

when the braking process in the fourth braking energy recovery mode is about to be completed, the engine is restarted to establish the ninth engine restarting mode; and when the braking process in the fifth braking energy recovery mode is about to be completed, the engine is restarted to establish the tenth engine restarting mode.

15. The hybrid driving system of claim 1, wherein the hybrid driving system further comprises a second clutch, a third clutch and a second brake, the second clutch is connected between any two of the third sun gear, the third planet carrier and the third gear ring, the second gear ring is connected to the box body through the second brake, and the input element is connected to the third planet carrier through the third clutch.

16. The hybrid driving system of claim 1, wherein the hybrid driving system further comprises a second clutch, a second brake and a third brake, the second clutch is connected between any two of the third sun gear, the third planet carrier and the third gear ring, the second gear ring is connected to the box body through the second brake, and the third gear ring is connected to the box body through the third brake.

17. The hybrid driving system of claim 1, wherein the hybrid driving system further comprises a second clutch, a third clutch, a second brake and a third brake, the second clutch is connected between any two of the third sun gear, the third planet carrier and the third gear ring, the second gear ring is connected to the box body through the second brake, the third gear ring is connected to the box body through the third brake, and the input element is connected to the third planet carrier through the third clutch.

18. A hybrid driving system, comprises:
an engine;
an input element;
an output element;
a box body;
a first motor and a second motor;
a first planet row, a second planet row and a third planet row, wherein the first planet row comprises a first sun gear, a first planet gear, a first gear ring and a first planet carrier, the first sun gear is in external meshing transmission with the first planet gear, the first planet gear is in internal meshing transmission with the first gear ring, and the first planet gear is rotatably supported on the first planet carrier; the second planet row comprises a second sun gear, a second planet gear, a second gear ring and a second planet carrier, the second sun gear is in external meshing transmission with the second planet gear, the second planet gear is in internal meshing transmission with the second gear ring, and the second planet gear is rotatably supported on the second planet carrier; the third planet row comprises a third sun gear, a third planet gear, a third gear ring and a third planet carrier, the third sun gear is in external meshing transmission with the third planet gear, the third planet gear is in internal meshing transmission with the third gear ring, and the third planet gear is rotatably supported on the third planet carrier; and the first sun gear and the second gear ring are both connected to the second motor, the first planet carrier is fixedly connected to the second sun gear, the second planet carrier is fixedly connected to the third gear ring, the input element is connected between the engine and the third planet carrier, and the output element is connected to the first planet carrier; and
a first clutch, a second clutch, a fourth clutch, a first brake and a second brake, wherein the first gear ring is connected to the third sun gear through the first clutch, the second clutch is connected between any two of the third sun gear, the third planet carrier and the third gear ring, the first gear ring is connected to the box body through the first brake, the second gear ring is connected to the box body through the second brake, and the third sun gear is connected to the first motor through the fourth clutch.

19. The hybrid driving system of claim 18, wherein the hybrid driving system further comprises a third clutch, and the input element is connected to the third planet carrier through the third clutch.

20. A hybrid electric vehicle, comprising:
a hybrid driving system, comprising:
an engine;
an input element;
an output element;
a box body;
a first motor and a second motor;
a first planet row, a second planet row and a third planet row, wherein the first planet row comprises a first sun gear, a first planet gear, a first gear ring and a first planet carrier, the first sun gear is in external meshing transmission with the first planet gear, the first planet gear is in internal meshing transmission with the first gear ring, and the first planet gear is rotatably supported on the first planet carrier; the second planet row comprises a second sun gear, a second planet gear, a second gear ring and a second planet carrier, the second sun gear is in external meshing transmission with the second planet gear, the second planet gear is in internal meshing transmission with the second gear ring, and the second planet gear is rotatably supported on the second planet carrier; the third planet row comprises a third sun gear, a third planet gear, a third gear ring and a third planet carrier, the third sun gear is in external meshing transmission with the third planet gear, the third planet gear is in internal meshing transmission with the third gear ring, and the third planet gear is rotatably supported on the third planet carrier; and the first sun gear and the second gear ring are both connected to the second motor, the first planet carrier is fixedly connected to the second sun gear, the second planet carrier is fixedly connected to the third gear ring, the third sun gear is connected to the first motor, the input element is connected between the engine and the third planet carrier, and the output element is connected to the first planet carrier; and
a first clutch and a first brake, wherein the first gear ring is connected to the third sun gear through the first clutch, and the first gear ring is connected to the box body through the first brake.

* * * * *